(12) United States Patent
Tan et al.

(10) Patent No.: US 9,753,884 B2
(45) Date of Patent: Sep. 5, 2017

(54) RADIO-CONTROL BOARD FOR SOFTWARE-DEFINED RADIO PLATFORM

(75) Inventors: Kun Tan, Beijing (CN); Jiansong Zhang, Beijing (CN); Yongguang Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 689 days.

(21) Appl. No.: 12/571,188

(22) Filed: Sep. 30, 2009

(65) Prior Publication Data

US 2011/0078355 A1 Mar. 31, 2011

(51) Int. Cl.
| G06F 13/42 | (2006.01) |
| G06F 13/40 | (2006.01) |
| G06F 13/38 | (2006.01) |
| H04B 1/00 | (2006.01) |

(52) U.S. Cl.
CPC .......... *G06F 13/4273* (2013.01); *G06F 13/38* (2013.01); *G06F 13/40* (2013.01); *H04B 1/0007* (2013.01)

(58) Field of Classification Search
CPC ...... G06F 13/38; G06F 13/40; G06F 13/4063; G06F 13/4068; G06F 13/42; G06F 13/4204; G06F 13/4265; G06F 13/4273; G06F 13/4282; G06F 13/4291
USPC ............ 710/300, 106, 69–72, 305, 306, 313
See application file for complete search history.

(56) References Cited

U.S. PATENT DOCUMENTS

| | | | |
|---|---|---|---|
| 5,099,417 A | 3/1992 | Magar et al. | |
| 5,212,777 A | 5/1993 | Gove et al. | |
| 5,708,593 A | 1/1998 | Saby et al. | |
| 5,784,640 A | 7/1998 | Asghar et al. | |
| 5,930,298 A | 7/1999 | Choi | |
| 6,061,555 A | 5/2000 | Bultman et al. | |
| 6,114,971 A | 9/2000 | Nysen | |
| 6,167,031 A | 12/2000 | Olofsson et al. | |
| 6,182,030 B1 | 1/2001 | Hagen et al. | |
| 6,188,702 B1 | 2/2001 | Tornetta et al. | |
| 6,298,035 B1 | 10/2001 | Heiskala | |
| 6,298,370 B1 | 10/2001 | Tang et al. | |
| 6,351,499 B1 | 2/2002 | Paulraj et al. | |
| 6,415,415 B1 | 7/2002 | Karabed | |
| 6,557,062 B1 | 4/2003 | Shaler et al. | |
| 6,578,153 B1 * | 6/2003 | Sankey et al. ................ | 713/400 |
| 6,587,671 B1 | 7/2003 | Kanago et al. | |

(Continued)

FOREIGN PATENT DOCUMENTS

| CN | 1973492 | 5/2007 |
| CN | 101385361 | 3/2009 |

(Continued)

OTHER PUBLICATIONS

Low Voltage Differential Signaling, <http://en.wikipedia.org/wiki/Low-voltage_differential_signaling>, accessed on Apr. 21, 2011.*

(Continued)

*Primary Examiner* — Thomas J Cleary

(74) *Attorney, Agent, or Firm* — Schwegman Lundberg & Woessner, P.A.

(57) ABSTRACT

A radio control board exchanges data with a radio frequency (RF) front end using a messaging protocol over an interface that includes separate data and control channels. Training data can also be passed over the interface for tuning the clock phase.

19 Claims, 24 Drawing Sheets

(56) References Cited

U.S. PATENT DOCUMENTS

| | | |
|---|---|---|
| 6,654,428 B1 | 11/2003 | Bose et al. |
| 6,665,311 B2 | 12/2003 | Kondylis et al. |
| 6,735,448 B1 | 5/2004 | Krishnamurthy et al. |
| 6,748,034 B2 | 6/2004 | Hattori et al. |
| 6,785,904 B1 | 8/2004 | Franken et al. |
| 6,788,702 B1 | 9/2004 | Garcia-Luna-Aceves et al. |
| 6,825,827 B2 | 11/2004 | Miura |
| 6,864,715 B1 | 3/2005 | Bauer et al. |
| 6,895,512 B1 | 5/2005 | Calbucci |
| 6,963,579 B2 | 11/2005 | Suri |
| 7,016,325 B2 | 3/2006 | Beasley et al. |
| 7,072,818 B1 | 7/2006 | Beardslee et al. |
| 7,142,617 B2 | 11/2006 | Mohan |
| 7,162,204 B2 | 1/2007 | Hansen et al. |
| 7,174,145 B2 | 2/2007 | Chatelier et al. |
| 7,230,978 B2 | 6/2007 | Bitterlich et al. |
| 7,287,077 B2 | 10/2007 | Haugh et al. |
| 7,404,074 B2 | 7/2008 | Murotake |
| 7,444,168 B2 | 10/2008 | Nakagawa et al. |
| 7,565,140 B2 | 7/2009 | Levy et al. |
| 7,610,017 B2 | 10/2009 | Girardeau, Jr. et al. |
| 7,650,525 B1 * | 1/2010 | Chang et al. ............... 713/500 |
| 7,738,913 B2 | 6/2010 | Hilpisch et al. |
| 7,774,017 B2 | 8/2010 | Irita et al. |
| 7,894,556 B2 | 2/2011 | Casabona et al. |
| 7,933,598 B1 | 4/2011 | Agrawal et al. |
| 7,974,176 B2 | 7/2011 | Zheng |
| 8,406,331 B2 | 3/2013 | Orfanos et al. |
| 8,526,412 B2 | 9/2013 | Vijayan et al. |
| 8,526,529 B2 | 9/2013 | Ahn et al. |
| 8,553,521 B2 | 10/2013 | Zhang et al. |
| 8,929,933 B2 | 1/2015 | Tan et al. |
| 2002/0126704 A1 * | 9/2002 | Cam et al. ............... 370/503 |
| 2002/0155811 A1 | 10/2002 | Prismantas et al. |
| 2003/0086366 A1 | 5/2003 | Branlund et al. |
| 2003/0196132 A1 * | 10/2003 | Chiang ............... 713/503 |
| 2004/0068730 A1 | 4/2004 | Miller et al. |
| 2004/0153957 A1 | 8/2004 | Feldman et al. |
| 2004/0156449 A1 * | 8/2004 | Bose et al. ............... 375/316 |
| 2004/0185887 A1 | 9/2004 | Wolman et al. |
| 2004/0252684 A1 * | 12/2004 | Evans et al. ............... 370/389 |
| 2005/0124330 A1 | 6/2005 | Hong et al. |
| 2005/0135308 A1 | 6/2005 | Vijayan et al. |
| 2005/0202848 A1 | 9/2005 | Chang |
| 2005/0202858 A1 | 9/2005 | Farber et al. |
| 2006/0015674 A1 | 1/2006 | Murotake |
| 2006/0109925 A1 | 5/2006 | Kannan et al. |
| 2006/0115012 A1 | 6/2006 | Sadowsky et al. |
| 2006/0145897 A1 | 7/2006 | Kadono et al. |
| 2006/0168587 A1 | 7/2006 | Aslam-Mir |
| 2006/0190904 A1 | 8/2006 | Haji-Aghajani et al. |
| 2006/0212624 A1 | 9/2006 | Kim |
| 2006/0227856 A1 | 10/2006 | Ledvina et al. |
| 2007/0002898 A1 | 1/2007 | Boariu et al. |
| 2007/0076649 A1 | 4/2007 | Lin et al. |
| 2007/0083786 A1 * | 4/2007 | Chiang ............... 713/500 |
| 2007/0092018 A1 | 4/2007 | Fonseka et al. |
| 2007/0155429 A1 | 7/2007 | Levy et al. |
| 2007/0178841 A1 | 8/2007 | Oliynyk et al. |
| 2007/0202816 A1 | 8/2007 | Zheng |
| 2007/0247139 A1 | 10/2007 | Veroni et al. |
| 2008/0003949 A1 | 1/2008 | Voonna et al. |
| 2008/0043668 A1 | 2/2008 | Chen et al. |
| 2008/0095100 A1 | 4/2008 | Cleveland et al. |
| 2008/0095135 A1 | 4/2008 | Cleveland |
| 2008/0098133 A1 * | 4/2008 | Shaanan et al. ............... 710/30 |
| 2008/0130519 A1 | 6/2008 | Bahl et al. |
| 2008/0165754 A1 | 7/2008 | Hu |
| 2008/0175421 A1 | 7/2008 | Chizari |
| 2008/0178062 A1 | 7/2008 | Norris et al. |
| 2008/0232487 A1 | 9/2008 | Cleveland et al. |
| 2008/0256606 A1 | 10/2008 | Koikara et al. |
| 2008/0261639 A1 | 10/2008 | Sun et al. |
| 2008/0261650 A1 | 10/2008 | Piriyapoksombut et al. |
| 2008/0268892 A1 | 10/2008 | Hamdi et al. |
| 2008/0300006 A1 | 12/2008 | Rofougaran et al. |
| 2008/0320529 A1 | 12/2008 | Louchkoff et al. |
| 2009/0034457 A1 | 2/2009 | Bahl et al. |
| 2009/0061783 A1 | 3/2009 | Choi et al. |
| 2009/0063057 A1 | 3/2009 | Miettinen |
| 2009/0088104 A1 | 4/2009 | Cheng et al. |
| 2009/0089556 A1 | 4/2009 | Lee et al. |
| 2009/0110033 A1 | 4/2009 | Shattil |
| 2009/0119570 A1 | 5/2009 | Eder et al. |
| 2009/0156129 A1 | 6/2009 | Hassan et al. |
| 2009/0160486 A1 | 6/2009 | Lee |
| 2009/0175381 A1 | 7/2009 | Bougard |
| 2009/0190537 A1 | 7/2009 | Hwang et al. |
| 2009/0196180 A1 | 8/2009 | Bahl et al. |
| 2009/0197627 A1 | 8/2009 | Kuffner et al. |
| 2009/0204725 A1 | 8/2009 | Liu et al. |
| 2009/0232234 A1 | 9/2009 | Du |
| 2009/0235316 A1 | 9/2009 | Wu et al. |
| 2009/0253376 A1 | 10/2009 | Parssinen et al. |
| 2009/0258603 A1 | 10/2009 | Ghaboosi et al. |
| 2009/0298522 A1 | 12/2009 | Chaudhri et al. |
| 2009/0312028 A1 | 12/2009 | Burchfiel |
| 2009/0323600 A1 | 12/2009 | Chandra et al. |
| 2010/0014603 A1 | 1/2010 | Palanki et al. |
| 2010/0031098 A1 * | 2/2010 | Kobayashi ............... 714/715 |
| 2010/0048234 A1 | 2/2010 | Singh |
| 2010/0075704 A1 | 3/2010 | McHenry et al. |
| 2010/0159855 A1 | 6/2010 | Hardacker et al. |
| 2010/0232369 A1 | 9/2010 | Jing et al. |
| 2010/0246377 A1 | 9/2010 | Zhang et al. |
| 2010/0246506 A1 | 9/2010 | Krishnaswamy |
| 2010/0260137 A1 | 10/2010 | Vrzic et al. |
| 2010/0262420 A1 | 10/2010 | Herre et al. |
| 2010/0301992 A1 | 12/2010 | Chandra et al. |
| 2010/0304678 A1 | 12/2010 | Chandra et al. |
| 2010/0309317 A1 | 12/2010 | Wu et al. |
| 2010/0309806 A1 | 12/2010 | Wu et al. |
| 2011/0096658 A1 | 4/2011 | Yang et al. |
| 2011/0116458 A1 | 5/2011 | Hsu et al. |
| 2011/0122855 A1 | 5/2011 | Henry |
| 2011/0123028 A1 | 5/2011 | Karabinis |
| 2011/0134861 A1 | 6/2011 | Seo et al. |
| 2011/0135016 A1 | 6/2011 | Ahn et al. |
| 2011/0188486 A1 | 8/2011 | Kim et al. |
| 2011/0228666 A1 | 9/2011 | Barbieri et al. |
| 2012/0096498 A1 | 4/2012 | Wu et al. |
| 2014/0051467 A1 | 2/2014 | Tan et al. |
| 2015/0117386 A1 | 4/2015 | Tan et al. |

FOREIGN PATENT DOCUMENTS

| | | |
|---|---|---|
| CN | 101399557 | 4/2009 |
| CN | 101399557 A | 4/2009 |
| CN | 101399930 A | 4/2009 |
| CN | 101415226 | 4/2009 |
| JP | 2007088941 A | 4/2007 |
| JP | 2008503958 A | 2/2008 |
| JP | 2008306665 | 12/2008 |
| JP | 2009515468 | 4/2009 |
| JP | 2009118320 | 5/2009 |
| KR | 20080036534 | 4/2008 |
| KR | 20080098263 | 11/2008 |
| WO | WO9901945 | 1/1999 |
| WO | WO2006000955 | 1/2006 |
| WO | WO2006083495 A2 | 8/2006 |
| WO | WO2007053121 | 5/2007 |
| WO | WO2009018300 A1 | 2/2009 |
| WO | WO2010057302 A1 | 5/2010 |
| WO | WO2010142021 | 12/2010 |
| WO | WO2011015960 | 2/2011 |

OTHER PUBLICATIONS

Ethernet Frame, <http://en.wikipedia.org/wiki/Ethernet_frame>, accessed on Apr. 21, 2011.*

A Closer Look at LVDS Technology, Pericom, Nov. 16, 2001.*

8b/10b Encoding, <http://en.wikipedia.org/wiki/8B/10B>, accessed on Apr. 21, 2011.*

(56) References Cited

OTHER PUBLICATIONS

System Packet Interface Level 4 (SPI-4), Optical Internetworking Forum, Oct. 15, 2003.*
Creating a PCI Express Interconnect, Intel Corporation, 2002.*
Low Voltage Differential Signaling (LVDS), Texas Instrument, 2000.*
10-Mhz to 66-Mhz, 10:1 LVDS Serializer/Deserializer, Texas Instrument, 2004.*
Differential Signaling, Introduction, Reading Chapter 6, Intel, Dec. 4, 2002.*
Bahl et al, "White Space Networking with WI-FI like Connectivity," SIGCOMM '09, Barcelona, Spain, Aug. 17-21, 2009, 12 pgs.
Chandra et al, "A Case for Adapting Channel Width in Wireless Networks," In Proceedings of the ACM SIGCOMM '08 Conference on Data Communication, Aug. 17-22, 2008, Seattle, Washington, 12 pgs.
Dutta et al, "An Intelligent Physical Layer for Cognitive Radio Networks," Proceedings of the 4th Annual International Conference on Wireless Internet, WICON '08, Nov. 17-19, 2008, 9 pgs.
"WBX," Ettus Research LLC, retreived from <<http://www.ettus.com/WBX>> on Apr. 25, 2011, 1 pg.
"Welcome to Ettus Research," Ettus Research LLC, retrieved from <<http://www.ettus.com>> on Apr. 25, 2011, 2 pgs.
Gockler et al, "Parallelisation of Digital Signal Processing in Uniform and Reconfigurable Filter Banks for Satellite Communications," IEEE Asia Pacific Conference on Circuits and Systems, APCCAS 2006, Dec. 4-7, 2006, 4 pgs.
Li et al, "A Frequency Hopping Spread Spectrum Transmission Scheme for Uncoordinated Cognitive Radios," IEEE International Conference on Acoustics, Speech and Signal Processing, ICASSP 2009, Taipei, Apr. 19-24, 2009, pp. 2345-2348.
Microsoft Research, "WhiteFiService Home," retrieved from <<http://whitespaces.msresearch.us>> on Apr. 25, 2011, 2 pgs.
Mody et al, "Machine Learning Based Cognitive Communications in White as Well as the Gray Space," IEEE, 2007, pp. 1-7.
Narlanka et al, "A Hardware Platform for Utilizing TV Bands With a Wi-Fi Radio," 15th IEEE Workshop on Local & Metropolitan Area Networks, LANMAN 2007, New York, NY, Jun. 10-13, 2007, 5 pgs.
Park et al, "Frequency-Domain Channel Estimation and Equalization for Continuous-Phase Modulations With Superimposed Pilot Sequences," IEEE Transactions on Vehicular Technology, vol. 58, No. 9, Nov. 2009, pp. 4903-4908.
"Radio Technology from Full Spectrum used in White Space," Radio Electronics.com, retrieved from <<http://www.radio-electronics.com/news/radio-receivers/radio-technology-from-full-spectrum-used-48>>, Sep. 22, 2010, 2 pgs.
Rahul et al, "Learning to Share: Narrowband-Friendly Wideband Networks," In Proceedings of the ACM SIGCOMM '08 Conference on Data Communication, Aug. 17-22, 2008, Seattle, Washington, 12 pgs.
Smirnov et al, "The Use of Spectral Analysis in Identifying Applications Runny on Enterprise Data Center Systems," CMG Computer Measurement Group, retrieved from <<http://www.cmg.org/measureit/issues/mit62/m_62_11.html>>, Aug. 2009, 6 pgs.
"Software Radio," Microsoft Research, retreived from <<http://research.microsoft.com/sora>> on Apr. 25, 2011, 3 pgs.
Suzuki et al, "Proposal of Band-Limited Divided-Spectrum Single Carrier Transmission for Dynamic Spectrum Controlled Access in ISM Band," Personal, Indoor and Mobile Radio Communications, 2009 IEEE 20th International Symposium, Sep. 3-16, 2009, pp. 132-136.
Wang et al, "List-Coloring Based Channel Allocation for Open-Spectrum Wireless Networks," IEEE, 2005, pp. 690-694.
Yang et al, "Supporting Demanding Wireless Applications with Frequency-agile Radios," Proceedings of 7th USENIX Symposium on Networked Systems Design and Implementation (NSDI 2010), San Jose, California, Apr. 2010, pp. 1-15.
Zaki et al, "LTE Wireless Virtualization and Spectrum Management," 2010 Third Joint IFIP, Wireless and Mobile Networking Conference (WMNC), Budapest, Oct. 13-15, 2010, 6 pgs.
Advanced Concept Engineering Corp., "Ultra High-Performance Viterbi Decoder Core ACIP Viterbi_K7-", retrived at <<http://www.acengr.com/datasheet/ACIP_Viterbi_DataSheet.pdf>> on Aug. 11, 2009.
Arslan, "Teaching SDR through a Laboratory Based Course with Modern Measurement and Test Instruments", published Nov. 5-9, 2007, retrieved from the internet at <<http://www.sdrforum.org/pages/sdr07/Proceedings/Papers/1.2/1.2-3.pdf.
Bougard, et al., "A Coarse-Grained Array Accelerator for Software-Defined Radio Baseband Processing", retrieved on Jun. 19, 2009 at <<http://ieeexplore.ieee.org/stamp/stamp.jsp?tp=&arnumber=4626817&isnumber=4626808>>, IEEE Micro, Jul.-Aug. 2008, pp. 41-50.
Boyd-Wickizer, et al., "Corey: an operating system for many cores", retrieved on Jun. 19, 2009 at <<http://www.mit.edu/~y_z/papers/corey-osdi08.pdf>>, pp. 1-14.
Burton, "16-Channel, DDS LVDS Interface with Per-Channel Alignment", retrieved on Aug. 13, 2009 at <<http://www.xilinx.com/support/documentation/application_notes/xapp855.pdf>>, XILINX, Application Note: Virtex-5 FPGAs, XAPP855, Oct. 13, 2006, pp. 1-43.
Cummings, et al., "FPGA in the Software Radio", retrieved on Jun. 19, 2009 at <<http://ieeexplore.ieee.org/stamp/stamp.jsp?tp=&arnumber=747258>>, IEEE Communications Magazine, Feb. 2009, pp. 108-112.
Dong et al., "Neural Networks Based Parallel Viterbi Decoder by Hybrid Design", Proceeding of the 5th World Congress on Intelligent Control and Automation, Jun. 15-19, 2004, pp. 1923-pp. 1926.
"GAO USB PC Based Oscilloscope (1Mega) Model A0130005", Copyright 2001-2009, retrieved from the internet at <<http://www.gaoinstruments.com/gao2902_usb_pc_based_oscilloscope_1mega-p-53.html>>.
Glossner, et al., "A Software-Defined Communications Baseband Design", retrieved on Jun. 19, 2009 at <<http://ieeexplore.ieee.org/stamp/stamp.jsp?tp=&arnumber=1166669&isnumber=26307>>, IEEE Communications Magazine, Jan. 2003, pp. 120-128.
Glossner, et al., "The Sandbridge Sandblaster Communications Processor", 3rd Workshop on Application Specific Processors, 2004.
"GNU Radio", retrieved on Jun. 19, 2009 at <<http://www.gnu.org/software/gnuradio/>>, 2 pages.
Goldsmith, "Wireless Communications", retrieved on Jun. 19, 2009 at <<http://assets.cambridge.org/97805218/37163/copyright/9780521837163_copyright.pdf>>, Cambridge University Press, 2 pages.
"Host AP driver for Intersil Prism2/2.5/3, hostapd, and WPA Supplicant", retrieved on Jun. 19, 2009 at <<http://hostap.epitest.fi/>>, Mar. 23, 2009, 4 pages.
Jamieson, et al., "PPR: Partial Packet Recovery for Wireless Networks", retrieved on Jun. 19, 2009 at <<http://nms.lcs.mit.edu/papers/fp315-jamieson.pdf>>, SIGCOMM 2007, ACM 2007, 12 pages.
Katti, et al., "Embracing Wireless Interference: Analog Network Coding", retrieved on Jun. 19, 2009 at <<http://nms.lcs.mit.edu/~dina/pub/anc.pdf>>, SIGCOMM 2007, ACM 2007, 12 pages.
Kim et al., "Low Power, High-Rate Viterbi Decoder Employing the SST (Scarce State Transition) Scheme and Radix-4 Trellis" Department of Electrical and Computer Engineering, Sungkyunkwan University, pp. 1-pp. 4.
Kim et al., "Power Efficient Viterbi Decoder based on Pre-computation Technique for Portable Digital Multimedia Broadcasting Receiver", IEEE Transactions on Consumer Electronics, vol. 53, No. 2, May 2007, pp. 350-pp. 356.
Lin, et al., "IBM Research Report Wireless Base Station Design on General Purpose Processor with Multicore Technology", retrieved on Aug. 13, 2009 at <<http://domino.watson.ibm.com/library/cyberdig.nsf/papers/B4C36233C8280F27852575FD005991DF/$File/rc24823.pdf>>, IBM Research Division, China Research Laboratory, Electrical Engineering, RC24823, Jul. 14, 2009, 9 pages.

(56) References Cited

OTHER PUBLICATIONS

Lin, et al., "SODA: A Low-power Architecture for Software Radio", retrieved on Jun. 19, 2009 at <<http://ieeexplore.ieee.org/stamp/stamp.jsp?tp=&arnumber=1635943>>, Proceedings of the 33rd International Symposium on Computer Architecture (ISCA 2006), IEEE, 2006.

Lin, et al., "Software Defined Radio—A High Performance Challenge", retrieved on Jun. 19, 2009 at <<http://citeseerx.ist.psu.edu/viewdoc/download?doi=10.1.1.92.7327&rep=rep1&type=pdf>>, SDRG, pp. 1-41.

"LVDS-Based SerDes for Video Interconnects", retrieved on Aug. 13, 2009 at <<http://www.epn-online.com/page/new51279>>, EPN, Electronic Product News, pp. 1-11.

MADWiFi, retrieved on Jun. 19, 2009 at <<http://sourceforge.net/projects/madwifi>>, 1 page.

Minden, et al., "KUAR: A Flexible Software-Defined Radio Development Platform", retrieved on Jun. 19, 2009 at <<http://www.ittc.ku.edu/publications/documents/minden2007_dyspan07.pdf>>, 12 pages.

Neel, et al., "A Formal Methodology for Estimating the Feasible Processor Solution Space for a Software Radio", retrieved on Jun. 19, 2009 at <<http://www.sdrforum.org/pages/sdr05/1.2%20Reconfigurable%20Hardware/1.2-03%20Neel%20et%20al.pdf>>, Proceeding of the SDR 2005 Technical Conference and Product Exposition, SDR, 2005, 6 pages.

Neufeld, et al., "SoftMAC—Flexible Wireless Research Platform", retrieved on Jun. 19, 2009 at <<http://conferences.sigcomm.org/hotnets/2005/papers/grunwald.pdf>>, Department of Computer Science, University of Colorado, Boulder, Nov. 4, 2005, pp. 1-6.

"Part 11: Wireless LAN Medium Access Control (MAC) and Physical Layer (PHY) Specifications", retrieved on Jun. 19, 2009 at <<http://www.csse.uwa.edu.au/adhocnets/802.11-1999.pdf>>, ANSI/IEEE Std 802.11, 1999 Edition, pp. i-xiv and 1-512.

"Rt2x00", retrieved on Jun. 19, 2009 at <<http://rt2x00.serialmonkey.com>>, Apr. 12, 2009, 3 pages.

Savvopoulos, et al., "A Software-Radio Test-bed for Measuring the Performance of DVB-S2 Receiver Circuits", published Oct. 6-8, 2008.

Sawyer, "High-Speed Data Serialization and Deserialization (840 Mb/s LVDS)", retrieved on Aug. 13, 2009 at <<http://www.eetindia.co.in/ARTICLES/2002JUN/2002JUN28_AMD_NTEK_AN.PDF?SOURCES=DOWNLOAD>>, XILINX, Application Note: Virtex-II Family, XAPP265, Jun. 19, 2002, pp. 1-13.

Schmid, et al., "An Experimental Study of Network Performance Impact of Increased Latency in Software Defined Radios", retrieved on Jun. 19, 2009 at <<http://nesl.ee.ucla.edu/fw/thomas/wintech401-schmid.pdf>>, WiNTECH 2007, Networked and Embedded Systems Laboratory, Electrical Engineering Department, University of California, Los Angeles, 8 pages.

Siu et al., "A Robust Viterbi Algorithm against Impulsive Noise with Application to Speech Recognition", IEEE Transactions on Audio, Speech, and Language Processing, vol. 14, No. 6, Nov. 2006, pp. 2122-pp. 2133.

"Small Form Factor SDR Development Platform", retrieved on Jun. 19, 2009 at <<http://www.kanecomputing.co.uk/lyrtech_sff_sdr_dev_platform.htm>>, Kane Computing Ltd., 2 pages.

"Software-Defined Radio System", retrieved on Jun. 19, 2009 at <<http://zone.ni.com/devzone/cda/tut/p/id/8787>>, National Instruments, May 26, 2009, pp. 1-5.

Tan, et al., "Sora: High Performance Software Radio Using General Purpose Multi-Core Processors", retrieved on Aug. 13, 2009 at <<http://www.usenix.org/event/nsdi09/tech/slides/tan.pdf>>, NSDI, 2009, pp. 1-27.

Tennenhouse, et al., "SpectrumWare—A Software-Oriented Approach to Wireless Signal Processing", retrieved on Jun. 19, 2009 at <<http://citeseerx.ist.psu.edu/viewdoc/download:jsessionid=D99E57C2A2A3CEEF89F66CBA544F774F?doi=10.1.1.17.9618&rep=rep1&type=pdf>>, Telemedia Networks and Systems Group Laboratory for Computer Science, MIT, pp. 1-15.

"The KILL Rule for Multicore", retrieved on Jun. 19, 2009 at <<http://ieeexplore.ieee.org/stamp/stamp.jsp?arnumber=04261283>>, DAC 2007, ACM 2007, pp. 750-753.

"Think Beyond the Box—A Software-Defined Approach to RF Test", Published May 13, 2009, retrieved from the internet at <<http://zone.ni.com/devzone/cda/pub/p/id/750>>.

Tsou, et al., "Latency Profiling for SCA Software Radio", retrieved on Jun. 19, 2009 at <<http://www.sdrforum.org/pages/sdr07/Proceedings/Papers/2.2/2.2-1.pdf>>, SDR Forum Technical Conference 2007, 6 pages.

"Using Flexible-LVDS I/O Pins in APEX II Devices", retrieved on Aug. 13, 2009 at <<http://www.altera.com/literature/an/an167.pdf>>, Altera Corporation, Application Note 167, ver 1.1, Aug. 2002, pp. 1-14.

Verdu, "Multiuser Detection", retrieved on Jun. 19, 2009 at <<http://www.cambridge.org/US/catalogue/catalogue.asp?isbn=0521593735>>, Aug. 1998, 2 pages.

"WARP: Wireless Open Access Research Platform", retrieved on Jun. 19, 2009 at <<http://warp.rice.edu/trac>>, Rice University, 2 pages.

"Waveform Creator has Object-Oriented GUI Optimized for MIMO", Published Jun. 30, 2008, retrieved from the internet at <<http://news.thomasnet.com/fullstory/545867>>.

Wu, et al., "A Novel Software Radio Platform Based on General PC and Network", 2006 IEEE, Published 2006, retrieved from the internet at <<http://ieeexplore.ieee.org/stamp/stamp.jsp?arnumber=04149565>>.

PCT Intl Search Report (PCT/US2010/049013) dtd May 13, 2011.

Final Office Action for U.S. Appl. No. 12/473,963, mailed on May 1, 2012, Ranveer Chandra, "Spectrum Assignment for Networks Over White Spaces and Other Portions of the Spectrum," 14 pages.

Office Action for U.S. Appl. No. 12/631,548, mailed on Jan. 10, 2012, Kun Tan, "Analyzing Wireless Technologies Based on Software-Defined Radio," 8 pages.

Office Action for U.S. Appl. No. 12/473,963, mailed on Nov. 9, 2011, Ranveer Chandra, "Spectrum Assignment for Networks Over White Spaces and Other Portions of the Spectrum," 12 pages.

Office Action for U.S. Appl. No. 12/535,415, mailed on Apr. 11, 2012, Kun Tan, "Software-Defined Radio Using Multi-Core Processor," 15 pages.

Office Action for U.S. Appl. No. 12/630,774, mailed on Apr. 12, 2012, Kun Tan, "High Performance Digital Signal Processing in Software Radios," 9 pages.

Office action for U.S. Appl. No. 12/631,548, mailed on Jul. 2, 2012, Tan et al., "Analyzing Wireless Technologies Based on Software-Defined Radio," 7 pages.

PCT International Search Report and Written Opinion for PCT Application No. PCT/US2010/036752 mailed Dec. 31, 2010, 9 pages.

PCT International Search Report and Written Opinion for PCT Application No. PCT/US2010/036756 mailed Dec. 29, 2010, 9 pages.

Aguayo, et al, "Link-level Measurements from an 802.11b Mesh Network," SIGCOMM '04, Portland, Oregon, Aug. 2004, 11 pages.

Bahl, et al, "Cell Breathing in Wireless LANs: Algorithms and Evaluation," IEEE Computer Society, Transactions on Mobile Computing, Feb. 2007 (vol. 6 Issue 2), 16 pages.

Balazinska, et al, "Characterizing Mobility and Network Usage in a Corporate Wireless Local-Area Network," Proceedings of the First Internation Conference on Mobile Systems, Applications and Services; San Francisco, CA, May 2003, 14 pages.

Bejerano, et al, "Fairness and Load Balancing in Wireless LANs Using Association Control," MobiCom'04, Sep. 2004, Philidelpia, Pennsylvania, 15 pages.

Bruno, "High-Speed Wireless LANs: The Impact of Atheros Super G Proprietary Performance Mode on 802.11g Devices," The Tolly Group White Paper, Aug. 2004, 11 pages.

Camp, et al., "Measurement Driven Deployment of a Two-Tier Urban Mesh Access Network," MobiSys 06, Uppsala, Sweden, Jun. 2006, 14 pages.

Delay Spread, JPL's Wireless Communication Reference Website. Last accessed May 1, 2008, 4 pages.

(56) References Cited

OTHER PUBLICATIONS

Do-Hyun Na, et al., "Policy Based Dynamic Channel Selection Architecture for Cognitive Radio Networks, Communications and Networking in China," Aug. 2007, pp. 1190-1194.
ElBatt, et al., "Power Management for Throughput Enhancement in Wireless Ad-Hoc Networks," <<http://cs.ucr.edu/~kris/icc1hri.pdf. Last accessed May 1, 2008, 9 pages.
"Building Software Radio Systems: The USRP Product Family," Ettus Research LLC, Mountain View, California, retrieved at <<http://www.ettus.com>>, retrieved on Aug. 8, 2009, 2 pages.
Gast, "802.11 Wireless Networks. The Definitive Guide," Second Edition, Apr. 2002, 436 pages.
Geier, "Enabling Fast Wireless Networks with OFDM." CommsDesign, Feb. 2001, 6 pages.
Ghosh, et al., "A Cognitive Radio Prototype Operating in UHF TV Bands," IEEE Symposia on New Frontiers in Dynamic Spectrum Access, Networks, Demonstrations and Experimentation, IEEE DySPAN 2008, Oct. 2008, retrieved at <<http://cms.comsoc.org/SitGen/Uploads/Public/Docs_DYSPAN_2008/Phillips_Demo_IEEDySPAN2008.pdf>>, 4 pages.
Govil, et al, "Comparing Algorithms for Dynamic Speed-Setting of a Low-Power CPU," TR-95-017, International Computer Science Institute, Apr. 1995, 13 pages.
Gummadi, et al, "Understanding and Mitigating the Impact of RF Interference on 802.11 Networks," SIGCOMM Proceedings of the 2007 Conference on Applications, Technologies, Architectures, and Protocols for Computer Communications; vol. 37, Issue 4, Oct. 2007; 14 pages.
Heusse, et al., "Performance of Anomaly of 802.11b," Proceedings of INFOCOM 2003, Mar. 2003, 8 pages.
Holland, et al, "A Rate-Adaptive MAC Protocol for Multi-Hop Wireless Networks," IEEE International Conference on Mobile Computing and Networking (MOBICOM'01), Rome, Italy, Jul. 2001, 15 pages.
Horowitz, "The Art of Electronics, 2nd Edition," Cambridge University Press, Jul. 28, 1989, 469 pages.
International Search Report for Application No. PCT/US2010/036752 (corresponding to U.S. Appl. No. 12/473,951), mailed on Dec. 31, 2010, 9 pages.
International Search Report for Application No. PCT/US2010/036756 (corresponding to U.S. Appl. No. 12/473,963), mailed on Dec. 29, 2010, 9 pages.
JP Notice of Rejection for Application No. 2012-513340, Mar. 26, 2013, 7 pages.
Judd, et al, "Using Emulation to Understand and Improve Wireless Networks and Applications," NSD0I 2005 Proceedings of the 2nd Conference on Symposium on Networked Systems Design & Implementation—vol. 2, May 2005, 14 pages.
Kamerman, "WaveLan-II: A High-Performance Wireless LAN for the Unlicensed Band." Bell Labs Technical Journal, Aug. 1997. 16 pages.
Kotz, et al., "Analysis of a Campus-wide Wireless Network". In Proceedings of the Eighth Annual International Conference on Mobile Computing and Networking, pp. 107-118. (MOBICOM'02, Sep. 23-26, 2002, Atlanta, Georgia, USA). Revised and corrected as Dartmouth CS Technical Report TR2002-432.
Lacage, et al., "IEEE 802.11 Rate Adaptation: A Practical Approach," MSWiM '04, Venezia, Italy, Oct. 2004, 9 pages.
Mishra, Mobi-Com Poster Abstract: Client-driven Channel Management for Wireless LANs, Mobile Computing and Communications Review, vol. 10, No. 4, Oct. 2006, pp. 8-10.
Mishra, "Weighted Coloring Based Channel Assignment in WLANs," Mobile Computing and Communications Review, Jul. 2005, 12 pages.
Office action for U.S. Appl. No. 13/294,093, mailed on Dec. 5, 2013, He, et al., "Mapping a Transmission Stream in a Virtual Baseband to a Physical Baseband with Equalization", 14 pages.
Office action for U.S. Appl. No. 12/535,415, mailed on Apr. 8, 2013, Tan et al., "Software-Defined Radio Using Multi-Core Processor", 26 pages.

Office Action dated Dec. 10, 2013 in China Patent Application CN201080024619.6, filed May 28, 2010, by Applicant Microsoft Corporation, translated, 13 pages.
Ogilvie, "Clock Solutions for Wi-Fi" (IEEE 802.11), Perocom Semiconductor; www.pericom.com/pdf/applications/AN070.pdf; Sep. 5, 2003, 4 pages.
Proakis, "Digital Communications," McGraw Hill, Aug. 2000, 937 pages.
Rules 70(2) and 70a(2) EPC Communication and Supplemental European Search Report dated Dec. 6, 2013 in EPO Patent Application 10781356.0 (PCT/US2010/036756) filed May 28, 2010, by Applicant Microsoft Corporation, 7 pages.
Shah, et al., "Dynamic Bandwidth Management for Single-hop Ad Hoc Wireless Networks," Mobile Networks and Applications, Mar. 2005, 9 pages.
Shih, et al, "Wake on Wireless: An Event Driven Energy Saving Strategy for Battery operated Devices," MobiCom '02, Proceedings of the 8th annual international conference on Mobile Computing and networking, Sep. 2002, 12 pages.
"SLX Wireless Systems Specifications," SHURE Incorporated, Niles, Illinois, retreived at <<http://www.fullcompass.com/common/files/3227-SLX-Serie%20Shure%20specs.pdf>>retreived on Aug. 8, 2009, 3 pages.
Tang, et al, "Analysis of a Local-Area Wireless Network," MobiCom '00; Proceedings of the 6th Annual International Conference on Mobile Computing and Networking, Boston, Massachusetts, Aug. 2000, 10 pages.
Trachewsky, et al, "Broadcom WLAN Chipset for 802.11a/b/g," Broadcom Corporation, CA, USA, Aug. 17, 2003, 42 pages.
"USRP—Frequently Asked Questions," GNU Radio, the GNU Software Radio, retrieved at <<http://gnuradio.org/trac/wiki/UsrpFAQ>>, retrieved on Aug. 8, 2009, 1 page.
Weiser, et al., "Scheduling for Reduced CPU Energy," OSDI '94 Proceedings of the 1st USENIX Conference on Operating Systems Design and Implementation, Nov. 1994, 11 pages.
WiMax Forum. www.wimaxforum.org. Last accessed May 1, 2008, 2 pages.
Wormsbecker, "On Channel Selection Strategies for Multi-Channel MAC Protocols in Wireless Ad Hoc Networks," IEEE International Conference on Wireless and Mobile Computing, Networking and Communications, Jun. 2006, pp. 212-220.
Yuan, et al, "Allocationg Dynamic Time-Spectrum Blocks in Cognitive Radio Networks," 8th ACM International Symposium on Mobile ad hoc networking and computing, Montreal, Quebec, Canada, Sep. 2007, 10 pages.
Office action for U.S. Appl. No. 12/535,415, mailed on Apr. 8, 2013, Tan et al., "Software-Defined Radio Using MultiCore Processor", 26 pages.
Alocci et al., "Development of an IEEE 802.11s Simulation Model for QualNet", Dublin, Ireland, retrieved at http://www.csi.ucd.ie/Staff/jmurphy/publications/1551.pdf, Sep. 2008, 9 pages.
"Authorized Ex Parte Contact—Unlicensed Operation in the TV Broadcast Bands (ET Docket No. 04-186), FCC.", Retrieved at << http://hraunfoss.fcc.gov/edocs_public/attachmatch /DA-04-4013A1.pdf >>, Dec. 22, 2004, pp. 2.
Borth et al., "Considerations for Successful Cognitive Radio Systems in US TV White Space", Proceedings of the 3rd IEEE Symposium on New Frontiers in Dynamic Spectrum Access Networks, Oct. 14-17, 2008, retrieved at <<http://ieeexplore.ieee.org/stamp/stamp.jsp? tp=&isnumber=&arnumber=4658272, 5 pages.
Broch et al., "A Performace Comparison of Multi-Hop Wireless Ad Hoc Network Routing Protocols", International Conference on Mobile Computing and Networking, Proceedings of the 4th annual ACM/IEEE international conference on Mobile computing and networking, Oct. 25-30, 1998, pp. 85-97.
Cabric et al., "Experimental Study of Spectrum Sensing Based on Energy Detection and Network Cooperation", Proceedings of the First International Workshop on Technology and Policy for Accessing Spectrum, 2006, retrieved at <<http://delivery.acm.org/10.1145/124000/ 1234400/a12-cabric.pdf?key1=1234400&key2=495684-8321&coll=GUIDE&dl=GUIDE&CFID=29023570&CFTOKEN=14990252, 8 pages.

(56) References Cited

OTHER PUBLICATIONS

Chandra et al., "Wireless Networking in the TV Bands", retrieved at http://sdr08.cs.ucdavis.edu/sdr-workshop.ppt, Apr. 1, 2009, 34 pages.
Chu, et al., "A Case for End System Multicast", Proceedings of the 2000 ACM SIGMETRICS International Conference. 28, Issue 1, Jun. 2000, pp. 1-12.
"Cognitive Radio Networks", retrieved at http://www.ece.gatech.edu/research/labs/bwn/CR/Projectdescription.html, Apr. 1, 2009, 13 pages.
Dandawate, et al., "Statistical Tests for Presence of Cyclostationarity", Retrieved at << http://ieeexplore.ieee.org/stamp/stamp.jsp?tp=&arnumber=317857&isnumber=7659 >>, IEEE Transactions on Signal Processing, vol. 42, No. 9, Sep. 1994, pp. 2355-2369.
Deb et al., "Dynamic Spectrum Access in DTV Whitespaces Design Rules, Architecture and Algorithms", ACM 978-1-60558-702-8/09/09, MobiCom '09, Sep. 20-25, 2009, 12 pages.
Web page for Ettus Research LLC, "The USRP Product Family", Mountain View, California, retrieved at<<http://www.ettus.com>>, retrieved on Mar. 31, 2009, 2 pages.
Ettus Research LLC, "USRP FAQ", Mountain View, California, retrieved at <<http://www.ettus.com/faq.html>>, retrieved on Mar. 31, 2009, 7 pages.
"FCC Adopts Rule for Unlicensed Use of Television White Spaces", Retrieved at <<http:// radiomagonline.com/currents/news/fcc-adopts-rules-unlicensed-white-spaces-1105/ >>, Nov. 5, 2008, pp. 3.
FCC Media Bureau, "TVQ TV Database", Retrieved at: <<http://www.fcc.gov/mb/video/tvq. html>>, Dec. 24, 2009, 2 pages.
"FCC Acts to Expedite DTV Transition and Clarify DTV Build-Out Rules", news release from the Federal Communications Commission, Nov. 8, 2001, retrieved at http://www.fcc.gov/Bureaus/Mass_Media/News_Releases/2001/nrmm0114.html, 3 pages.
Garroppo et al., "Notes on Implementing a IEEE 802.11s Mesh Point" retrieved at http://recerca.ac.upc.edu/eurongi08/slides/6-1-s.pdf, Apr. 1, 2009, 39 pages.
Goldsmith, Andrea Jo, "Design and Performance of High-Speed Communication Systems over Time-Varying Radio Channels", UC Berkeley, Berkeley, California, 1994, 210 pages.
Gurney et al., Geo-location Database Techniques for Incumbent Protection in the TV White Space, IEEE, 976-1-4244-2017-9/08, Jun. 6, 2008, 9 pages.
"IEEE 802.22 Working Group on WRANs" web page for IEEE 802 LAN/MAN Standards Committee, retrieved at <<http://www.ieee802.org/22/>>, retrieved on Mar. 31, 2009, 2 pages.
"Demonstrations and Experimentation", IEEE Symposia on New Frontiers in Dynamic Spectrum Access Networks, http://cms.comsoc.org/eprise/main/SiteGen/DYSPAN_2008/ Content/Home/demonstrations.html, retrieved Mar. 31, 2009, 13 pages.
Jones, et al., "FCC Press Release, Evaluation of the Performance of Prototype TV-Band White Space Devices", Retrieved at << http://online.wsj.com/public/resources/documents/ fcc10152008.pdf >>, Oct. 15, 2008, pp. 149.
Katabi, Dina, "The Use of IP Anycast for Building Efficient Multicast", Proceedings in Global Telecommunications Conference, Lab. for Computer Science, vol. 3, Dec. 5-9, 1999, pp. 1679-1688.
Kim et al., "Fast Discovery of Spectrum Opportunities in Cognitive Radio Networks", Proceedings of the 3rd IEEE Symposium on New Frontiers in Dynamic Spectrum Access Networks, Oct. 14-17, 2008, retrieved at <<http://kabru.eecs.umich.edu//papers/ publications/2008/main.pdf>>, 12 pages.
Kim et al., "In-band Spectrum Sensing in Cognitive Radio Networks: Energy Detection or Feature Detection?", Proceedings of the 14th ACM international conference on Mobile computing and networking, Sep. 14-19, 2008, http://kabru.eecs.umich.edu//papers/publications/2008/com0950-kim.pdf, pp. 14-25.
Liu, et al., "Sensing-based Opportunistic Channel Access", Retrieved at << http://www.cs.ucdavis.edu/~liu/paper/sensing.pdf >>, Mobile Networks and Applications, vol. 11, No. 4, Aug. 2006, pp. 1-28.
"Longley-Rice Methodology for Evaluating TV Coverage and Interference.", Retrieved at << http://www.fcc.gov/Bureaus/Engineering_Technology/Documents/bulletins/cet69/oet69 .pdf >>, Feb. 6, 2004, pp. 15.
Matinmikko. et al., "Cognitive Radio: An intelligent Wireless Communication System", Retrieved at << http://www.vtt.fi/inf/julkaisut/muut/2008/CHESS_Research_Report.pdf >>, Mar. 14, 2008, pp. 155.
Mishra et al., "How much white space is there?", Technical Report No. UCB/EECS-2009-3, Jan. 11, 2009, 16 pages.
Moscibroda et al., "Load-Aware Spectrum Distribution in Wireless LANs", IEEE International Conference on Network Protocols, Oct. 19-22, 2008, retrieved at <<http://www.ieee-icnp.org/2008/papers/Index14.pdf>>, pp. 137-146.
Nekovee, Maziar., "Quantifying the TV White Spaces Spectrum Opportunity for Cognitive Radio Access", Retrieved at << www.springerlink.com/index/p1hrw58u75027542.pdf >>, First International ICST Conference, EuropeComm, Aug. 11-13, 2009, pp. 46-57.
NYCwireless Testimony for NY City Council Hearing: The Regulation and Use of the Unallocated Portion of the Radio Spectrum, Also Known as White Spaces http://www.nycwireless.net/2008/09/nycwireless-testimony-for-ny-city-council-hearing-the-regulation-and-use-of-the-unallocated-portion-of-the-radio-spectrum-also-known-as-white-spaces/, Mar. 30, 2009, 3 pages.
Office action for U.S. Appl. No. 12/630,774, mailed on Oct. 9, 2012, Tan et al., "High Performance Digital Signal Processing in Software Radios", 6 pages.
Office action for U.S. Appl. No. 12/535,415, mailed on Nov. 21, 2012, Tan et al., "Software-Defined Radio Using Multi-Core Processor", 15 pages.
Otsason et al., "Accurate GSM Indoor Localization", UbiComp Sep. 11-14, 2005, LNCS vol. 3660, 2005, pp. 141-158.
PCT International Search Report and Written Opinion for PCT Application No. PCT/US2011/041302, mailed Dec. 28, 2011, 9 pgs.
Plummer Jr., et al., "A Cognitive Spectrum Assignment Protocol Using Distributed Conflict Graph Construction", <<http://ieeexplore.ieee.org/stamp/stamp.jsp?arnumber=04455299 >>, In Proceedings IEEE MILCOM, Oct. 2007, pp. 1-7.
Radio Magazine, "FCC Adopts Rules for Unlicensed Use of Television White Spaces", Retrieved at <<http://radiomagonline.com/currents/news/fcc-adopts-rules-unlicensed-white-spaces-1105/ >>, Nov. 5, 2008, pp. 4.
Ratnasamy et al., "Revisiting IP Multicast", ACM, 1-59593-308-5/06/0009, SigComm '06, Sep. 11-15, 2006, 12 pages.
Rix et al., "Perceptual Evaluation of Speech Quality (PESQ)—A New Method for Speech Quality Assessment of Telephone Networks and Codecs", Proceedings of the 2001 IEEE International Conference Acoustics, Speech and Signal Processing, vol. 2, 2001, http://ieeexplore. ieee.org/stamp/stamp.jsp?tp=&isnumber=&arnumber=941023, retrieved on Apr. 1, 2009, 4 pages.
Rosum Corporation, "Reliable, In-Building", Retrieved at << http://rosum.com/ >>, Retrieved Date: Dec. 24, 2009, pp. 1.
Sahai et al., Spectrum Sensing Fundamental Limits and Practical Challenges, Retrieved at: << http://www.eecs.berkeley.edu/~sahai/Presentations/Dyspan_2005_tutorial_part_I.pdf, 2005, 138 pages.
Web page for Scalable Network Technologies, Inc., Los Angeles, California, retrieved at << http://www.scalable-networks.com>>, retrieved on Mar. 31, 2009, 1 page.
Shellhammer et al., "Technical Challenges for Cognitive Radio in the TV White Space Spectrum", ITA Conference, San Diego, CA, Feb. 8-13, 2009, 11 pages.
"Show My White Space", Retrieved at << http://showmywhitespace.com/ >>, Retrieved Date: Dec. 24, 2009, pp. 2.
"Shuttle Radar Topography Mission (SRTM)", Retrieved at << http://www2.jpl.nasa.gov/srtm/ >>, Retrieved Date: Dec. 24, 2009, pp. 2.
"Skyhook Wireless", Retrieved at << http://skyhookwireless.com/ >>, Retrieved Date: Dec. 24, 2009, pp. 6.

(56) References Cited

OTHER PUBLICATIONS

Stirling, "White Spaces—the New Wi-Fi?", Retrieved at << http://www.intellectbooks.co.uk/ File:download,id=761/JDTV.1.1.69.pdf >>, International Journal of Digital Television, vol. 1, No. 1, 2010, pp. 16.
Subramani, et al., "Spectrum Scanning and Reserve Channel Methods for Link Maintenance in Cognitive Radio Systems", Retrieved at << http://rose.bris.ac.uk /dspace/bitstream/1983/1232/1/siva_IEEE_VTC_spring%202008.pdf>>, Proceedings of the 67th IEEE Vehicular Technology Conference, VTC, May 11-14, 2008, pp. 1944-1948.
Tan et al., "SORA: High Performance Software Radio Using General Purpose Multi-core Processors", Proceedings of the 6th USENIX Symposium of Networked Systems Design and Implementation, 2009, http://research.microsoft.com/pubs/79927/Sora-camera-ready.pdf, Apr. 1, 2009, 16 pages.
Tandra et al., "SNR Wall for Signal Detection", IEEE Journal of Selected Topics in Signal Processing, vol. 2, No. 1, Feb. 2008, pp. 4-17.
"The Global Land One-Km Base Elevation Project (GLOBE),", Retrieved at <<http://www. ngdc.noaa.gov/mgg/topo/globe.html >>, Retrieved Date: Dec. 24, 2009, pp. 2.
"The ITS Irregular Terrain Model Algorithm, NTIA, Department of Commerce.", Retrieved at << http://flattop.its.bldrdoc.gov/itm.html >>, Retrieved Date: Dec. 24, 2009, pp. 2.
"TV Fool", Retrieved at << http://www.tvfool.com/ >>, Retrieved Date: Dec. 24, 2009, pp. 2.
Web page for "TV Fool", retrieved at http://www.tvfool.com, retrieved on Mar. 31, 2009, 4 pages.
Urkowitz, "Energy Detection of Unknown Deterministic Signals", Proceedings of the IEEE, vol. 55, No. 4, Apr. 1967, pp. 523-531.
Whitt, Richard., "Introducing the White Spaces Database Group", Retrieved at <<http:// googlepublicpolicy.blogspot.com/2009/02/introducing-white-spaces-database-group.html >>, Feb. 4, 2009, pp. 4.
Yuan, et al., "KNOWS: Kognitiv Networking Over White Spaces", Retrieved at << http://citeseerx.ist.psu.edu/viewdoc/download?doi=10.1.1.123.4056&rep=rep1&type=pdf >>, IEEE Dynamic Spectrum Access Networks (DySPAN), Apr. 2007, pp. 12.
Translated Chinese Office Action mailed Jan. 7, 2015 for Chinese patent application No. 201080043940.9, a counterpart foreign application of U.S. Appl. No. 12/571,188, 6 pages.
Chinese Office Action mailed Dec. 1, 2014 for Chinese patent application No. 201210452650.0, a counterpart foreign application of U.S. Appl. No. 13/294,039, 6 pages.
Translated Japanese Notice of Rejection for Japanese Application No. 2013-516700 mailed on Sep. 30, 2014, a counterpart foreign application of U.S. Appl. No. 12/822,218, 4 pgs.
Translated Chinese Notice on the Second Office Action for CN Application No. 201080024631.7, mailed on Jul. 11, 2014, a counterpart foreign application of U.S. Appl. No. 12/473,951, 8 pgs.
Translated Chinese Notice on the Second Office Action for CN Application No. 201080024619.6, mailed on Aug. 14, 2014, a counterpart foreign application of U.S. Appl. No. 12/473,963, 7 pgs.
Office Action for U.S. Appl. No. 13/294,039, mailed on Oct. 16, 2014, He et al., "Mapping Signals from a Virtual Frequency Band to Physical Frequency Bands", 11 pages.
Translated Chinese Notice on the First Office Action for CN Application No. 201080024631.7, mailed on Nov. 27, 2013, a counterpart foreign application of U.S. Appl. No. 12/473,951, 12 pgs.
Translated Chinese Notice on the First Office Action for CN Application No. 201080024619.6, mailed on Dec. 10, 2013, a counterpart foreign application of U.S. Appl. No. 12/473,963, 13 pgs.
Extended EP Search Report for EP Application No. EP10781356.0, dated Nov. 20, 2013, a counterpart foreign application of U.S. Appl. No. 12/473,963, 6 pgs.
Extended EP Search Report for EP Application No. EP11798778.4, dated Nov. 25, 2013, a counterpart foreign application of U.S. Appl. No. 12/822,218, 7 pgs.
Translated Japanese Notice of Rejection for Japanese Application No. 2012-513340 mailed on Mar. 26, 2014, a counterpart foreign application of U.S. Appl. No. 12/473,963, 7 pgs.
Translated Japanese Office Action for Japanese Application No. 2012-513342, mailed on Apr. 30, 2014, a counterpart foreign application of U.S. Appl. No. 12/473,963, 4 pgs.
Na et al, "Policy-based Dynamic Channel Selection Architecture for Cognitive Radio Networks," Communications and Networking in China, 2007, CHINACOM '07, Aug. 22-24, 2007, 5 pgs.
PCT Search Report and Written Opinon for PCT/US2012/064249 mailed Mar. 29, 2013, 10 pages.
Stevenson et al (posted by Peter Murray), "TV Whitespace Petition for Reconsideration Input from 802.22 to 802.18," IEEE P802.22, Jan. 2009, pp. 1-10.
Translated Chinese Office Action mailed May 22, 2014 for Chinese patent application No. 201080043940.9, a counterpart foreign application of U.S. Appl. No. 12/571,188, 15 pages.
Translated Japanese Office Action mailed Nov. 25, 2014 for Japanese patent application No. 2014-508666, a counterpart foreign application of U.S. Appl. No. 13/202,297, 7 pages.
European Office Action mailed Jul. 2, 2015 for European patent application 12846996.2, a counterpart foreign application of U.S. Appl. No. 13/294,039, 5 pages.
Supplemental European Search Report mailed Jun. 25, 2015 for European Patent Application No. 12846996.2, 3 pages.
Japanese Office Action mailed Jul. 21, 2015 for Japanese patent application No. 2014-508666, a counterpart foreign application of U.S. Appl. No. 13/202,297, 4 pages.
Translated Chinese Office Action mailed Oct. 20, 2015 for Chinese patent application No. 201180070594.8, a counterpart foreign application of U.S. Appl. No. 13/202,297, 11 pages.
Translated Chinese Office Action mailed Feb. 14, 2016 for Chinese patent application No. 201210452650.0, a counterpart foreign application of U.S. Appl. No. 13/294,039, 6 pages.
European Office Action mailed Feb. 8, 2016 for European Patent Application 12846996.2, a counterpart foreign application of U.S. Appl. No. 13/294,039, 5 pages.
European Search Report mailed Jan. 18, 2016 for European patent application No. 118464689.2, 3 pages.
Murty, et al., "SenseLess: A Database-Driven White Spaces Network", Microsoft Research Technical Report MSR-TR-2010-127, Sep. 20, 2010, pp. 1-21, retrieved from the internet on Aug. 10, 2011 at http://citeseerx.ist.psu.edu/viewdoc/download?doi=10.0.0.204.7071&rep=rep1&type=pdf.
Tan, et al., "Spectrum Virtualization Layer", Jan. 31, 2011, retrieved from the internet at http://msr-waypoint.com/pubs/154410/main-svl.pdf, retrieved on Dec. 19, 2015, 16 pgs.
Translated Chinese Office Action mailed Aug. 17, 2015 for Chinese patent application No. 201210452650.0, a counterpart foreign application of U.S. Appl. No. 13/294,039, 8 pages.
Chinese Office Action mailed Jun. 20, 2016 for Chinese Patent Application No. 201210452650.0, a counterpart foreign application of U.S. Appl. No. 13/294,039, 21 pages.
Chinese Office Action mailed Jun. 20, 2016 for Chinese Patent Application No. 201180070594.8, a counterpart foreign application of U.S. Pat. No. 8,929,933, 12 pages.
Translated Japanese Office Action mailed Jun. 7, 2016 for Japanese Patent Application No. 2014-541278, a counterpart foreign application of U.S. Pat. No. 9,130,711, 6 pages.
Korean Office Action mailed Jan. 26, 2017 for Korean patent application No. 10-2013-7029117, a counterpart foreign application of U.S. Pat. No. 8,929,933.
Office Action for U.S. Appl. No. 14/587,512, mailed on Dec. 16, 2016, Tan et al., "Spectrum Allocation for Base Station", 17 pages.

\* cited by examiner

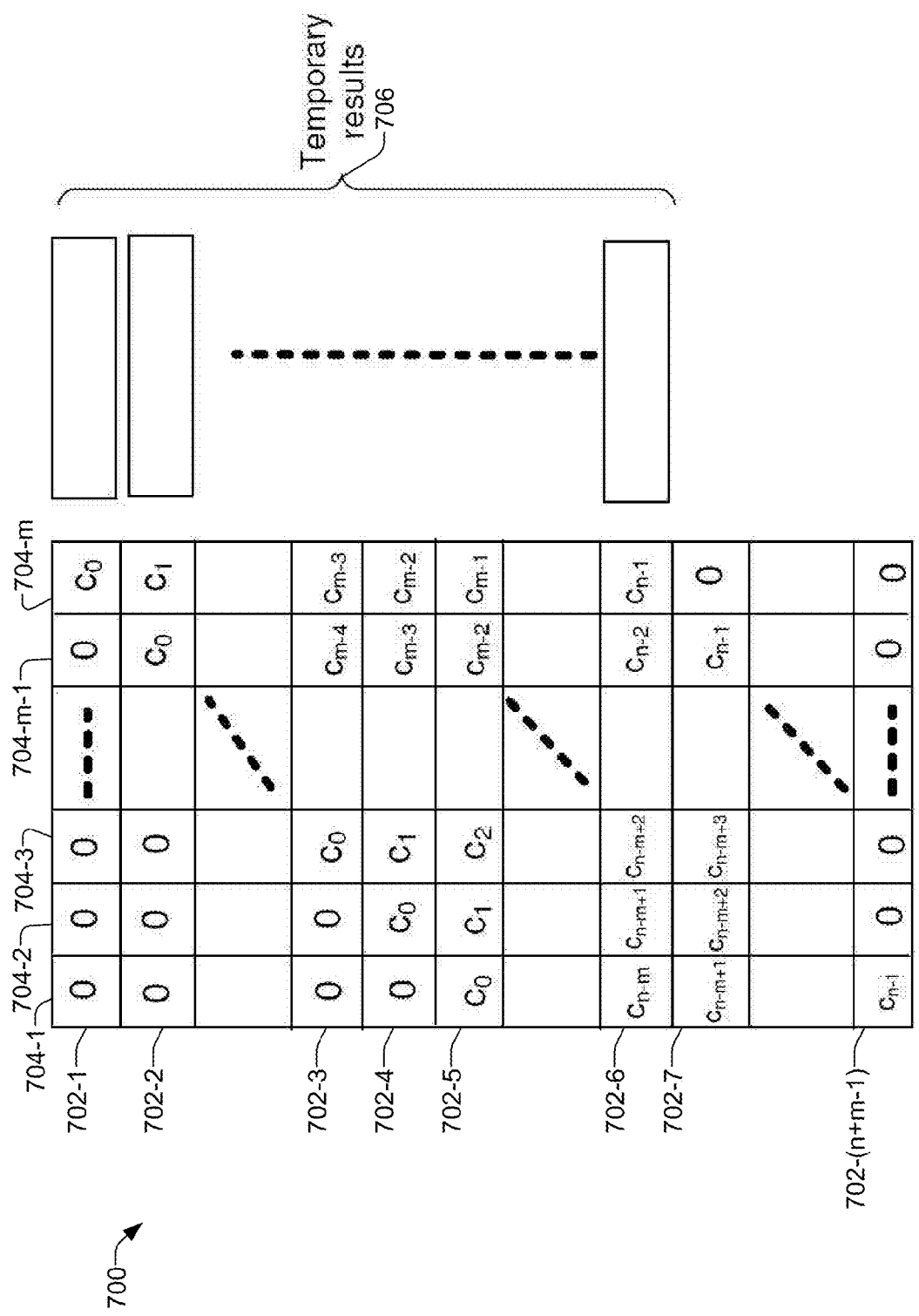

PROCESS CARRIED OUT BY CONSUMER

RADIO-CONTROL BOARD FOR SOFTWARE-DEFINED RADIO PLATFORM

BACKGROUND

Software-defined radio (SDR) holds the promise of fully programmable wireless communication systems, effectively supplanting conventional radio technologies, which typically have the lowest communication layers implemented primarily in fixed, custom hardware circuits. Realizing the promise of SDR in practice, however, has presented developers with a dilemma. Many current SDR platforms are based on either programmable hardware such as field programmable gate arrays (FPGAs) or embedded digital signal processors (DSPs). Such hardware platforms can meet the processing and timing requirements of modern high-speed wireless protocols, but programming FPGAs and specialized DSPs can be a difficult task. For example, developers have to learn how to program each particular embedded architecture, often without the support of a rich development environment of programming and debugging tools. Additionally, such specialized hardware platforms can also be expensive, e.g., at least several times the cost of an SDR platform based on a general-purpose processor (GPP) architecture, such as a general-purpose Personal Computer (PC).

On the other hand, SDR platforms that use general-purpose PCs enable developers to use a familiar architecture and environment having numerous sophisticated programming and debugging tools available. Furthermore, using a general-purpose PC as the basis of an SDR platform is relatively inexpensive when compared with SDR platforms that use specialized hardware. However, the SDR platforms that use a general purpose PC typically have an opposite set of tradeoffs from the specialized architectures discussed above. For example, since PC hardware and software have not been specially designed for wireless signal processing, conventional PC-based SDR platforms can achieve only limited performance. For instance, some conventional PC-based SDR platforms typically achieve only a few Kbps throughput on an 8 MHz channel, whereas modern high-speed wireless protocols such as 802.11 support multiple Mbps data rates on a much wider 20 MHz channel. Thus, these performance constraints prevent developers from using PC-based SDR platforms to achieve the full fidelity of state-of-the-art wireless protocols while using standard operating systems and applications in a real-world environment.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations herein provide for a radio control board (RCB) able to couple to a system bus of general-purpose computing device. The RCB also may include an interface that enables use of a message exchange protocol for exchanging data between the RCB and a radio frequency (RF) front end.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIG. 7A illustrates an exemplary memory layout for SIMD (Single Instruction Multiple Data) processing according to some implementations.

DETAILED DESCRIPTION

Overview

Figure 1:
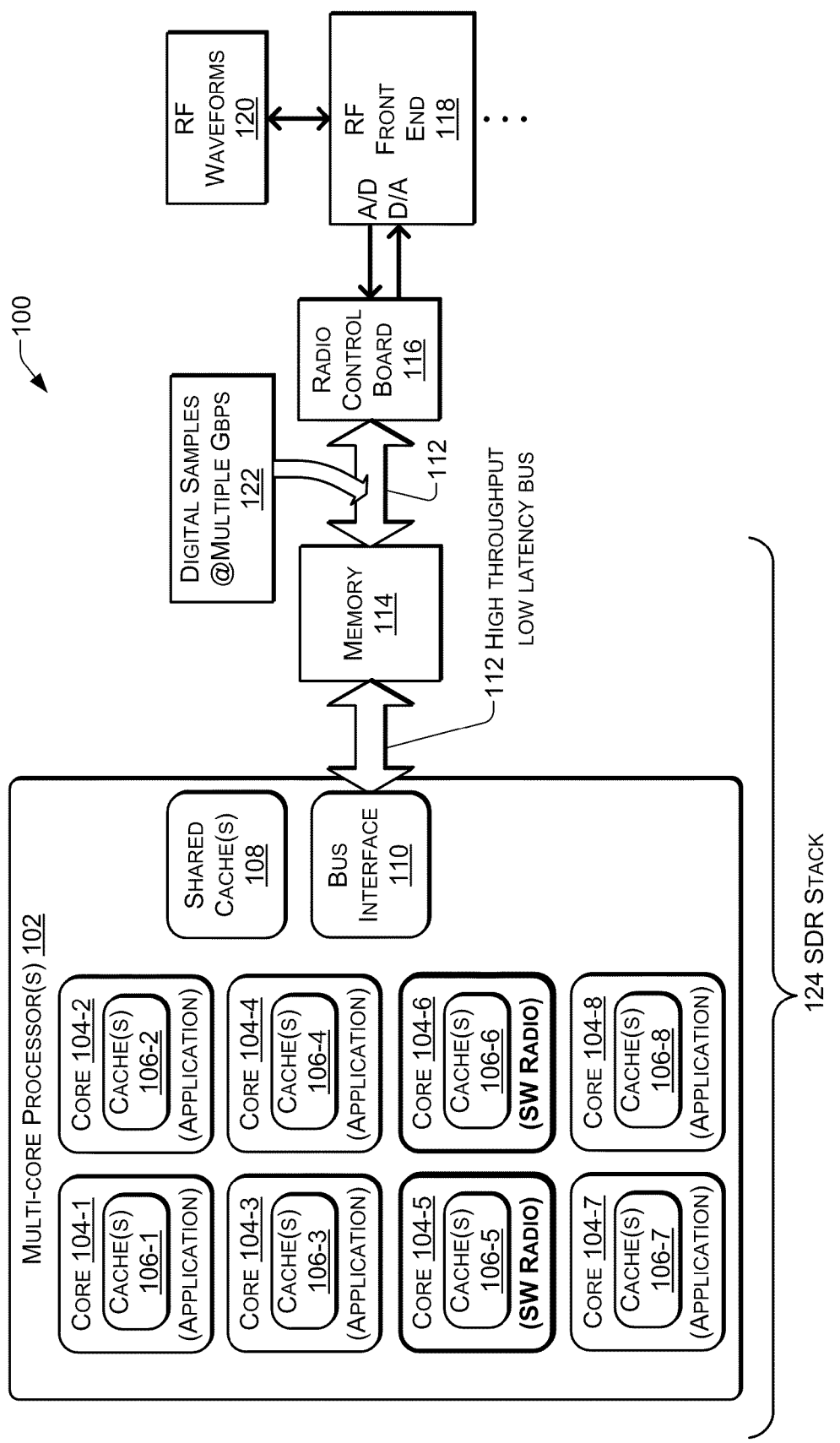
FIG. 1 illustrates an exemplary architecture according to some implementations disclosed herein.

Implementations disclosed herein present a fully programmable software-defined radio (SDR) platform and system able to be implemented on general-purpose computing devices, including personal computer (PC) architectures. Implementations of the SDR herein combine the performance and fidelity of specialized-hardware-based SDR platforms with the programmability and flexibility of general-purpose processor (GPP) SDR platforms. Implementations of the SDR herein use both hardware and software techniques to address the challenges of using general-purpose computing device architectures for high-speed SDR platforms. In some implementations of the SDR herein, hardware components include a radio front end for radio frequency (RF) reception and transmission, and a radio control board (RCB) for high-throughput and low-latency data transfer between the radio front end and a memory and processor on the computing device.

Furthermore, implementations of the SDR herein use both hardware and software techniques to address the challenges of using general-purpose computing device architectures for achieving a high-speed SDR. Implementations are further directed to an inexpensive radio control board (RCB) coupled with a radio frequency (RF) front end for transmission and reception. The RCB bridges the RF front end with memory of the computing device over a high-speed and low-latency PCIe (Peripheral Component Interconnect Express) system bus. By using a PCIe bus, some implementations of the RCB can support 16.7 Gbps throughput (e.g., in PCIe x8 mode) with sub-microsecond latency, which together satisfies the throughput and timing requirements of modern wireless protocols, while performing digital signal processing using the processor and memory of a general purpose computing device. Further, while examples herein use PCIe protocol, other high-bandwidth protocols may alternatively be used, such as, for example, HyperTransport™ protocol.

The architecture of the RCB may include a high speed interface for connecting the RCB to an RF front end to enable communication of data corresponding to RF signals between the RCB and the RF front end. Implementations provide an efficient message passing protocol that may include the use of separate dedicated data and control channels for passing encoded data messages and control messages/ACKs, respectively, between the RCB and the RF front end. Implementations also provide for separate dedicated status and clock channels for passing respective status and clock signals between the RCB and RF front end. In some implementations, the interface between the RCB and RF front end is an LVDS (low voltage differential signaling) interface for providing high speed data passage. Further, a training or tuning mode may be utilized for optimizing the interface and protocol timing between the RCB and the RF front end for adjusting the timing data access according to a phase of the clock signal.

Additionally, implementations of the SDR herein make use of features of multi-core processor architectures to accelerate wireless protocol processing and satisfy protocol-timing requirements. For example, implementations herein may use dedicated CPU cores, lookup tables stored in large low-latency caches, and SIMD (Single Instruction Multiple Data) processor extensions for carrying out highly efficient physical layer processing on general-purpose multiple-core processors. Some exemplary implementations described herein include an SDR that seamlessly interoperates with commercial 802.11a/b/g network interface controllers (NICs), and achieve performance that is equivalent to that of commercial NICs at multiple different modulations.

Furthermore, some implementations are directed to a fully programmable software radio platform and system that provides the high performance of specialized SDR architectures on a general-purpose computing device, thereby resolving the SDR platform dilemma for developers. Using implementations of the SDR herein, developers can implement and experiment with high-speed wireless protocol stacks, e.g., IEEE 802.11a/b/g/n, using general-purpose computing devices. For example, using implementations herein, developers are able to program in familiar programming environments with powerful programming and debugging tools on standard operating systems. Software radios implemented on the SDR herein may appear like any other network device, and users are able to run unmodified applications on the software radios herein while achieving performance similar to commodity hardware radio devices.

Additionally, to meet physical layer (PHY) processing requirements, implementations of the SDR herein leverage various features of multi-core architectures in commonly available general-purpose processors. Implementations of the SDR herein also include a software arrangement that explicitly supports streamlined processing to enable components of a signal-processing pipeline to efficiently span multiple cores. For example, implementations herein change the conventional implementation of PHY components to extensively take advantage of lookup tables (LUTs), thereby trading off memory in place of computation, which results in reduced processing time and increased performance. For instance, implementations herein substantially reduce the computational requirements of PHY processing by utilizing large, low-latency caches available on conventional GPPs to store the LUTs that have been previously computed. In addition, implementations of the SDR herein use SIMD (Single Instruction Multiple Data) extensions in existing processors to further accelerate PHY processing. Furthermore, to meet the real-time requirements of high-speed wireless protocols, implementations of the SDR herein provide a new kernel service, core dedication, which allocates processor cores exclusively for real-time SDR tasks. The core dedication can be used to guarantee the computational resources and precise timing control necessary for SDR on a general-purpose computing device. Thus, implementations of the SDR herein are able fully support the complete digital processing of high-speed radio protocols, such as 802.11a/b/g/n, CDMA, GSM, WiMax and various other radio protocols, while using a general purpose computing device. Further, it should be noted that while various radio protocols are discussed in the examples herein, the implementations herein are not limited to any particular radio protocol.

Architecture Implementations

FIG. 1 illustrates an exemplary architecture of an SDR platform and system 100 according to some implementations herein. The SDR platform and system 100 includes one or more multi-core processors 102 having a plurality of cores 104. In the illustrated implementation, multi-core processor 102 has eight cores 104-1, . . . , 104-8, but other implementations herein are not limited to any particular number of cores. Each core 104 includes one or more corresponding onboard local caches 106-1, . . . , 106-8 that are used by the corresponding core 104-1, . . . 104-8, respectively, during processing. Additionally, multi-core processor 102 may also include one or more shared caches 108 and a bus interface 110. Examples of suitable multi-core processors include the Xenon™ processor available from Intel Corporation of Santa Clara, Calif., USA, and the Phenom™ processor available from Advanced Micro Devices of Sunnyvale, Calif., USA, although implementations herein are not limited to any particular multi-core processor. In the example illustrated, two of the cores, cores 104-5 and 104-6 are performing processing for the SDR, while the remaining cores 104-1 through 104-4 and 104-7 through 104-8 are performing processing for other applications, the operating system, or the like, as will be described additionally below. Further, in some implementations, two or more multi-core processors 102 can be provided, and cores 104 across the two or more multi-core processors can be used for SDR processing.

Multi-core processor 102 is in communication via bus interface 110 with a high-throughput, low-latency bus 112, and thereby to a system memory 114. As mentioned above, bus 112 may be a PCIe bus or other suitable bus having a high data throughput with low latency. Further, bus 112 is also in communication with a radio control board (RCB) 116. As is discussed further below, radio control board 116 may be coupled to an interchangeable radio front end (RF front end) 118. The RF front end 118 is a hardware module that receives and/or transmits radio signals through an antenna (not shown in FIG. 1). In some implementations of the SDR architecture herein, the RF front end 118 represents a well-defined interface between the digital and analog domains. For example, in some implementations, RF front end 118 may contain analog-to-digital (A/D) and digital-to-analog (D/A) converters, and necessary circuitry for radio frequency transmission, as is discussed further below.

During receiving, the RF front end 118 acquires an analog RF waveform 120 from the antenna, possibly down-converts the waveform to a lower frequency, and then digitizes the analog waveform into discrete digital samples 122 before transferring the digital samples 122 to the RCB 116. During transmitting, the RF front end 118 accepts a synchronous stream of software-generated digital samples 122 from a software radio stack 124 (i.e., software that generates the digital samples, as discussed below), and synthesizes the corresponding analog waveform 120 before emitting the waveform 120 via the antenna. Since all signal processing is done in software on the multi-core processor 102, the design of RF front end 118 can be rather generic. For example, RF front end 118 can be implemented in a self-contained module with a standard interface to the RCB 116. Multiple wireless technologies defined on the same frequency band can use the same RF front end hardware 118. Furthermore, various different RF front ends 118 designed for different frequency bands can be coupled to radio control board 116 for enabling radio communication on various different frequency bands. Therefore, implementations herein are not limited to any particular frequency or wireless technology.

According to some implementations herein, RCB 116 is a PC interface board optimized for establishing a high-throughput, low-latency path for transferring high-fidelity digital signals between the RF front end 118 and memory 114. The interfaces and connections between the radio front end 118 and multi-core processor 102 must enable sufficiently high throughput to transfer high-fidelity digital waveforms. For instance, in order to support a 20 MHz channel for 802.11 protocol, the interfaces should sustain at least 1.28 Gbps. By way of comparison, conventional interfaces, such as USB 2.0 (≤480 Mbps) or Gigabit Ethernet (≤1 Gbps) are not able to meet this requirement. Accordingly, to achieve the required system throughput, some implementations of the RCB 116 use a high-speed, low-latency bus 112, such as PCIe. With a maximum throughput of 64 Gbps (e.g., PCIe x32) and sub-microsecond latency, PCIe is easily able to support multiple gigabit data rates for sending and receiving wireless signals over a very wide band or over many MIMO channels. Further, the PCIe interface is typically common in many conventional general-purpose computing devices.

A role of the RCB 116 is to act as a bridge between the synchronous data transmission at the RF front end 118 and the asynchronous processing on the processor 102. The RCB 116 implements various buffers and queues, together with a large onboard memory, to convert between synchronous and asynchronous streams and to smooth out bursty transfers between the RCB 116 and the system memory 114. The large onboard memory further allows caching of pre-computed waveforms for quick transmission of the waveforms, such as when acknowledging reception of a transmission, thereby adding additional flexibility for software radio processing.

Finally, the RCB 116 provides a low-latency control path for software to control the RF front end hardware 118 and to ensure that the RF front end 118 is properly synchronized with the processor 102. For example, wireless protocols have multiple real-time deadlines that need to be met. Consequently, not only is processing throughput a critical requirement, but the processing latency should also meet certain response deadlines. For example, some Media Access Control (MAC) protocols also require precise timing control at the granularity of microseconds to ensure certain actions occur at exactly pre-scheduled time points. The RCB 116 of implementations herein also provides for such low latency control. Additional details of implementations of the RCB 116 are described further below.

Exemplary Computing Device Implementation

Figure 2:
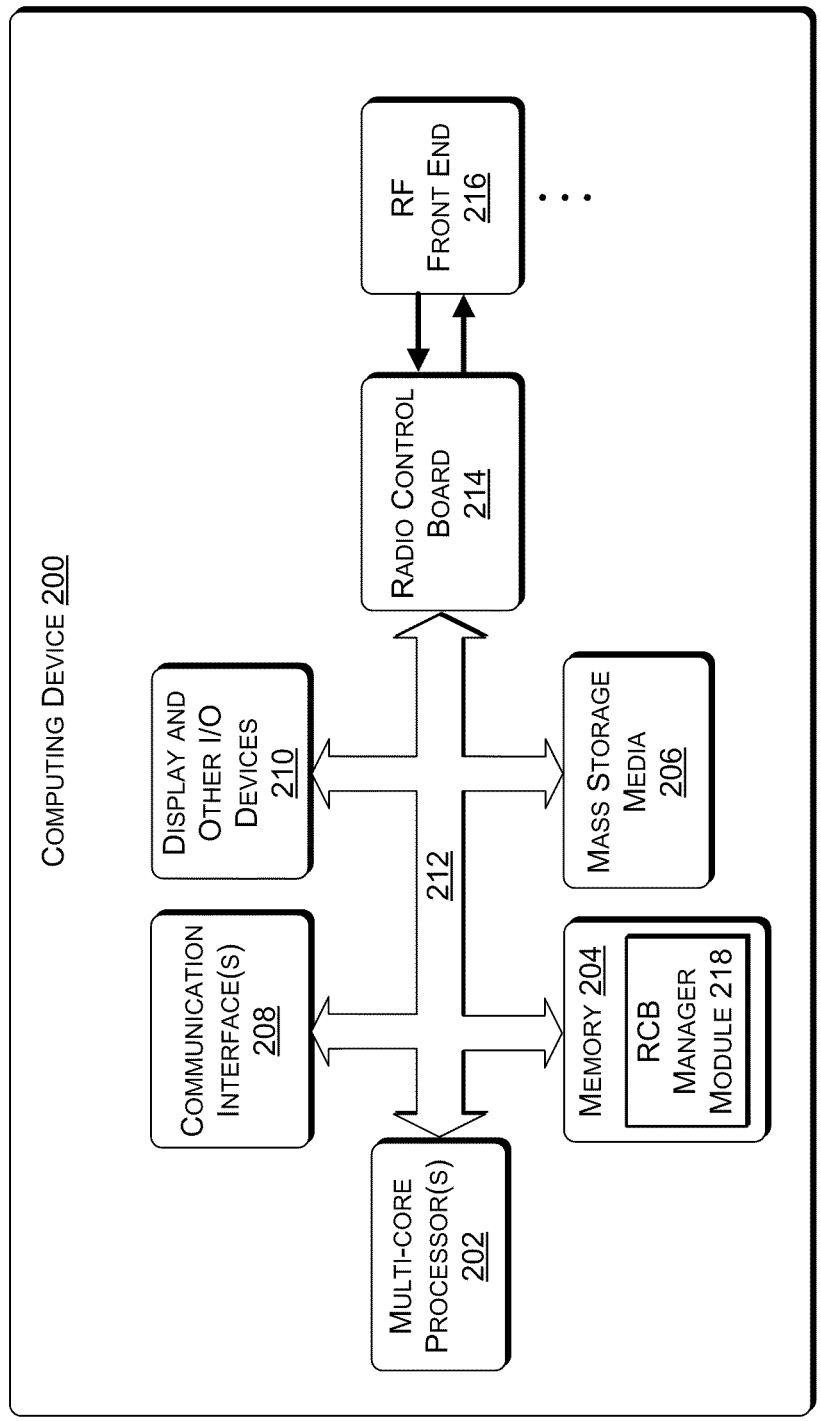
FIG. 2 illustrates an exemplary hardware and logical configuration of a computing device according to some implementations.

FIG. 2 illustrates an exemplary depiction of a computing device 200 that can be used to implement the SDR implementations described herein, such as the SDR platform and system 100 described above with reference to FIG. 1. The computing device 200 includes one or more multi-core processors 202, a memory 204, one or more mass storage devices or media 206, communication interfaces 208, and a display and other input/output (I/O) devices 210 in communication via a system bus 212. Memory 204 and mass storage media 206 are examples of computer-readable storage media able to store instructions which cause computing device 200 to perform the various functions described herein when executed by the processor(s) 202. For example, memory 204 may generally include both volatile memory and non-volatile memory (e.g., RAM, ROM, or the like). Further, mass storage media 206 may generally include hard disk drives, solid-state drives, removable media, including external and removable drives, memory cards, Flash memory, or the like. The computing device 200 can also include one or more communication interfaces 208 for exchanging data with other devices, such as via a network, direct connection, or the like, as discussed above. The display and other input/output devices 210 can include a specific output device for displaying information, such as a display, and various other devices that receive various inputs from a user and provide various outputs to the user, and can include, for example, a keyboard, a mouse, audio input/output devices, a printer, and so forth.

Computing device 200 further includes radio control board 214 and RF front end 216 for implementing the SDR herein. For example, system bus 212 may be a PCIe compatible bus, or other suitable high throughput, low latency bus. Radio control board 214 and RF front end 216 may correspond to radio control board 116 and RF front end 118 described above with reference to FIG. 1, and as also described below, such as with reference to FIG. 3. Furthermore, an RCB control module 218 may be stored in memory 204 or other computer-readable storage media for controlling operations on RCB 214, as is described additionally below. The computing device 200 described herein is only one example of a computing environment and is not intended to suggest any limitation as to the scope of use or functionality of the computer architectures that can implement the SDR herein. Neither should the computing device 200 be interpreted as having any dependency or requirement relating to any one or combination of components illustrated in the computing device 200.

Furthermore, implementations of SDR platform and system 100 described above can be employed in many different computing environments and devices for enabling a software-defined radio in addition to the example of computing device 200 illustrated in FIG. 2. Generally, many of the functions described with reference to the figures can be implemented using software, hardware (e.g., fixed logic circuitry), manual processing, or a combination of these implementations. The term "logic", "module" or "functionality" as used herein generally represents software, hardware, or a combination of software and hardware that can be configured to implement prescribed functions. For instance, in the case of a software implementation, the term "logic," "module," or "functionality" can represent program code (and/or declarative-type instructions) that perform specified tasks when executed on a processing device or devices (e.g., CPUs or processors). The program code can be stored in one or more computer readable memory devices, such as memory 204 and/or mass storage media 206, or other computer readable storage media. Thus, the methods and modules described herein may be implemented by a computer program product. The computer program product may include computer-readable media having a computer-readable program code embodied therein. The computer-readable program code may be adapted to be executed by one or more processors to implement the methods and/or modules of the implementations described herein. The terms "computer-readable storage media", "processor-accessible storage media", or the like, refer to any kind of machine storage medium for retaining information, including the various kinds of memory and storage devices discussed above.

Radio Control Board

Figure 3:
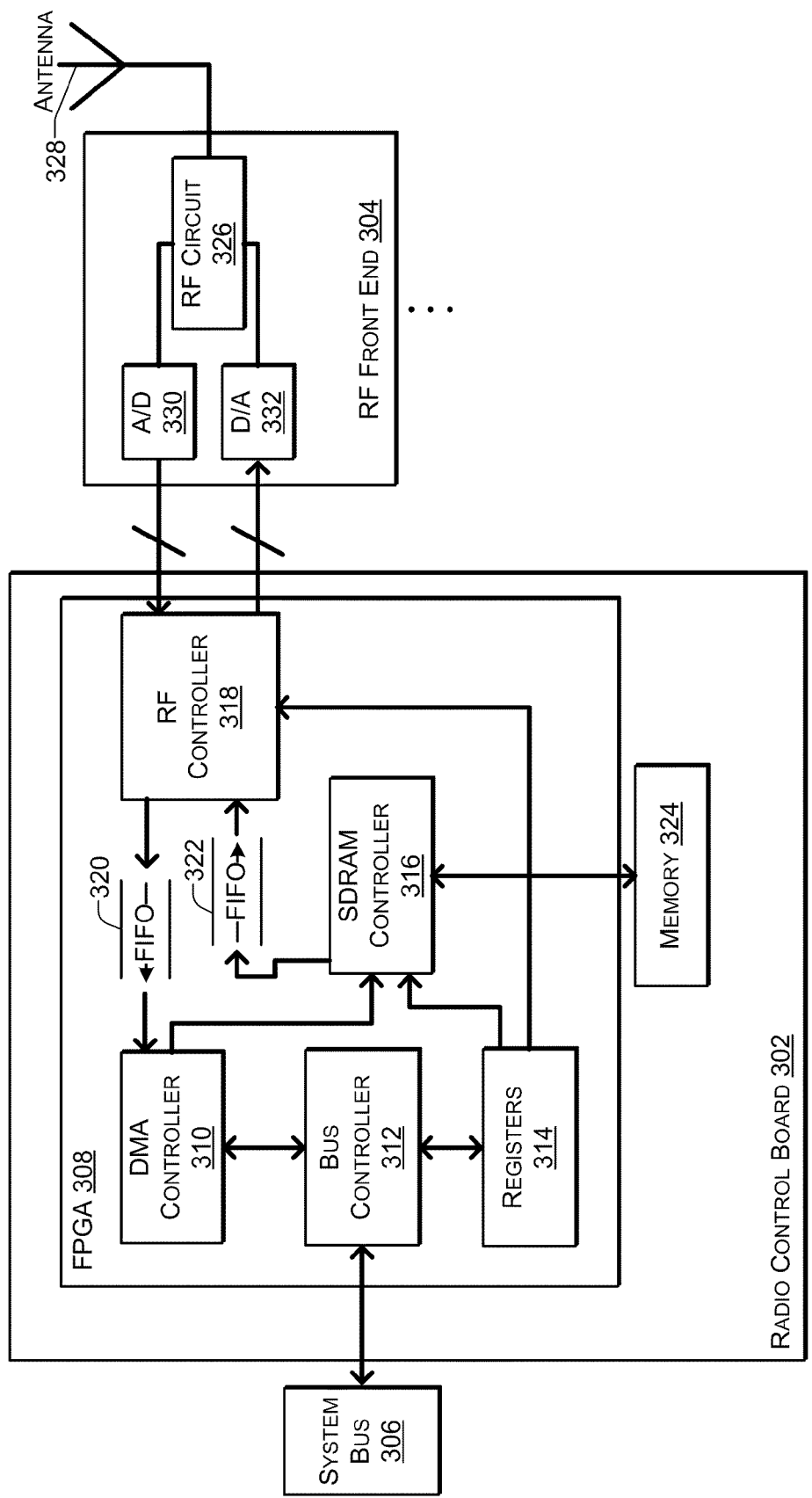
FIG. 3 illustrates a representation of an exemplary radio control board and RF front end according to some implementations.

FIG. 3 illustrates an exemplary implementation of a radio control board (RCB) 302 and RF front end 304, that may correspond to the RCB 116, 214 and RF front end 118, 216 described above. In the example illustrated, RCB 302 includes functionality for controlling the transfer of data between the RF front end 304 and a system bus 306, such as buses 112, 212 discussed above. In the illustrated implementation, the functionality is a field-programmable gate array (FPGA) 308, which may be a Virtex-5 FPGA available from Xilinx, Inc., of San Jose, Calif., USA, one or more other suitable FPGAs, or other equivalent circuitry configured to accomplish the functions described herein. RCB 302 includes a direct memory access (DMA) controller 310, a bus controller 312, registers 314, an SDRAM controller 316, and an RF controller 318. RCB 302 further includes a first FIFO buffer 320 for acting as a first FIFO for temporarily storing digital samples received from RF front end 304, and a second FIFO buffer 322 for temporarily storing digital samples to be transferred to RF front end 304. The DMA controller 310 controls the transfer of received digital samples to the system bus 306 via the bus controller 312. SDRAM controller 316 controls the storage of data in onboard memory 324, such as digital samples, pre-generated waveforms, and the like. As an example only, memory 324 may consist of 256 MB of DDR2 SDRAM.

The RCB 302 can connect to various different RF front ends 304. One suitable such front end 304 is available from Rice University, Houston, Tex., USA, and is referred to as the Wireless Open-Access Research Platform (WARP) front end. The WARP front end is capable of transmitting and receiving a 20 MHz channel at 2.4 GHz or 5 GHz. In some implementations, RF front end 304 includes an RF circuit 326 configured as an RF transceiver for receiving radio waveforms from an antenna 328 and for transmitting radio waveforms via antenna 328. RF front end 304 further may include an analog-to-digital converter 330 and a digital-to-analog converter 332. As discussed above, analog-to-digital converter 330 converts received radio waveforms to digital samples for processing, while digital-to-analog converter 332 converts digital samples generated by the processor to radio waveforms for transmission by RF circuit 326. Furthermore, it should be noted that implementations herein are not limited to any particular front end 304, and in some implementations, the entire front end 304 may be incorporated into RCB 302. Alternatively, in other implementations, analog-to-digital converter 330 and digital-to-analog converter 332 may be incorporated into RCB 302, and RF front end 304 may merely have an RF circuit 326 and antenna 328. Other variations will also be apparent in view of the disclosure herein.

In the implementation illustrated in FIG. 3, the DMA controller 310 and bus controller 312 interface with the memory and processor on the computing device (not shown in FIG. 3) and transfer digital samples between the RCB 302 and the system memory on the computing device, such as memory 114, 204 discussed above. RCB software control module 218 discussed above with reference to FIG. 2 sends commands and reads RCB states through RCB registers 314. The RCB 302 further uses onboard memory 324 as well as small FIFO buffers 320, 322 on the FPGA 308 to bridge data streams between the processor on the computing device and the RF front end 304. When receiving radio waveforms, digital signal samples are buffered in on-chip FIFO buffer 320 and delivered into the system memory on the computing device when the digital samples fit in a DMA burst (e.g., 128 bytes). When transmitting radio waveforms, the large RCB memory 324 enables implementations of the RCB manager module 218 (e.g., FIG. 2) to first write the generated samples onto the RCB memory 324, and then trigger transmission with another command to the RCB. This functionality provides flexibility to the implementations of the SDR manager module 218 for pre-calculating and storing of digital samples corresponding to several waveforms before actually transmitting the waveforms, while allowing precise control of the timing of the waveform transmission.

It should be noted that in some implementations of the SDR herein, a consistency issue may be encountered in the interaction between operations carried out by DMA controller 310 and operations on the processor cache system. For example, when a DMA operation modifies a memory location that has been cached in the processor cache (e.g., L2 or L3 cache), the DMA operation does not invalidate the corresponding cache entry. Accordingly, when the processor reads that location, the processor might read an incorrect value from the cache. One naive solution is to disable cached accesses to memory regions used for DMA, but doing so will cause a significant degradation in memory access throughput.

Figure 4:
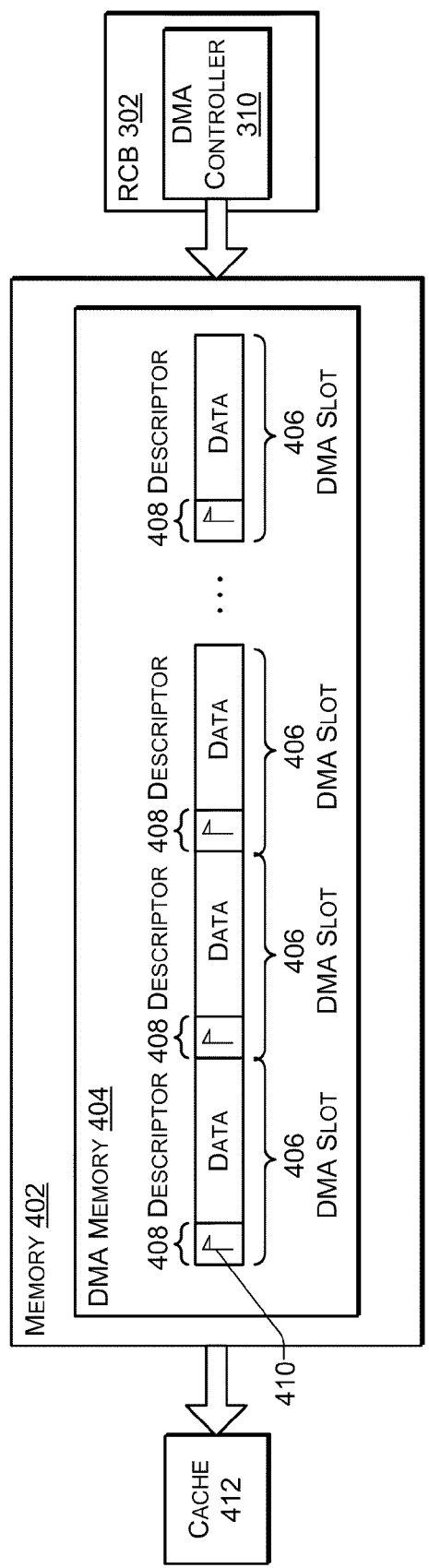
FIG. 4 illustrates exemplary DMA memory access according to some implementations.

As illustrated in FIG. 4, implementations herein address this issue by using a smart-fetch strategy, thereby enabling implementations of the SDR to maintain cache coherency with DMA memory without drastically sacrificing throughput. FIG. 4 illustrates a memory 402 which may correspond to system memory 114, 204 discussed above, and which includes a portion set aside as DMA memory 404 that can be directly accessed by DMA controller 310 on the RCB 302 for storing digital samples as data. In some implementations, the SDR organizes DMA memory 404 into small slots 406, whose size is a multiple of the size of a cache line. Each slot 406 begins with a descriptor 408 that contains a flag 410 or other indicator to indicate whether the data has been processed. The RCB 302 sets the flag 410 after DMA controller 310 writes a full slot of data to DMA memory 404. The flag 410 is cleared after the processor processes all data in the corresponding slot in the cache 412, which may correspond to caches 106 and/or 108 described above. When the processor moves to a cache location corresponding to a new slot 406, the processor first reads the descriptor of the slot 406, causing a whole cache line to be filled. If the flag 410 is set (e.g., a value of "1"), the data just fetched is valid and the processor can continue processing the data. Otherwise, if the flag is not set (e.g., a value of "0"), the DMA controller on the RCB has not updated this slot 406 with new data, and the processor explicitly flushes the cache line and repeats reading the same location. The next read refills the cache line, loading the most recent data from DMA memory 404. Accordingly, the foregoing process ensures that the processor does not read an incorrect value from the cache 412. Furthermore, while an exemplary RCB 302 has been illustrated and described, it will be apparent to those of skill in the art in light of the disclosure here in that various other implementations of the RCB 302 also fall within the scope of the disclosure herein.

SDR Software Implementations

Figure 5:
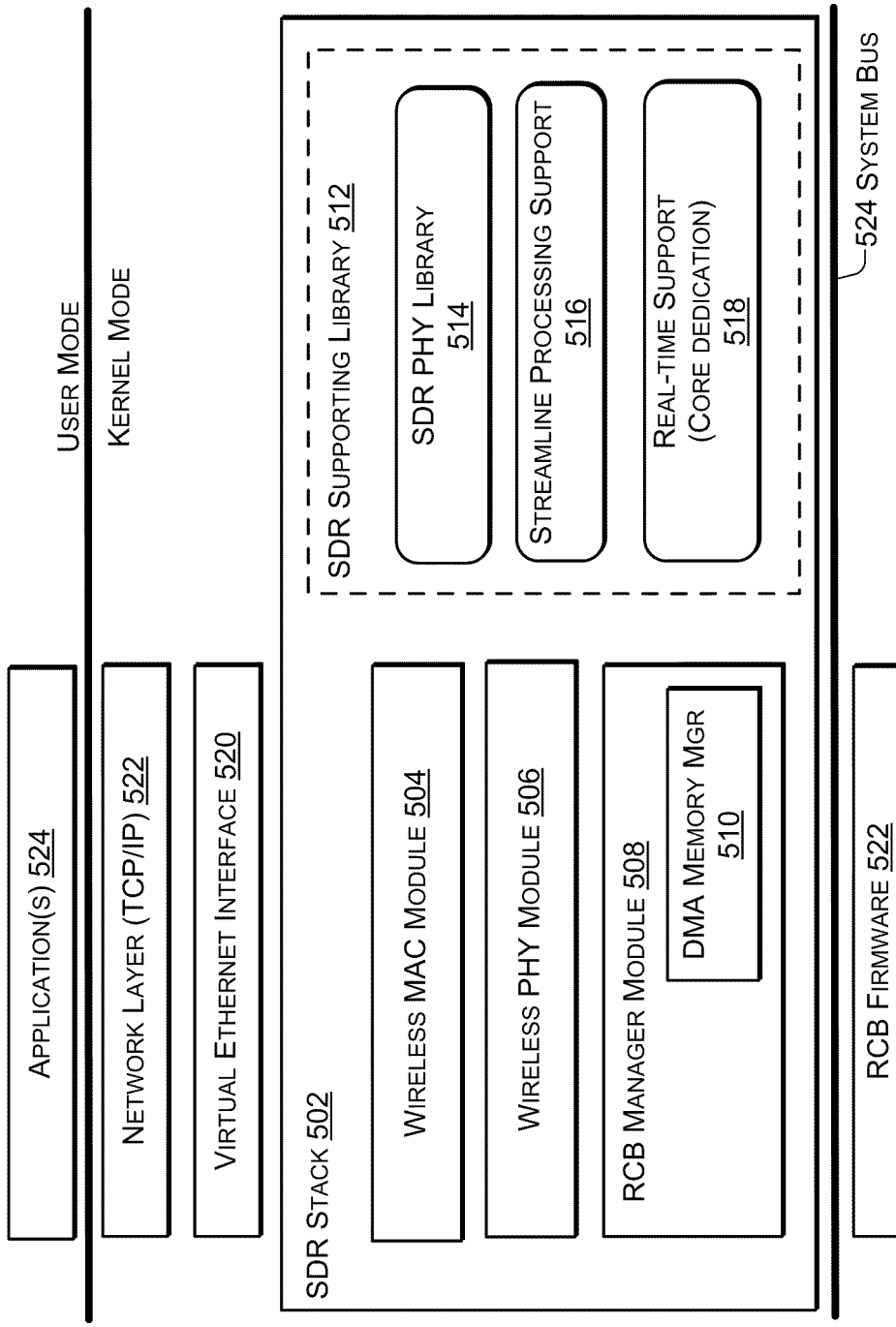
FIG. 5 illustrates an exemplary logical configuration according to some implementations.

FIG. 5 illustrates an exemplary implementation of a software and logical architecture of the SDR herein showing a number of software components and a logical arrangement of the SDR. An SDR stack 502 includes a wireless MAC layer module 504, a wireless physical layer (PHY) module 506, and an RCB manager module 508 that includes a DMA memory manager 510, and that may correspond to RCB manager 218, discussed above. These components provide for system support, including driver framework, memory management, streamline processing, and the like. The role of the PHY module 506 is to convert information bits into a radio waveform, or vice versa. The role of the MAC layer module 504 is to coordinate transmissions in wireless networks to avoid collisions. Also included is an SDR supporting library 512 that includes an SDR physical layer (PHY) library 514, streamline processing support 516 and real-time support 518 (e.g., for ensuring core dedication, as discussed additionally below). The SDR stack software components may exist at various times in system memory, cache, and/or mass storage or other computer readable storage media, as is known in the art.

The software components in implementations of the SDR herein provide necessary system services and programming support for implementing various wireless PHY and MAC protocols in a general-purpose operating system, such as Windows® XP, Windows Vista®, Windows® 7, Linux®, Mac OS® X, or other suitable operating system. In addition to facilitating the interaction with the RCB, the implementations of the SDR stack 502 provide a set of techniques to greatly improve the performance of PHY and MAC processing on a general-purpose processor. To meet the processing and real-time requirements, these techniques make full use of various features in multi-core processor architectures, including the extensive use of lookup tables (LUTs), substantial data-parallelism with processor SIMD extensions, the efficient partitioning of streamlined processing over multiple cores, and exclusive dedication of cores for software radio tasks.

Implementations of the SDR software may be written in any suitable programming language(s). For example, in some implementations, the software may be written in C, with, additionally, some assembly language for performance-critical processing. Further, some implementations of the SDR stack 502 may be implemented as a network device driver on a general-purpose operating system. Thus, RCB manager module 508 functions as a driver in the operating system for operating and managing the RCB and may include a PCIe driver for enabling use of the PCIe system bus. The SDR stack 502 exposes a virtual Ethernet interface 520 to the upper TCP/IP layer 522 of the kernel side, thereby enabling the SDR to appear and function as a network device. Since any software radio implemented on the SDR herein can appear as a normal network device, all existing network applications 524 used by a user are able to execute and interact with the SDR in an unmodified form. Further, on the other end, the SDR stack logically interacts with RCB firmware 522 via the system bus 524, which may be a PCIe system bus, as discussed above.

In some implementations of the SDR herein, SDR PHY processing library 514 extensively exploits the use of lookup tables (LUTs) and SIMD instructions to optimize the performance of PHY algorithms. For example, more than half of the PHY algorithms can be replaced with LUTs. Some LUTs are straightforward pre-calculations, others require more sophisticated implementations to keep the LUT size small. For instance, in the soft-demapper example discussed below, the LUT size (e.g., 1.5 KB for 802.11a/g 54 Mbps modulation) can be greatly reduced by exploiting the symmetry of the algorithm. Further, in the exemplary WiFi implementation described below, the overall size of the LUTs used in 802.11a/g is around 200 KB and in 802.11b is around 310 KB, both of which fit comfortably within the L2 caches of conventional multi-core processors.

Further, as discussed above, some implementations use SIMD (Single Instruction Multiple Data) instructions, such as the SSE2 (Streaming SMID Extensions 2) instruction set designed for Intel CPUs for speeding parallel processing of large numbers of data points, such as when processing digital samples. Since the SSE registers are 128 bits wide while most PHY algorithms require only 8-bit or 16-bit fixed-point operations, one SSE instruction can perform 8 or 16 simultaneous calculations. SSE2 also has rich instruction support for flexible data permutations, and most PHY algorithms, e.g., Fast Fourier Transform (FFT), Finite Impulse Response (FIR) Filter and Viterbi decoder algorithms, can fit naturally into this SIMD model. For example, the implementations of the Viterbi decoder according to the SDR herein uses only 40 cycles to compute the branch metric and select the shortest path for each input. As a result, Viterbi implementations can handle 802.11a/g at 54 Mbps modulation using only one 2.66 GHz CPU core in a multi-core processor, whereas conventional designs had to rely on specialized hardware implementations.

Additionally, it should be noted that other brands of processor architectures, such processors available from AMD, and PowerPC® processors available from Apple Inc. of Cupertino, Calif., USA, have very similar SIMD models and instruction sets that can be similarly utilized. For example, AMD's Enhanced 3DNow!® processor includes an SSE instruction set plus a set of DSP (Digital Signal Processor) extensions. The optimization techniques described herein can be directly applied to these and other GPP architectures as well. An example of a functional block using SIMD instruction optimizations is discussed further below.

Figure 6A:
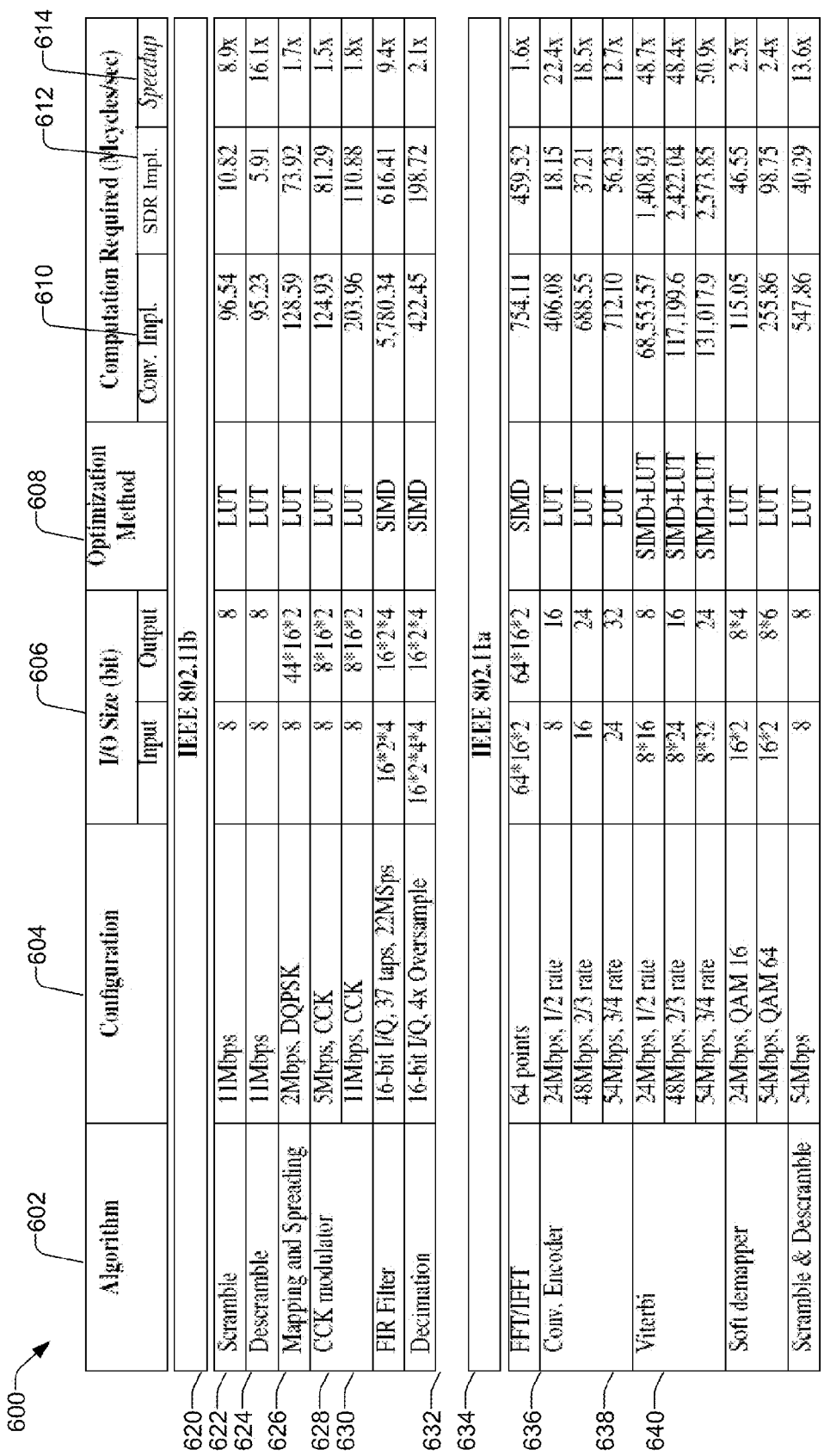
FIG. 6A illustrates an algorithm optimization table according to some implementations.

FIG. 6A illustrates an algorithm optimization table 600 that summarizes some PHY processing algorithms implemented in the SDR herein, together with the LUT and SIMD optimization techniques applied for improving the processing speed. The algorithm table 600 includes an algorithm identification column 602, a configuration column 604, and I/O size column 606, an optimization method column 608, number of computations required for a conventional implementation column 610, computations required for the SDR implementation 612, and the amount of speed up 614 gained by the optimization. For example, for the IEEE 802.11b standard, algorithms that maybe optimize using LUTs according to the SDR herein include the scramble algorithm 620, the descramble algorithm 622, the mapping and spreading algorithm 624, and the CCK (Complementary Code Keying) modulator algorithm 626, while algorithms that maybe optimized using SIMD extensions include the FIR filter 628, and the decimation algorithm 630. Additionally, for the IEEE 802.11a standard, algorithms that maybe optimized using SIMD extensions include the FFT/IFFT (Fast Fourier Transform/Inverse Fast Fourier Transform) algorithm 632, algorithms that may be optimized using LUTs according to the SDR herein include the convolutional encoder algorithm 634, the Viterbi algorithm 636, the soft demapper algorithm 638, and the scramble and descramble algorithms 640. Further, the Viterbi algorithm 636 may also be further optimized using SIMD extensions.

Figure 6B:
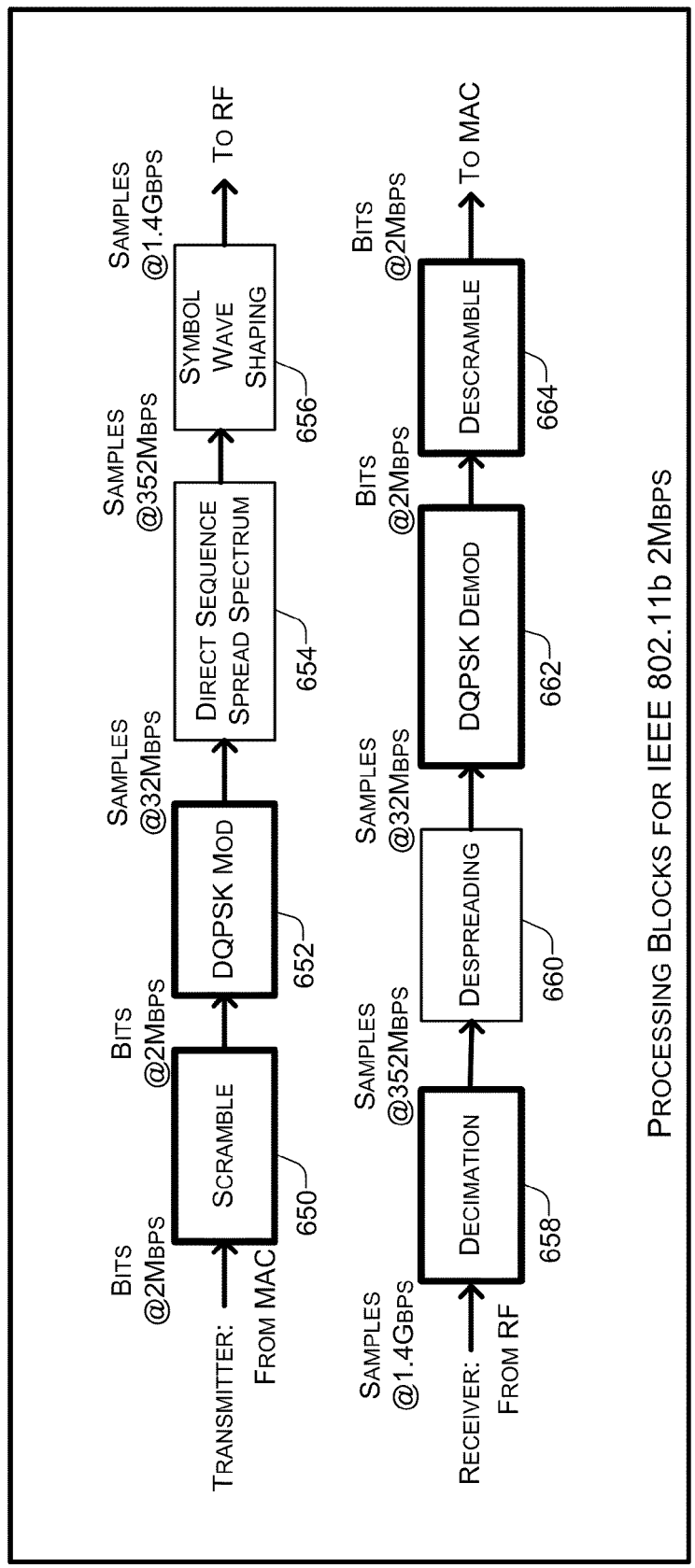
FIG. 6B illustrates optimized PHY blocks according to some implementations.

FIG. 6B illustrates an example of PHY operations for IEEE 802.11b at 2 Mbps, further showing examples of functional blocks that are optimized according to some implementations here, as discussed above with reference to FIG. 6A. The role of the PHY layer is to convert information bits into a radio waveform, or vice versa. As illustrated in FIG. 6B, at the transmitter side, the wireless PHY component first modulates the message (i.e., a packet or a MAC frame) into a time sequence of baseband signals. Baseband signals are then passed to the radio front end, where they are multiplied by a high frequency carrier and transmitted into the wireless channel. In the illustrated example, the data from the MAC goes to a scramble block 650, a DQPSK modulator block 652, a direct sequence spread spectrum block 654, a symbol wave shaping block 656, and then is passed to the RF front end. At the receiver side, the RF front end detects signals in the channel and extracts the baseband signal by removing the high-frequency carrier. The extracted baseband signal is then fed into the receiver's PHY layer to be demodulated into the original message. In the illustrated example, the signal from the RF front end is passed to a decimation block 658, a despreading block 660, a DQPSK demodulator block 662, a descramble block 664, and then to the MAC layer. Accordingly, advanced communication systems (e.g., IEEE 802.11a/b/g) contain multiple functional blocks in their PHY components. These functional blocks are pipelined with one another. Data is streamed through these blocks sequentially, but with different data types and sizes. For instance, as illustrated in FIG. 6B, different blocks may consume or produce different types of data at different rates arranged in small data blocks. For example, in 802.11b, as illustrated in FIG. 6B, the scrambler block 650 may consume and produce one bit, while DQPSK modulation block 652 maps each two-bit data block onto a complex symbol which uses two 16-bit numbers to represent the in-phase and quadrature (I/Q) components.

Each PHY block performs a fixed amount of computation on every transmitted or received bit. When the data rate is high, e.g., 11 Mbps for 802.11b and 54 Mbps for 802.11a/g, PHY processing blocks consume a significant amount of computational power. It is estimated that a direct implementation of 802.11b may require 10 Gops while 802.11a/g requires at least 40 Gops. These requirements are very demanding for software processing in GPPs.

PHY processing blocks directly operate on the digital waveforms after modulation on the transmitter side and before demodulation on the receiver side. Therefore, high-throughput interfaces are desired to connect these processing blocks as well as to connect the PHY with the radio front end. The required throughput linearly scales with the bandwidth of the baseband signal. For example, the channel bandwidth is 20 MHz in 802.11a. This requires a data rate of at least 20 Million complex samples per second to represent the waveform. These complex samples normally require 16-bit quantization for both I and Q components to provide sufficient fidelity, translating into 32 bits per sample, or 640 Mbps for the full 20 MHz channel. Over-sampling, a technique widely used for better performance, doubles the requirement to 1.28 Gbps to move data between the RF frond-end and PHY blocks for one 802.11a channel.

As discussed above with reference to FIG. 6A, in order to speed up processing of some blocks, implementations herein optimize certain functional blocks by using LUT and SIMD optimization techniques discussed above. In the illustrated example of FIG. 6B, as shown in bold, scramble block 650, descramble block 664, and DQPSK Modulator and DQPSK demodulator blocks 624 are optimized using LUTs stored in cache on the processor, corresponding to scramble algorithm 620, descramble algorithm 622, and mapping and spreading algorithm 624 discussed above with respect to FIG. 6A. Further, decimation block 658 is optimized using SIMD processor extensions corresponding to decimation algorithm 630 discussed above with respect to FIG. 6A.

Figure 6C:
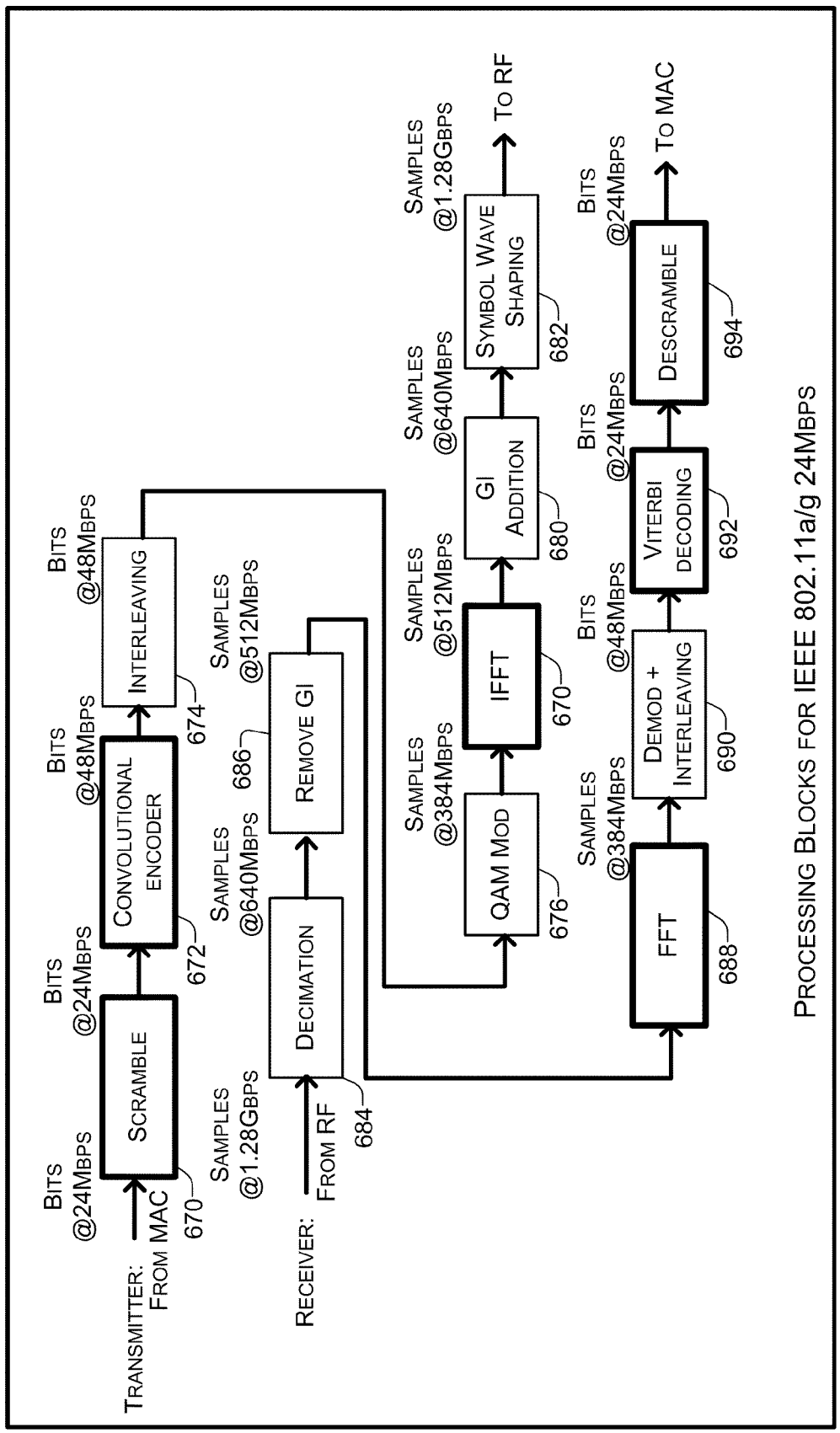
FIG. 6C illustrates optimized PHY blocks according to some implementations.

Similarly, FIG. 6C illustrates an example of PHY operations for IEEE 802.11b at 2 Mbps, showing in bold which functional blocks are optimized according to some implementations here, as discussed above with reference to FIG. 6A. On the transmitter side, the data received from the MAC layer is passed to a scramble block 670, convolutional encoder block 672, an interleaving block 674, a QAM modulator block 676, an IFFT block 670, a GI addition block 680, a symbol wave shaping block 682, and then is passed to the RF front end. On the receiver side, the signal from the RF front end is passed to a decimation block 684, a remove GI block 686, an FFT block 688, a demodulating and interleaving block 690, a Viterbi decoding block 692, a descramble block 694, and then to the MAC processing. In order to speed up processing of some blocks, implementations herein optimize certain blocks by using LUT and SIMD optimization techniques discussed above with respect to FIG. 6A. In the illustrated example of FIG. 6C, scramble block 670 and descramble block 694 are optimized using LUTs stored in cache on the processor corresponding to scramble and descramble algorithm 640 discussed above; FFT Block 688 and IFFT block 670 are optimized using SIMD processor extensions corresponding to FFT/IFFT algorithm 632 discussed above; convolutional encoder block 672 is optimized using LUTs corresponding to convolutional encoder algorithm 634 discussed above; and Viterbi decoding block 692 is optimized using both LUTs and SIMD processor extensions corresponding to Viterbi algorithm 636 discussed above. Furthermore, in addition to the optimizations illustrated in this example, other optimization opportunities may be apparent to those of skill in the art in light of the disclosure herein.

SIMD Example Based on FIR Filter

The following provides an example of how to use SSE instructions to optimize the implementation of a FIR (Finite Impulse Response) filter in implementations of the SDR herein, corresponding to FIR filter algorithm 628 discussed above with respect to FIG. 6A, with it being understood that the optimizations of the other algorithms, such as decimation 630, may be similarly implemented. FIR filters are widely used in various PHY layers. An n-tap FIR filter is defined as follows:

$$y[t] = \Sigma_{k=0}^{n-1} c_k * x[t-k],$$

where x[.] are the input samples, y[.] are the output samples, and $c_k$ are the filter coefficients. With SIMD instructions, it is possible to process multiple samples at the same time. For example, Intel SSE supports a 128-bit packed vector and each FIR sample takes 16 bits. Therefore, it is possible to perform m=8 calculations simultaneously. To facilitate SSE processing, the data layout in memory should be carefully designed.

FIG. 7A illustrates a memory layout 700 of the FIR coefficients according to implementations herein. Each row 702-1, ..., 702-(n+m−1) forms a packed-vector containing m components for SIMD operations. The coefficient vector of the FIR filter is replicated in each column 704-1, ..., 704-m in a zigzag layout. Thus, the total number of rows is (n+m−1). There are also n temporary variables 706 containing the accumulated sum up to each FIR tap for each sample.

Figure 7B:
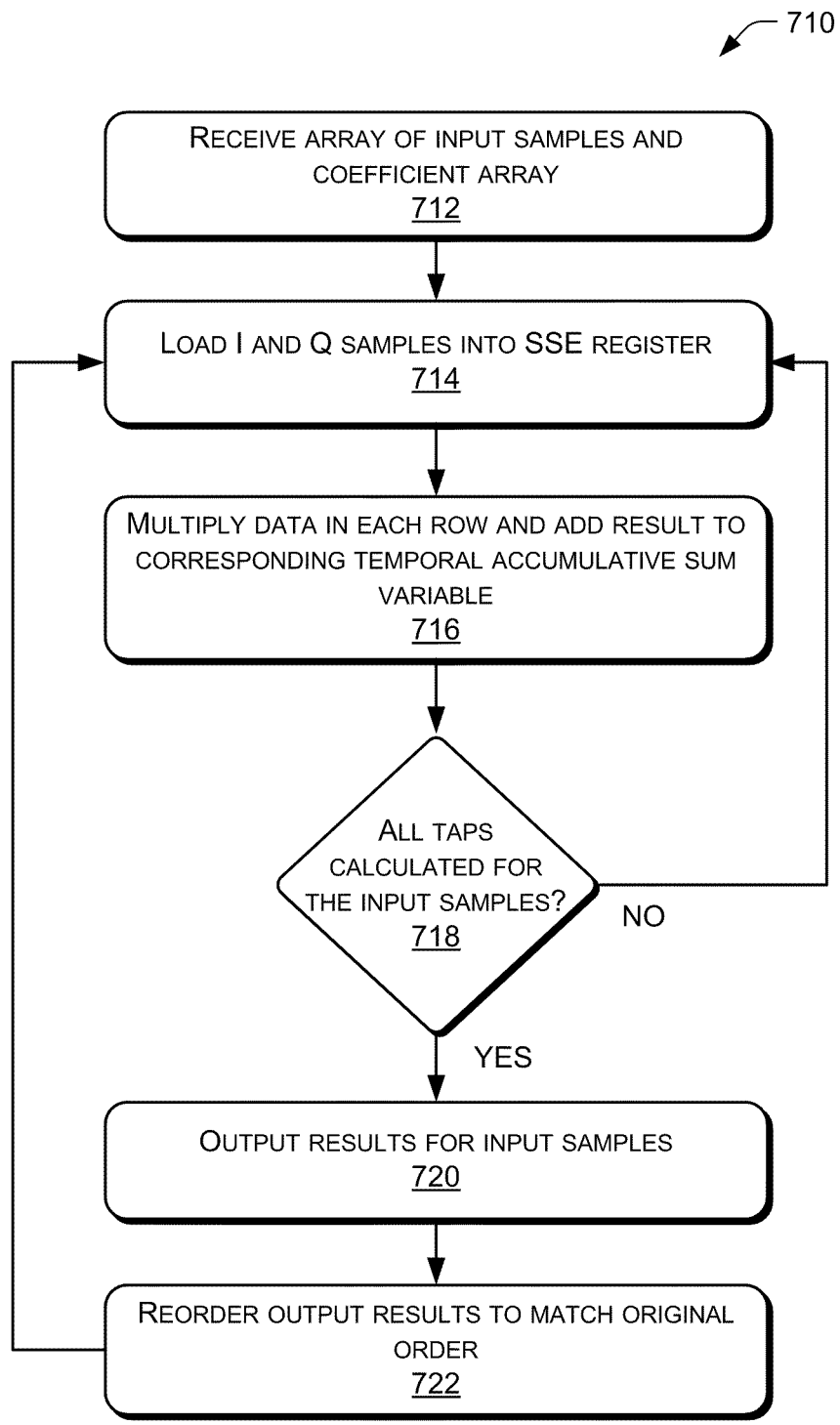
FIG. 7B illustrates a flowchart of an exemplary process for SIMD processing according to some implementations.

FIG. 7B illustrates a flowchart of an exemplary process for performing the SIMD operations of the FIR filter executed by the PHY layer of the SDR stack on a core of a multi-core processor. The process receives an array of input samples and a coefficient array, and outputs the filtered samples in an output sample buffer.

At block 712, the process receives an array of input samples and a coefficient array. The input samples contain two separate sample streams, with the even and odd indexed samples representing the I and Q samples, respectively. The coefficient array is arranged similarly to the layout of FIG. 7A, but with two sets of FIR coefficients for I and Q samples, respectively.

At block 714, for each iteration, four I and four Q samples are loaded into an SSE register.

At block 716, the process multiplies the data in each row and adds the result to the corresponding temporal accumulative sum variable.

At block 718, the process determines whether all the samples in the array of input samples have been processed to calculate all taps. If not, the process returns to block 714 to load more I and Q samples into the SSE registers.

At block 720, the results are output for the input samples when all taps have been calculated for the input samples. When the input sample stream is long, there are nm samples in the pipeline and m outputs are generated in each iteration. Note that the output samples may not be in the same order as the input samples. For example, some algorithms do not always require the output to have exactly the same order as the input.

Accordingly, at block 722, the output results can be reordered to the original order. This can be accomplished using a few shuffle instructions to place the output samples in original order, if needed. The process then returns to block 714 to continue to receive the stream of input samples from block 712 until all samples have been processed. Thus, while the foregoing provides a specific example of SIMD processing for speeding processing of digital samples in the SDR herein, it will be apparent to those of skill in the art in light of the disclosure herein that this process can be applied to optimize other SDR algorithms on one or more cores of a multi-core processor according to the implementations herein, such as the examples discussed above with respect to FIGS. 6A-6C.

High-Performance SDR Processing

Implementations of the SDR herein achieve high-performance SDR processing using software techniques that include efficient physical layer processing, multi-core streamline processing, and real-time support, each of which is described additionally below.

Efficient PHY Processing

In a memory-for-computation tradeoff, implementations of the SDR herein rely upon the large-capacity, high-speed cache memory in multi-core processors to accelerate PHY processing using pre-calculated LUTs stored in the PHY library. Contemporary processor architectures, such as Intel Core 2, usually have at least several megabytes of onboard cache with a low (e.g., 10-20 cycles) access latency. If LUTs are pre-calculated for a large portion of PHY algorithms and stored in the onboard cache for a corresponding core, this can greatly reduce the computational requirement for online processing and speed up overall processing time.

For example, the soft demapper algorithm 638 used in demodulation in the IEEE 802.11a standard needs to calculate the confidence level of each bit contained in an incoming symbol. This task involves rather complex computations proportional to the modulation density. More precisely, the soft demapper algorithm 638 conducts an extensive search for all modulation points in a constellation graph and calculates a ratio between the minimum of Euclidean distances to all points representing one and the minimum of distances to all points representing zero. In implementations of the SDR herein, the confidence levels for all possible incoming symbols are pre-calculated based on their I and Q values, and LUTs are built to directly map the input symbol to confidence level. Such LUTs need not be large. For example, in 802.11a/g with a 54 Mbps modulation rate (64-QAM), the size of the LUT for the soft demapper 638 is about 1.5 KB.

Figure 7C:
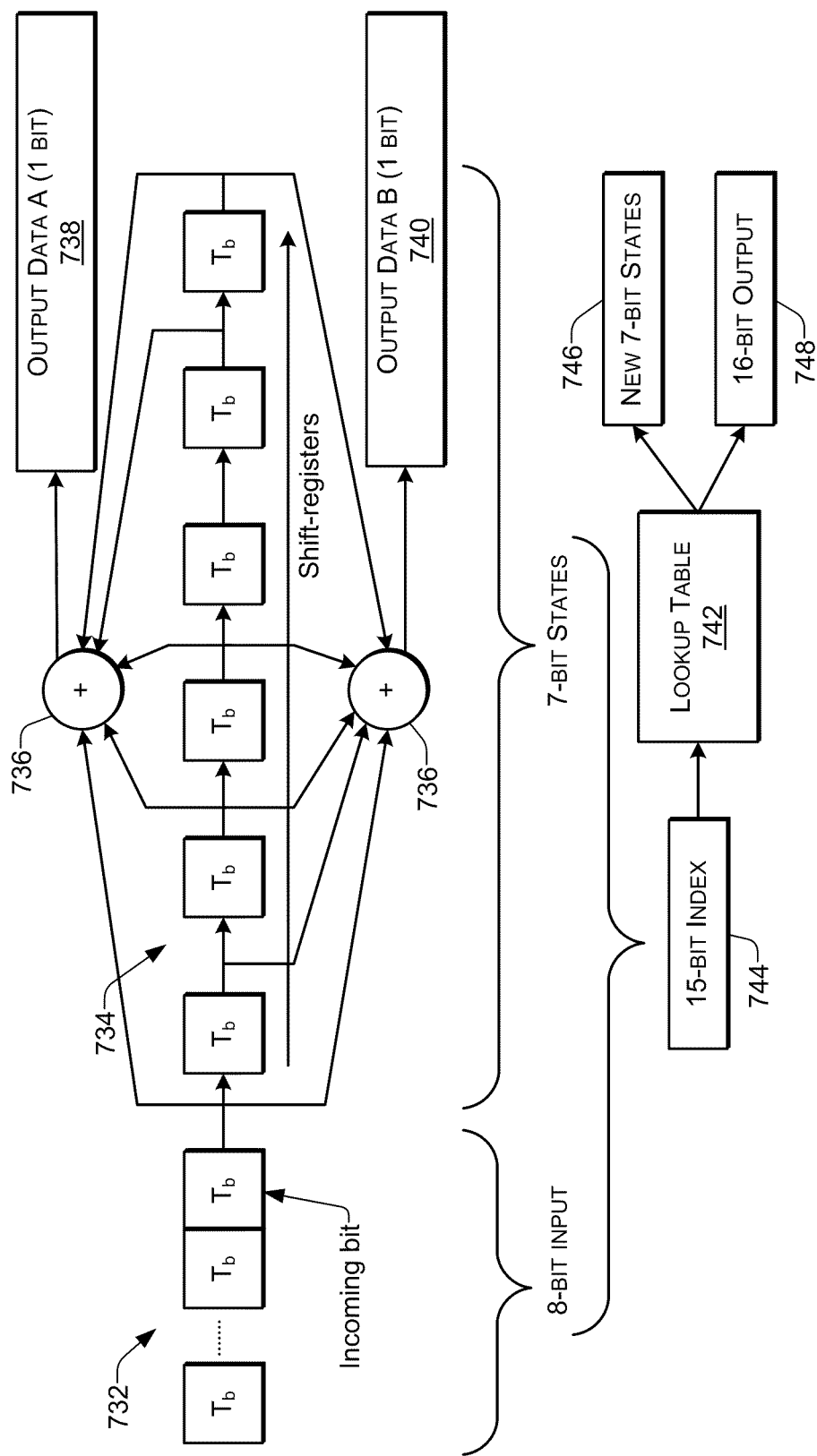
FIG. 7C illustrates an exemplary diagram showing processing using lookup tables according to some implementations.
Figure 7D:
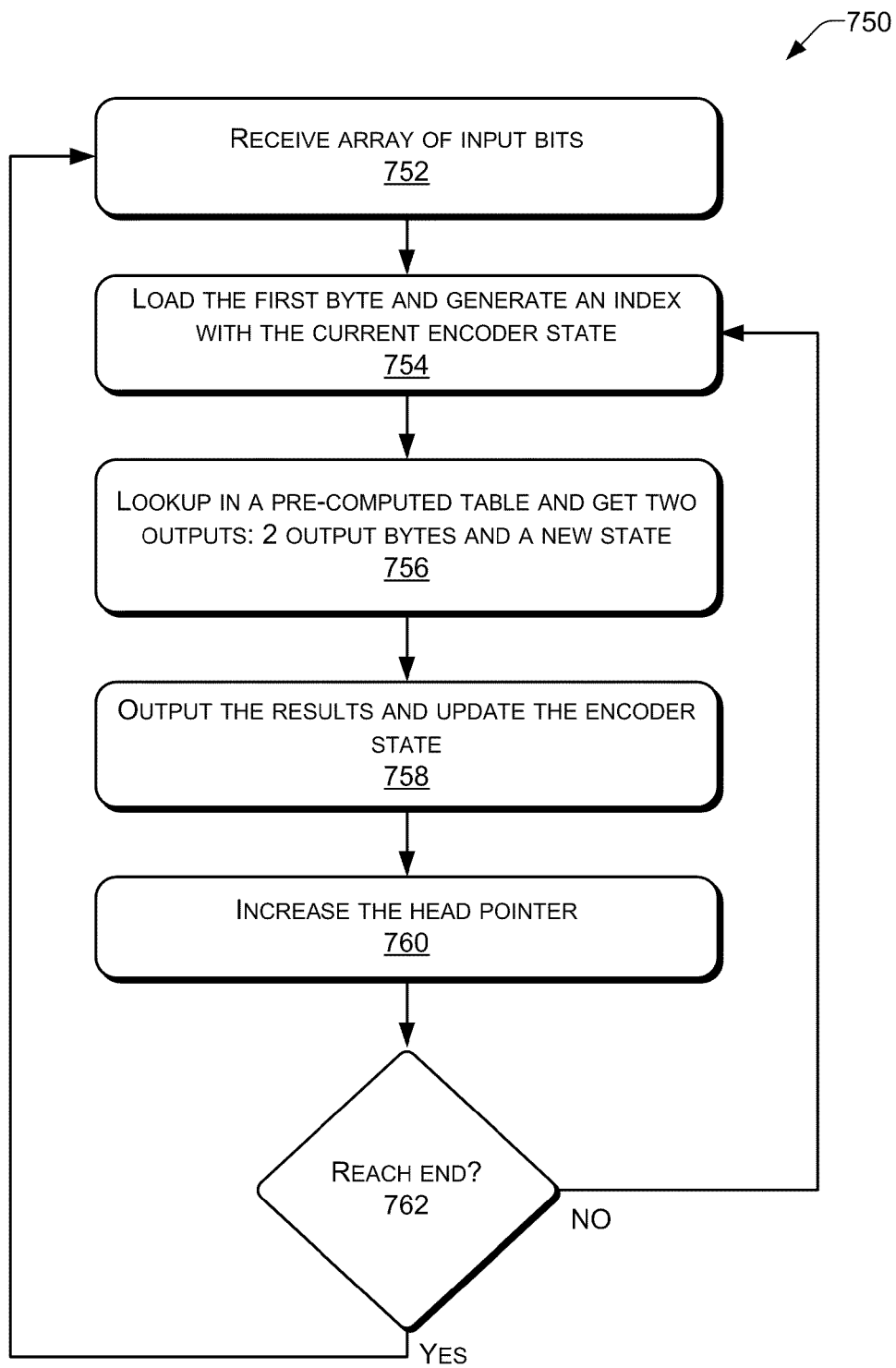
FIG. 7D illustrates a flowchart of an exemplary process using lookup tables according to some implementations.

FIGS. 7C-7D illustrate an example of SDR processing using an LUT according to some implementations herein. FIG. 7C illustrates how processing of a functional block can be speeded up by using a precomputed LUT instead of performing the actual processing of the bits using the processing algorithm. For example, when there are a finite combination of input bits and corresponding output data, then an LUT can be precomputed to be used to quickly match the input with corresponding output. In FIG. 7C, an array of input bits of a digital sample is received as a bit stream for processing, such as in one of the functional processing blocks described above with reference to FIGS. 6A-6C that is able to use an LUT to speed processing (e.g., the convolutional encoder algorithm). The convolutional encoder normally works in the following way. The convolutional encoder algorithm maintains seven shift registers 734, which form the state of the encoder. For each incoming bit, the algorithm 736 selects several bits in the shift registers 734 and performs eXclusive OR (XOR) operations on them, then two encoded output bits are generated as output data A 738 and output data B 740. Then, the shift registers 734 shift right and the input bit is put into the left-most register. Conventionally, to process one bit, it takes eight operations to compute the outputs (i.e., to produce a 2-bit output from a 1-bit input). However, as discussed above, the processing can avoid the actual processing of the algorithm 736 by using LUT 742. Thus, instead of processing one bit at a time, an 8-bit data can be treated as a single input for processing using the LUT. The 8-bit input and the 7-bit states of the current state can be combined to generate a 15-bit index 744. The 15-bit index is then located in the LUT 742, and the corresponding precomputed new 7-bit states 746 and a 16-bit output 748 are determined from the LUT 742 instead of processing each bit individually by processing the algorithm 736. Thus, it may be seen that if all possible 15-bit indices and their corresponding output 7-bit states 746 and 16-bit outputs 748 are precomputed and stored in LUT 742, the actual processing time for the SDR sample stream can be greatly expedited (i.e., encoding of eight bits can be carried out using a single lookup operation).

FIG. 7D illustrates an exemplary process 750 that may be executed by the PHY layer of the SDR stack on a core of a multi-core processor by using an LUT instead of processing the bit stream using a conventional algorithm, such as the convolutional encoder algorithm. Other algorithms in the SDR pipeline may similarly be expedited by the use of precomputed LUTs, as discussed above with reference to FIGS. 6A-6C.

At block 752, an array of input sample bits is received for processing as a stream of bits.

At block 754, the process loads the first byte (8 bits) and generates an index with the current encoder state (the 7 bit state).

At block 756, the process accesses the precomputed LUT using the generated index and locates two values: two output bytes (i.e., a 16-bit output) and a 7-bit new state.

At block 758, the two output bytes are passed as output to the next processing block in the SDR processing stream, e.g., as illustrated in FIG. 6B or 6C, and the 7-bit new state is used for processing the next byte in the sample bit stream.

At block 760, the head pointer is increased to encompass the next eight bits.

At block 762, the process determines whether the end of the bit array has been reached. If not, the process returns to block 754 to process the next byte; if so, the process goes to block 752 to receive the next array of input bits.

As discussed above with reference to FIGS. 6A-6C, more than half of the common PHY algorithms of the IEEE 802.11 standards can be supplanted with LUTs, thereby resulting in a processing time speedup 614 from between approximately 1.5× to 50× (see, e.g., FIG. 6A). Since the size of each LUT is sufficiently small, the sum of all LUTs in a processing path can easily fit in the L2 caches of typical multi-core processor cores. Accordingly, when combined with core dedication, as discussed below, the possibility of cache collisions is very small. As a result, the LUTs of the implementations herein are almost always located in onboard caches during PHY processing. Additionally, while an exemplary implementation has been illustrated in FIGS. 7C-7D to describe how an LUT can be used to speed SDR processing, it should be understood that the other algorithms discussed above as being able to be expedited with LUTs can be similarly processed using precomputed LUTs.

Further, in order to accelerate PHY processing with data-level parallelism, implementations of the SDR herein also use the SIMD processor extensions discussed above, such as SSE, SEE2, 3DNow!®, and AltiVec® provided in conventional multi-core processors. Although these extensions were originally designed for multimedia and graphics applications, the extensions also match the needs of wireless signal processing very well because many PHY algorithms have fixed computation structures that can easily map to large vector operations. Measurements show that such SIMD extensions substantially speed up PHY processing in implementations of the SDR herein.

Multi-Core Streamline Processing

Even with the above optimizations, a single CPU core may not have sufficient processing capacity to meet the processing requirements of high-speed wireless communication technologies. As a result, implementations of the SDR herein are able to use more than one core in a multi-core processor for PHY processing. In some implementations, the multi-core technique is also scalable to provide for compatibility with increasingly more complex signal processing algorithms as wireless technologies progress.

As discussed above, such as with respect to FIGS. 6B and 6C, physical layer processing typically contains a number of functional blocks or distinct stages in a pipeline. These blocks differ in processing speed and in input/output data rates and units. A block is only ready to execute when the block has received sufficient input data from the preceding block. Therefore, a key issue is how to schedule a functional block on multiple cores when the block is ready for processing.

Figure 8A:
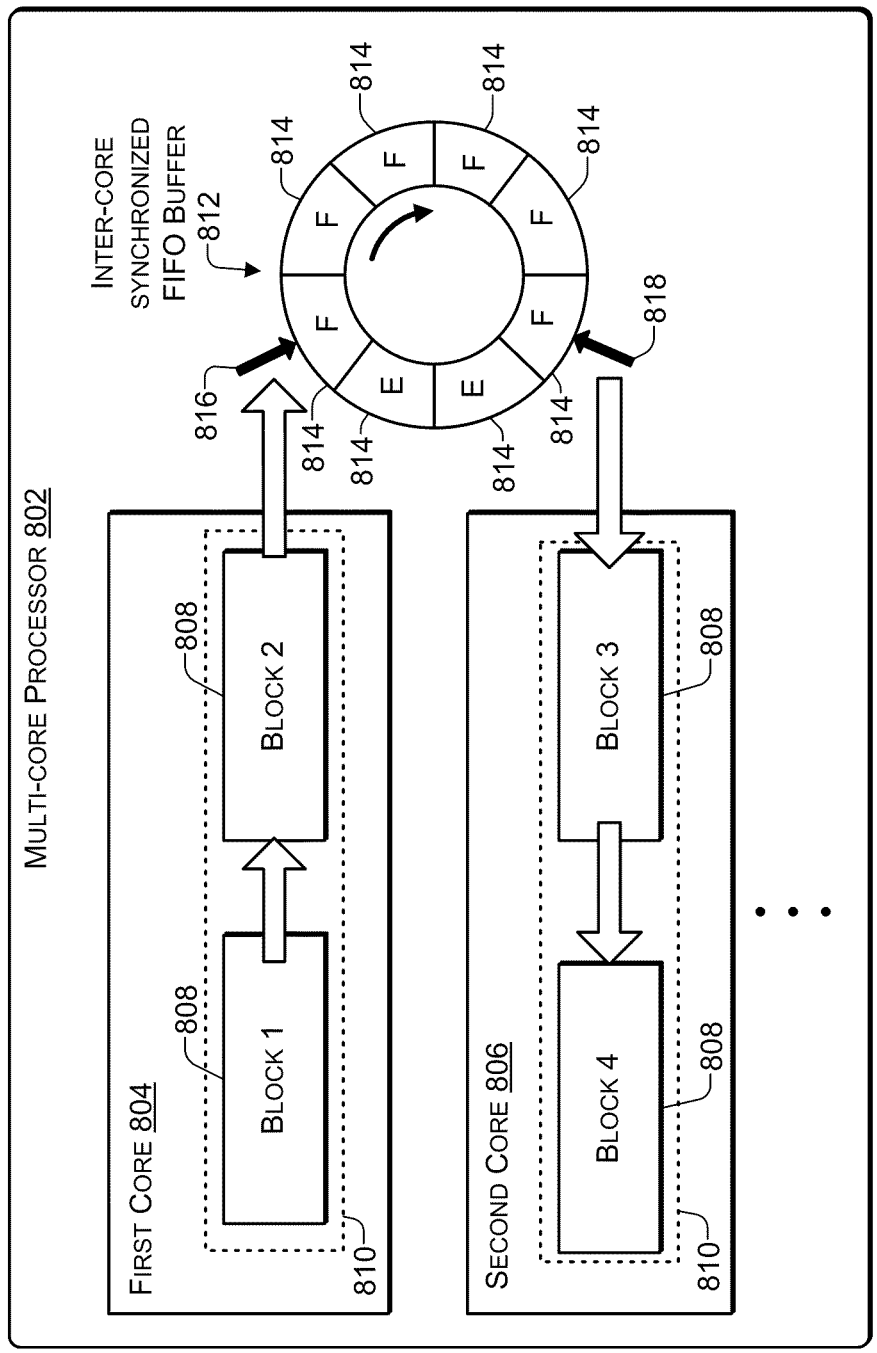
FIG. 8A illustrates an exemplary synchronized First-In-First-Out (FIFO) buffer according to some implementations.

FIG. 8A illustrates an exemplary implementation for processing data in functional blocks on different cores in a multi-core processor 802, which may correspond to multi-core processors 102, 202 discussed above. For example a first core 804 and a second core 806 may be used to process the functional blocks discussed above with reference to FIGS. 6A-6C. First core 804 may be located on the same multi-core processor as second core 806, or the cores 804, 806 may be located on separate processors.

In FIG. 8A, the first core 804 and the second core 806 process a plurality of functional blocks 808 using a static scheduling scheme. This implementation is based on the observation that the schedule of each block in a PHY processing pipeline is actually static, i.e., the processing pattern of previous blocks can determine whether a subsequent block is ready or not. Implementations of the SDR herein can thus partition the whole PHY processing pipeline into several sub-pipelines 810 and statically assign the sub-pipelines 810 to different cores 804, 806. Within one sub-pipeline 810, when a first block 808 has accumulated enough data for the next block to be ready, the first block explicitly schedules the next block. Adjacent sub-pipelines from different blocks are connected with a synchronized FIFO 812 that manages the delivery of data between the sub-pipelines 810. For example, the synchronized FIFO 812 may be established in one of caches 106, 108 discussed above with respect to FIG. 1. Thus, implementations herein allow different PHY processing blocks 808 to streamline across multiple cores 804, 806 while communicating with one another through one or more shared memory synchronized FIFO queues. For example, if two blocks 808 (e.g., Block 2 and Block 3 of FIG. 8A) are running on different cores 804, 806, their access to the shared FIFO 812 must be synchronized. The traditional implementation of a synchronized FIFO uses a counter to synchronize the writer (producer) and reader (consumer) in what is referred to as a counter-based FIFO (CBFIFO).

However, this counter is shared by two processor cores, and every write to the variable by one core will cause a cache miss on the other core. Since both the producer and consumer modify this variable, two cache misses are unavoidable for each datum. It is also quite common to have very fine data granularity in PHY (e.g., 4-16 bytes as summarized in FIG. 6 discussed above). Therefore, such cache misses will result in significant overhead when synchronization has to be performed very frequently (e.g., once per microsecond) for such small pieces of data. In implementations of the SDR herein, an inter-core synchronized circular FIFO buffer 812 is implemented that does not use a shared synchronization variable. Instead of having a shared variable, implementations herein augment each data slot 814 in the synchronized FIFO buffer 812 with a header that indicates whether the slot is empty or full (i.e., "E" or "F"). Furthermore, each data slot 814 is padded to be a size that is equal to a multiple of a cache line size. Thus, the consumer is always chasing the producer in the circular buffer 812 for filled slots, as outlined in the following pseudo code:

```
// Producer:
void write_fifo ( DATA_TYPE data ) {
    while (q[w_tail].flag>0); // spin wait
    q[w_tail].data = data;
    q[w_tail].flag = 1; // occupied
    w_tail = (w_tail+1) % q_size;
}
// Consumer:
void read_fifo ( DATA_TYPE * pdata ) {
    while (q[r_head].flag==0); // spin
    *data = q[r_head].data;
    q[r_head].flag = 0; // release
    r_head = (r_head + 1) % q_size;
}
```

This chasing-pointer FIFO (CPFIFO) largely mitigates the overhead even for very fine-grained synchronization through implementation of a producer pointer 816 and a consumer pointer 818. For example, if the speed of the producer (e.g., Block 2 on first core 804) and consumer (e.g., Block 3 on second core 806) is the same, and the two pointers are separated by a particular offset (e.g., two cache lines in the Intel architecture), no cache miss will occur during synchronized streaming since the local cache will pre-fetch the following slots before the actual access. If the producer and the consumer have different processing speeds, e.g., the consumer (reader) is faster than the producer (writer), then eventually the consumer will wait for the producer to release a slot. In this case, each time the producer writes to a slot, the write will cause a cache miss at the consumer. However, the producer will not suffer a miss since the next free slot will be prefetched into its local cache. Further, the cache misses experienced by the consumer will not cause significant impact on the overall performance of the streamline processing since the consumer is not the bottleneck element. Additionally, while the FIFO buffer 812 is illustrated as being circular, it is understood in the art that this is only for illustration purposes and that the buffer is actually a logical location in the cache memory and that the locations of the empty and full data slots in the buffer 812 are actually maintained by the relative locations of the pointers 816, 818.

Figure 8B:
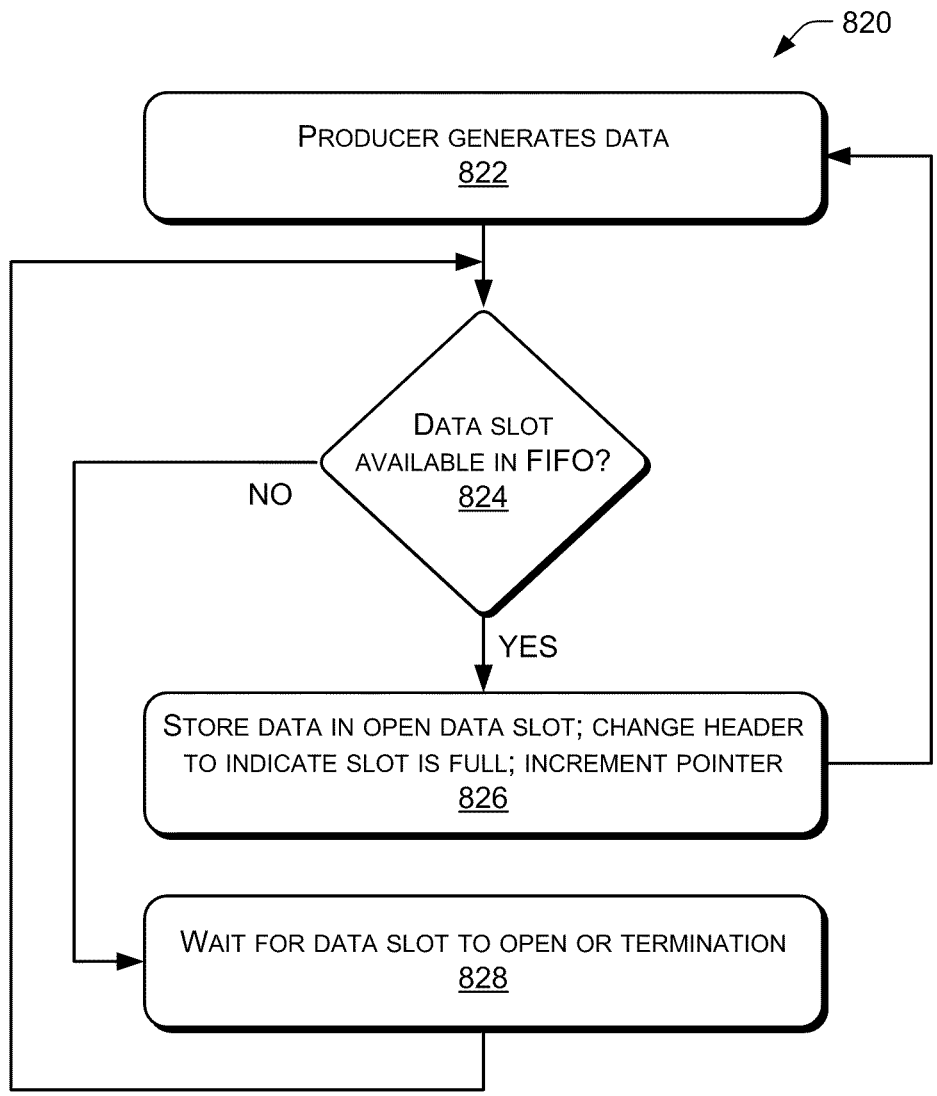
FIG. 8B illustrates a flowchart of an exemplary process of a producer according to some implementations.

FIG. 8B illustrates a flowchart of an exemplary process 820 carried out by the producer (e.g., first core 804) for processing digital samples using the synchronized FIFO buffer 812. The process is executed by the PHY module of the SDR stack using multiple cores of a multi-core processor 802.

At block 822, the producer generates data. For example, first core 804 processes data in functional blocks 808 (e.g., Block 1 and Block 2) to generate the data.

At block 822, the producer determines whether an available data slot is open in the FIFO buffer 812 by referring to the data slot to which the producer pointer 816 is currently pointing and checking the header for that data slot.

At block 826, if the header indicates that the current slot is empty the producer stores the generated data in the empty data slot, and increments the producer pointer 816 by one data slot.

At block 828, if the header indicates that the data slot to which the producer pointer is currently pointing is full, the producer waits for an empty data slot to become available. A termination condition can also be set by a user when it is desired to stop the process.

Figure 8C:
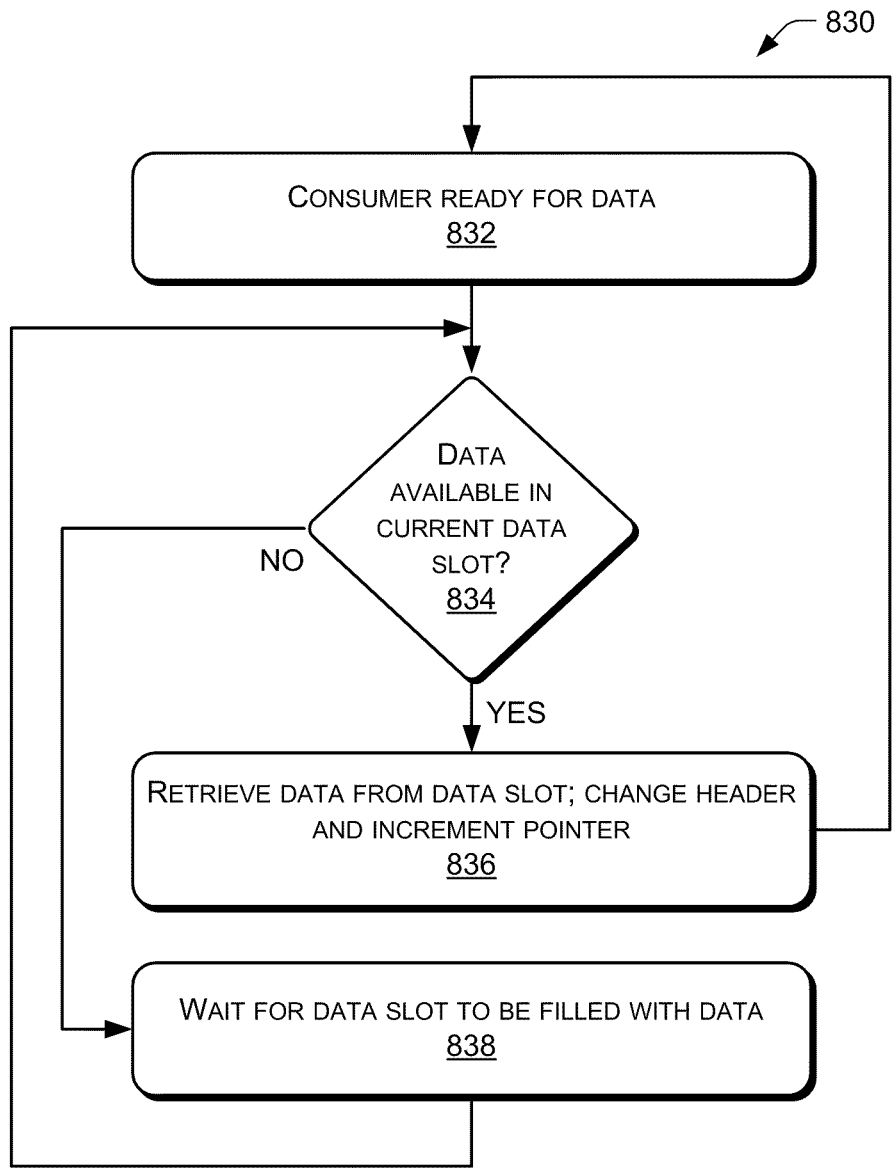
FIG. 8C illustrates a flowchart of an exemplary process of a consumer according to some implementations.

FIG. 8C illustrates a flowchart of an exemplary process 830 carried out by the consumer (e.g., second core 806) for processing digital samples using the synchronized FIFO buffer 812. The process is executed by the PHY module of the SDR stack using multiple cores of a multi-core processor 802.

At block 832, the consumer is ready to receive and process data. For example, in the pipeline of Block 3 and Block 4 in second core 806, data may have been passed from Block 3 to Block 4, and Block 3 is now ready for more data.

At block 834, the consumer checks the data slot to which the consumer pointer 818 is currently pointing to determine if the slot contains available data by checking the header to determine whether the header indicates that the slot is full or empty.

At block 836, when the slot contains data, the consumer takes the data from the data slot, thereby opening the data slot and changing the header of the data slot to indicate that the data slot is now empty. The consumer also increments the consumer pointer to the next data slot.

At block 838, if no data is available in the current data slot, the consumer continues to check the data slot and waits until the data slot is filled with data.

Real-Time Support

SDR processing is a time-critical task that requires strict guarantees of computational resources and hard real-time deadlines. For example, in the 802.11 protocols, the wireless channel is a resource shared by all transceivers operating on the same spectrum. Thus, because simultaneously transmitting neighbors may interfere with each other, various MAC protocols have been developed to coordinate transmissions in wireless networks to avoid collisions.

Further, most modern MAC protocols, such as 802.11, require timely responses to critical events. For example, 802.11 uses a CSMA (Carrier-Sense Multiple Access) MAC protocol to coordinate transmissions. Transmitters are required to sense the channel before starting their transmission, and channel access is only allowed when no energy is sensed, i.e., the channel is free. The latency between sense and access should be as small as possible. Otherwise, the sensing result could be outdated and inaccurate, resulting in a collision. Another example is the link-layer retransmission mechanisms in wireless protocols, which may require an immediate acknowledgement (ACK) to be returned in a limited time window. Commercial standards like IEEE 802.11 mandate a response latency within tens of microseconds, which is challenging to achieve in software on a general-purpose processor running a general purpose OS.

Thus, as an alternative to relying upon the full generality of real-time operating systems, implementations herein obtain real-time guarantees by dedicating one or more processor cores to SDR processing in a multi-core processing system. Thus, because one or more cores are dedicated to the SDR, implementations herein guarantee sufficient computational resources, without being affected by other concurrent tasks in the system.

For example, wireless communications often require the PHY to constantly monitor the channel for incoming signals. Therefore, the PHY processing may need to be active all the times. It is desirable to schedule this monitoring task to operate continually on the same core to minimize overhead, such as cache misses or TLB flushes. Furthermore, isolating applications into different cores can result in better performance as compared to symmetric scheduling, since an effective use of cache resources and a reduction in locks can outweigh dedicating cores. Moreover, a core dedication mechanism is much easier to implement than a real-time scheduler, sometimes even without modifying an OS kernel. One example of a method for achieving core dedication according to implementations of the SDR herein is raising the priority of a kernel thread so that the kernel thread is pinned on a particular core and runs exclusively on that core until termination.

Implementations of the SDR herein use exclusive threads (i.e., "ethreads") to dedicate cores for real-time SDR tasks. The ethreads can be implemented without any modification to the kernel code. For example, an ethread can be implemented as a kernel-mode thread, and thereby exploit the processor affiliation that is commonly supported in conventional operating systems to provide control regarding on which core the kernel mode thread runs. Once the OS has scheduled the ethread on a specified physical core, the OS raises the priority and/or the IRQL (interrupt request level) on the thread to a level as high as the kernel scheduler, e.g., dispatch level in Windows®. Thus, the ethread takes control of the core and prevents itself from being preempted by other threads by raising the interrupt request level.

Running at such an IRQL, however, does not prevent the core from responding to hardware interrupts. Therefore, the interrupt affiliations of all devices attached to the host are also constrained. For example, if an ethread is running on a particular core, all interrupt handlers for installed devices are removed from the core, thus preventing the core from being interrupted by hardware. Furthermore, to ensure the correct operation of the computing device and operating system, implementations of the SDR herein always ensure core zero is able to respond to all hardware interrupts. Consequently, implementations of the SDR herein only allow ethreads to run on cores whose ID is greater than zero.

Exemplary Implementations

Exemplary implementations of the SDR herein include a fully functional WiFi transceiver on the SDR platform as an exemplary WiFi implementation. The exemplary WiFi implementation SDR stack supports all IEEE 802.11a/b/g modulations and can communicate seamlessly with commercial WiFi network cards. For instance, implementations of high-speed wireless protocols on general-purpose computing device architectures must overcome a number of challenges that stem from existing hardware interfaces and software architectures. First, transferring high-fidelity digital waveform samples into system memory for processing requires very high bus throughput. Conventional software radio platforms use USB 2.0 or Gigabit Ethernet, which cannot satisfy this requirement for sustaining high-speed wireless protocols. Second, physical layer (PHY) signal processing has very high computational requirements for generating information bits from waveforms, and vice versa, particularly at high modulation rates. Lastly, wireless PHY and media access control (MAC) protocols have low-latency real-time deadlines that must be met for correct operation. For example, the 802.11 MAC protocol requires precise timing control and ACK response latency on the order of tens of microseconds. Existing software architectures on the general-purpose computing devices cannot consistently meet this timing requirement.

Figure 9A:
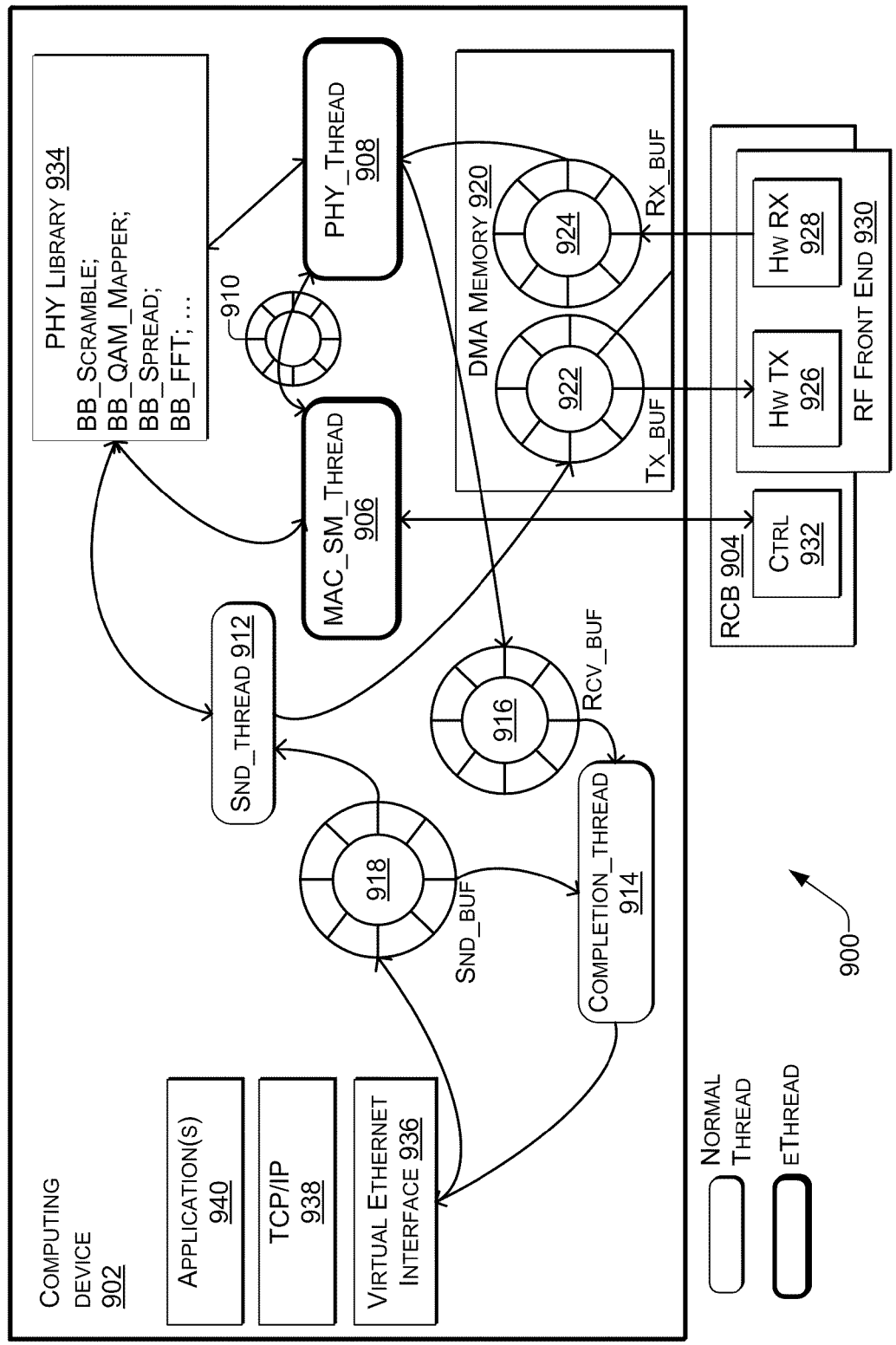
FIG. 9A illustrates an example of an SDR according to some implementations.

FIG. 9A illustrates an exemplary WiFi implementation 900 of the SDR herein implemented on hardware, such as a computing device 902, having a multi-core processor as described above with reference to FIGS. 1 and 2, and coupled to an RCB 904 corresponding to RCBs 116, 214, and/or 302. In the illustrated implementation, the MAC state machine (SM) is implemented as an ethread 906 by raising the priority of a kernel thread so that the kernel thread is pinned on a particular core and runs exclusively on that core until termination. Since a radio according to the 802.11 standard is a half-duplex radio, the demodulation components of the PHY can run directly within a MAC SM thread. Furthermore, if a single core is insufficient for all PHY processing (e.g., as may be the case with 802.11a/g), the PHY processing can be partitioned across two ethreads comprising MAC_SM thread 906 and a PHY_Thread 908. These two ethreads 906, 908 are streamlined using a synchronized CPFIFO 910, as discussed above with respect to FIGS. 8A-8C. An additional thread, Snd_thread 912, modulates the outgoing frames into waveform samples in the background. As discussed above, these modulated waveforms can be pre-stored in the RCB's memory to facilitate speedy transmission. Further, a Completion_thread 914 monitors a receive buffer, Rcv_buf 916 and notifies upper software layers of any correctly received frames. The completion thread 914 also cleans up Rcv_buf 916 and a send buffer, Snd_buf 918 after they are used. Because the functions of the Completion_thread 914 and the Snd_thread 912 do not require the same high performance and low latency of the PHY ethreads 906, 908, these other threads are not implemented as ethreads, and can be run on any available core.

In the illustrated example, DMA memory 920 includes a transmitter buffer TX_buf 922 and a receiver buffer RX_buf 924 for storing digital samples for transmission and reception on transmitter hardware 926 and receiver hardware 928, respectively, on the RF front end 930 as discussed above, such as with respect to FIG. 4. Furthermore, RCB 904 includes control modules 932, such as the DMA controller, bus controller, memory controller, and RF controller described above with respect to FIG. 4, and collectively represented as Ctrl 924, which exchange commands with MAC_SM_Thread 906 for ensuring proper interaction between RCB 904 and computing device 902. During streamline processing, MAC_SM thread 906 and PHY thread 908 access the PHY library 934 for accessing LUTs and SIMD instructions for carrying out optimized PHY processing, as discussed above with respect to FIGS. 6A-6C and 7A-7B. The processed digital samples are delivered to the receive buffer 916, are then presented via the completion thread 914 to virtual Ethernet interface 936, thereby to the TCP/IP layer 938, and thus, to one or more applications 940 also running on one or more cores of computing device 902.

Figure 9B:
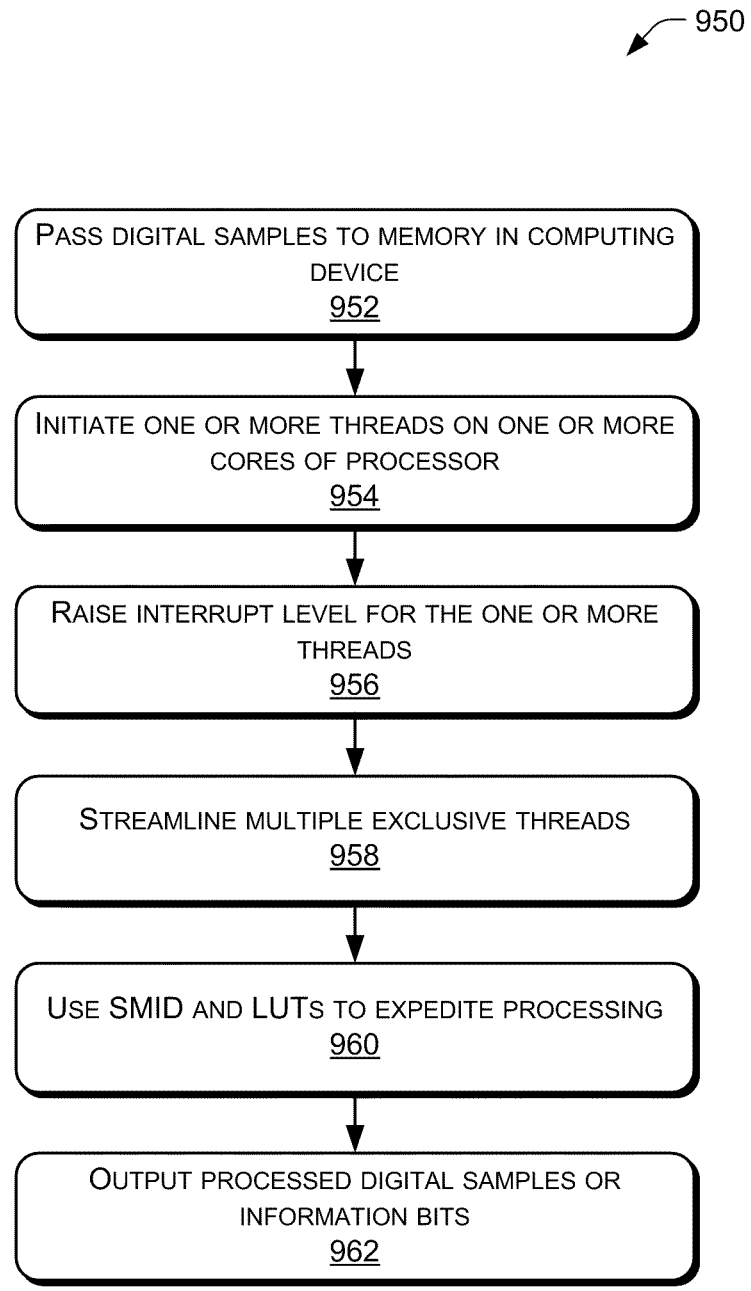
FIG. 9B illustrates an exemplary process for exclusively performing SDR processing on the one or more cores.

FIG. 9B illustrates an exemplary process 950 that may be executed using one or more cores of a multi-core processor for exclusively performing SDR processing on the one or more cores.

At block 952, digital samples are passed from the RCB to the memory in the computing device. The digital samples are received from the RF front end by the RCB and then may be passed to the memory in the computing device using direct memory access (DMA), or the like. The passing of the digital samples to the memory in the computing device may be controlled by a DMA controller on the RCB, and the DMA may also temporarily store the digital samples on the RCB in a buffer or onboard memory.

At block 954, threads may be initiated on one or more cores of the multi-core processor for performing SDR processing, such as PHY and MAC processing.

At block 956, the interrupt request level for the one or more cores may be raised to ensure that the threads are not interrupted so that the cores are able to exclusively perform SDR processing of the digital samples. Further, the interrupt handler for the one or more cores may also be removed to prevent hardware interrupts as well.

At block 958, when multiple threads operate on different cores, the processing between cores may be streamlined as discussed above using a synchronized FIFO between the cores.

At block 960, SMID and LUTs may be used where applicable to expedite the SDR processing of the digital samples.

At block 962, the processed digital samples are output for use, such as by an application on the computing device. Further, while the foregoing process illustrates exclusive core processing of digital samples received from the RF front end, it may be seen that digital samples generated by the computing device for transmission by the RF front end are similarly processed. For example, in the case of digital samples to be transmitted, steps 954-960 are the same, with the input being a bit stream generated or received by the computing device, such as from an application, and the output being processed digital samples ready for conversion to analog and transmission by the RF front end.

Figure 10:
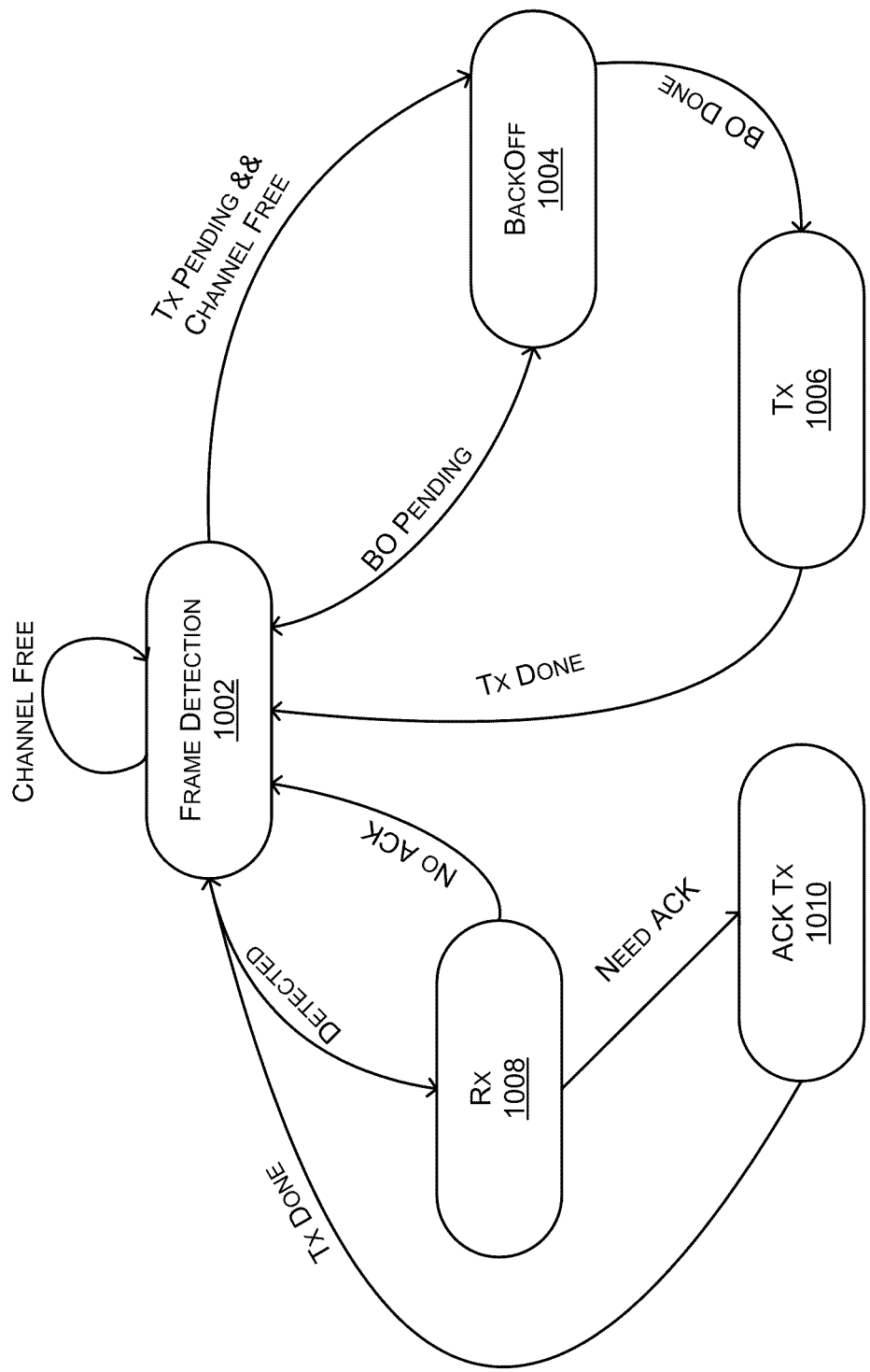
FIG. 10 illustrates exemplary MAC processing according to some implementations.

Further, the exemplary WiFi implementation 900 is able to implement the basic access mode of the 802.11 standard. Exemplary details of the MAC State Machine are illustrated in FIG. 10. Normally, the SM is in the Frame Detection (FD) state 1002. In the frame detection state 1002, the RCB 904 constantly writes samples into the Rx_buf 924. The SM (i.e. MAC_SM_Thread 906) continuously measures the average energy to determine whether the channel is clean or whether there is an incoming frame.

The transmission of a frame follows the carrier-sense multiple access (CSMA) mechanism. When there is a pending frame to be transmitted, the SM first checks whether the energy on the channel is low (i.e., no frame is currently being received). If the channel is busy, the transmission is deferred and a backoff timer 1004 is started. Each time the channel becomes free, the SM checks if any backoff time remains. If the timer goes to zero, the SM transmits the pending frame at block Tx 1006.

Further, when the exemplary WiFi implementation starts to receive a frame, it detects a high energy in the frame detection state 1002. In 802.11, SM uses three steps in the PHY layer to receive a frame at block Rx 1008. First, the PHY layer needs to synchronize to the frame, i.e., find the starting point of the frame (timing synchronization) and the frequency offset and phase of the sample stream (carrier synchronization). Synchronization is usually done by correlating the incoming samples with a pre-defined preamble. Subsequently, the PHY layer needs to demodulate the PLCP (Physical Layer Convergence Protocol) header, which is always transmitted using a fixed low-rate modulation mode. The PLCP header contains the length of the frame as well as the modulation mode, possibly a higher rate, of the frame data that follows. Thus, only after successful reception of the PLCP header will the PHY layer know how to demodulate the remainder of the frame.

After successfully receiving a frame at Rx 1008, the 802.11 MAC standard requires a receiving station to transmit an ACK frame in a timely manner as indicated at block ACK Tx 1010. For example, 802.11b requires that an ACK frame be sent with no more than a 10 μs delay to acknowledge receipt of the received frame. However, this short ACK requirement is quite difficult for an SDR implementation to achieve in software on a general-purpose computing device. Both generating and transferring the waveform across the system bus can cause a latency of several microseconds, and total time required is usually larger than the maximum amount mandated by the standard. Fortunately, an ACK frame generally has a fixed pattern. For example, in 802.11 all data in an ACK frame is fixed except for the sender address of the corresponding data frame. Thus, in the exemplary WiFi implementation 900, it is possible to pre-calculate most of an ACK frame (19 bytes), and update only the address (10 bytes). Further, this can be done early in the processing, immediately after demodulating the MAC header, and without waiting for the end of a frame. The waveform is then pre-stored into the memory of the RCB. Thus, the time for ACK generation and transferring can overlap with the demodulation of the data frame being received. After the MAC SM demodulates the entire frame and validates the CRC32 checksum, the MAC SM instructs the RCB to transmit the ACK, which has already been stored on the RCB. Thus, the latency for ACK transmission is very small because the ACK is already stored in the RCB and can be immediately transmitted without having to be generated or sent along the system bus.

In rare cases when the incoming data frame is quite small (e.g., the frame contains only a MAC header and zero payload), then the exemplary WiFi implementation cannot fully overlap ACK generation and the DMA transfer with demodulation to completely hide the latency. In this case, the exemplary WiFi implementation may fail to send the ACK in time. This problem is addressed by maintaining a cache of previous ACKs in the RCB. With 802.11, all data frames from one node will have exactly the same ACK frame. Thus, pre-allocated memory slots in the RCB can be used to store ACK waveforms for different senders (in some implementations, 64 different slots are allocated). Therefore, when demodulating a frame, if the ACK frame is already in the RCB cache, the MAC SM simply instructs the RCB to transmit the pre-cached ACK. With this scheme, the exemplary WiFi implementation may be late on the first small frame from a sender, effectively dropping the packet from the sender's perspective. But the retransmission, and all subsequent transmissions, will find the appropriate ACK waveform already stored in the RCB cache.

The exemplary WiFi implementation 900 has been implemented and tested as a full 802.11a/g/b transceiver, which support DSSS (Direct Sequence Spreading: 1 and 2 Mbps in 11 b), CCK (Complementary Code Keying: 5.5 and 11 Mbps in 11 b), and OFDM (Orthogonal Frequency Division Multiplexing: 6, 9 and up to 54 Mbps in 802.11a/g).

Accordingly, implementations of the SDR herein have been found to interoperate seamlessly with commercial hardware-based 802.11 devices, while supporting the full suite of 802.11a/b/g modulation rates and achieving substantially equivalent performance to the hardware-based devices at each modulation. As a result, it may be seen that implementations of the SDR herein can process signals sufficiently fast to achieve full channel utilization, and that the SDR can satisfy all timing requirements of the 802.11 standards with a software implementation on a general-purpose computing device.

Software Spectrum Analyzer

Figure 11:
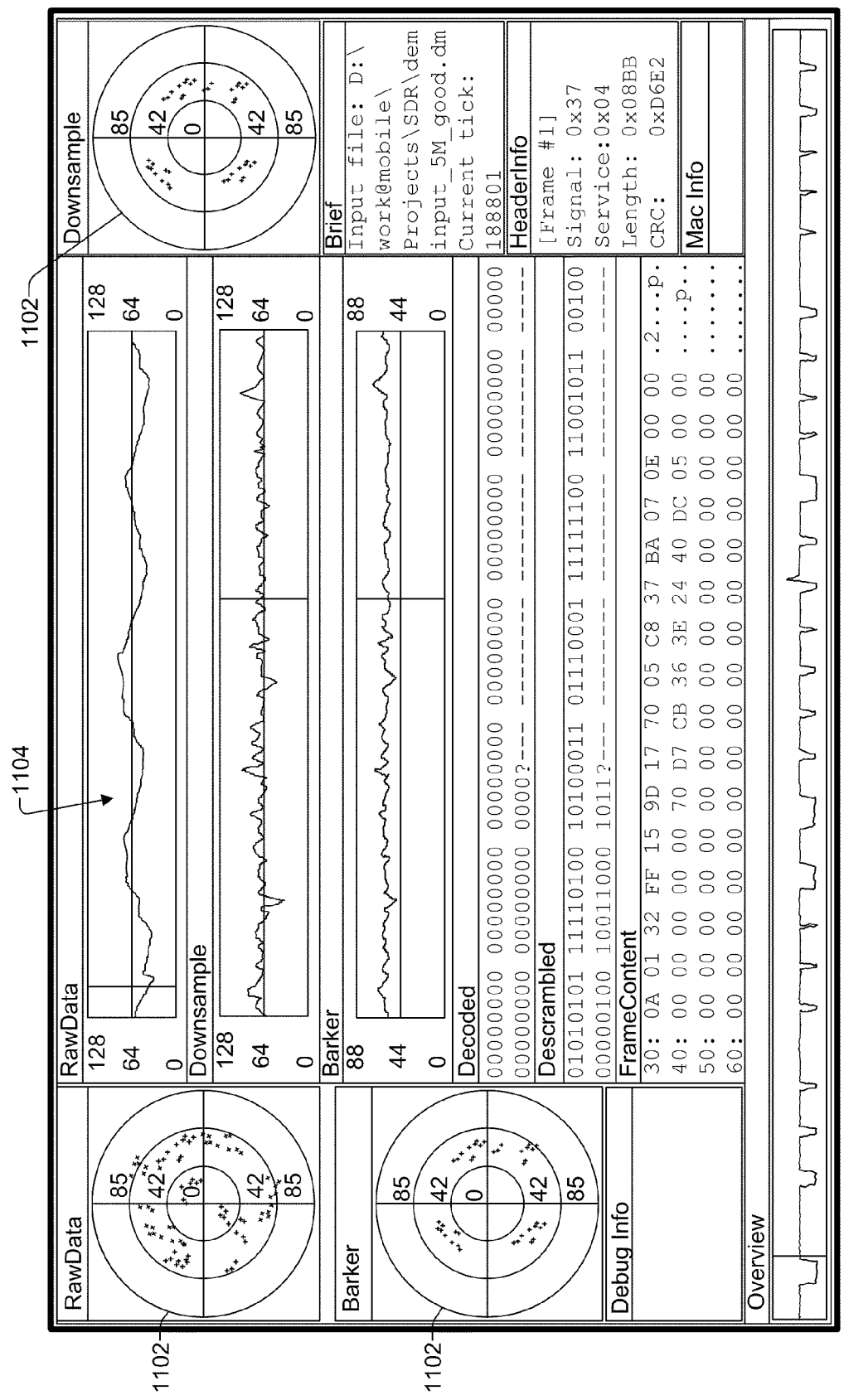
FIG. 11 illustrates an exemplary software spectrum analyzer according to some implementations.

FIG. 11 illustrates a software implemented spectrum analyzer 1100 according to some implementations herein that can be implemented on a general-purpose computing device as an application for use in analyzing the performance of the SDR herein. For example, it is easy for implementations of the SDR herein to expose all PHY layer information to applications running on the computing device. The software spectrum analyzer 1100 is such an application that can take advantage of this information. For example, the spectrum analyzer 1100 can run on one or more cores of the processor of the general-purpose computing device while the SDR is in operation, and can graphically display the waveform and modulation points of the radio communications in one or more constellation graphs, as well as the demodulated results. In the implementation illustrated in FIG. 11, raw data, down sampled data, and barker data are displayed in both constellation graphs 1102 and waveform graphs 1104. Also displayed are decoded information, descrambled information, debug info, frame content, MAC info, overview info, header info and a brief description of file information. Further, while commercially available spectrum analyzers may have similar functionality and a wider sensing spectrum band, they are also more expensive.

Extensions to Radio Protocols

The flexibility of implementations of the SDR herein allows the development and testing of extensions to current radio protocols, such as 802.11.

Jumbo Frames

When channel conditions are good, transmitting data using larger frames can reduce the overhead of MAC/PHY headers, preambles and the per frame ACK. However, the maximal frame size of 802.11 is fixed at 2304 bytes. With simple modifications (changes in a few lines to the PHY algorithms), the exemplary WiFi implementation can transmit and receive jumbo frames of up to 32 KB. For example, when two implementations of the SDR herein using the exemplary WiFi implementation described above and with jumbo frame optimization, the throughput of data can be increased. For instance, when the frame size is increased from 1 KB to 6 KB, the end-to-end throughput increases 39% from 5.9 Mbps to 8.2 Mbps. When the frame size is further increased to 7 KB, however, the throughput drops because the frame error rate also increases with the size. Thus, at some point, the increasing error will offset the gain of reducing the overhead. However, it is noted that default commercial hardware-based NICs reject frames larger than 2304 bytes, even if those frames can be successfully demodulated. Additionally, it is further noted that although the ability to transmit jumbo frames is only one possible optimization, the ability demonstrates that the full programmability offered by implementations of the SDR herein enables researchers to explore such "what if" questions using an inexpensive general purpose computing device SDR platform.

TDMA MAC

To evaluate the ability of implementations of the SDR herein to precisely control the transmission time of a frame, a simple time division multiple access (TDMA) MAC algorithm was implemented that schedules a frame transmission at a predefined time interval. The MAC state machine (SM) runs in an ethread as discussed above with respect to FIG. 9, and the MAC SM continuously queries a timer to check whether the predefined amount of time has elapsed. If so, the MAC SM instructs the RCB to send out a frame. The modification is simple and straightforward with about 20 lines of additional code added to the MAC algorithm.

Since the RCB can indicate to the exemplary WiFi implementation when the transmission completes, and the exact size of the frame is known, it is possible to calculate the exact time when the frame transmits. Tests were conducted with various scheduling intervals under a heavy load, during which files on the local disk are copied, files from a nearby server are download, and a HD video is played back simultaneously, for determining an average error and standard deviation of the error. The average error was found to be less than 1 µs, which is sufficient for most wireless protocols. Also, outliers, which are define as packet transmissions that occur later than 2 µs from the pre-defined schedule, occurred less than 0.5% of the time.

Radio Control Board Interface and Message Passing Protocol

Figure 12:
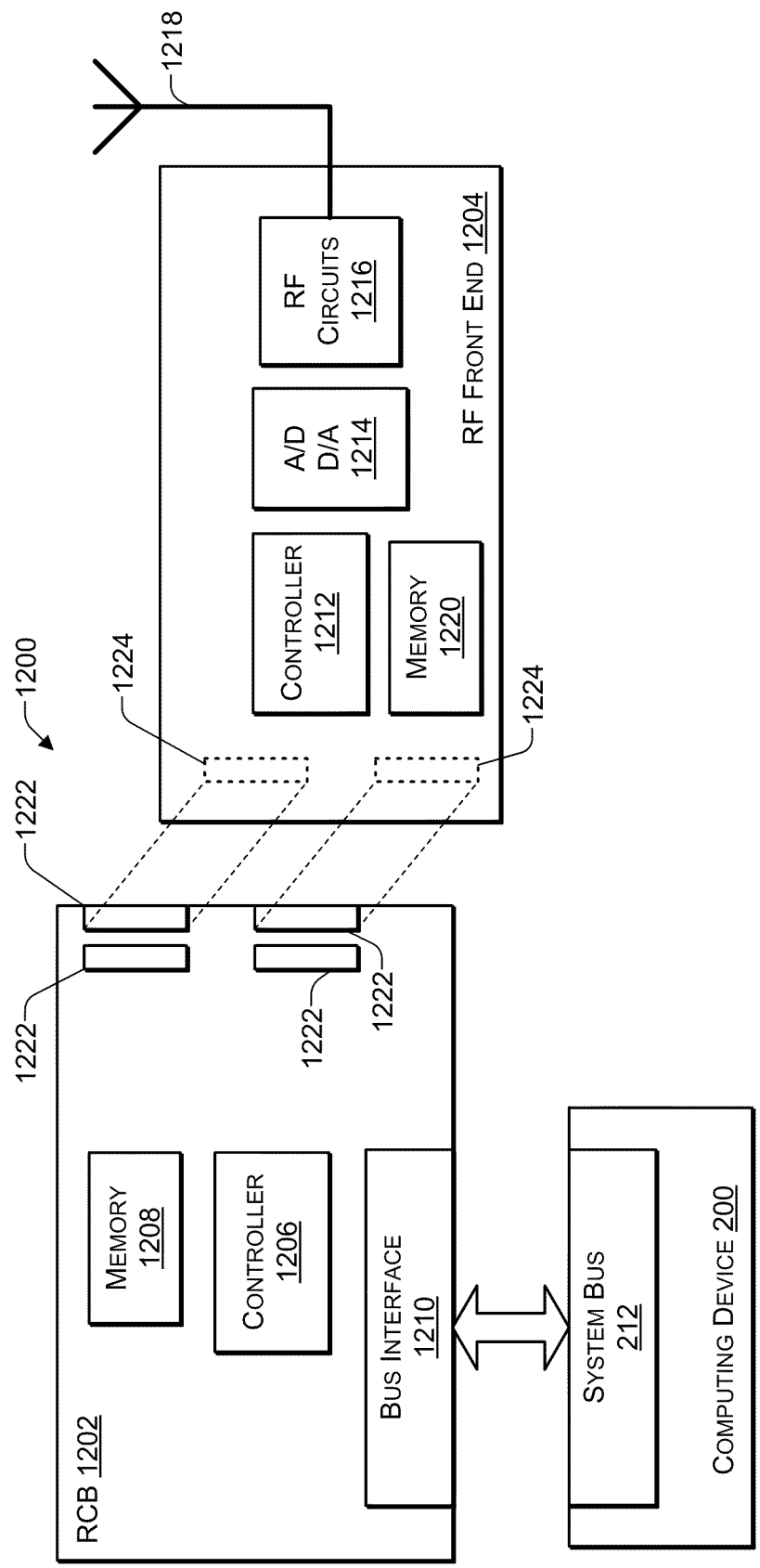
FIG. 12 illustrates an exemplary RCB interface according to some implementations.

FIG. 12 illustrates an exemplary implementation of a radio control board interface 1200 for enabling connection of a radio control board (RCB) 1202 with any of various different RF front ends 1204. In the example illustrated, RCB 1202 may correspond to any of RCBs 116, 214, 302, 904 discussed above, and includes functionality for controlling the transfer of data between the RF front end 1204 and a system bus of a computing device, such as system bus 212 of computing device 200 discussed above (illustrated), system bus 112, or the like. In the illustrated implementation, RCB 1202 includes a controller 1206, which may correspond to FPGA 308 or other circuitry able to carry out the functions of the RCBs discussed above. The RCB 1202 further includes an onboard memory 1208, which may correspond to onboard memory 324 discussed above, such as for use in data buffering and signal caching. RCB 1202 also includes a bus interface 1210 that enables the RCB 1202 to be connected to the system bus 212 of computing device 200. As discussed above, the system bus 212 may be a PCIe bus or other high speed type of bus, and the bus interface 1210 is a PCIe interface or PCI Express card interface that enables the RCB 1202 to connect to a PCIe slot of a computing device as a plug and play device.

RF front end 1204 includes a controller 1212, analog to digital and digital to analog converters 1214, RF circuits 1216, one or more antennas 1218, and an onboard memory 1220. RF front end 1204 may correspond to any of RF front ends 118, 216, 304, 930 discussed above, or other RF front ends.

The interface 1200 for operably connecting RF front end 1204 with RCB 1202 may include one or more LVDS (Low Voltage Differential Signaling) interfaces or connectors 1222 located on RCB 1202 and one or more LVDS interfaces or connectors 1224 located on RF front end 1204. In the illustrated implementation, RCB 1202 includes four LVDS connectors 1222, two of which are used for connection with two LVDS connectors 1224 on RF front end 1204. In the illustrated example, two LVDS connectors 1222, 1224 are used to support two radios or two distinct channels, such as for multiple-input and multiple-output (MIMO) applications, or the like. In other implementations, the RF front end 1204 may only require a single LVDS connector 1222 for operable connection with RCB 1202, or the RF front end may connect with four or more LVDS connectors 1222 on RCB 1202 for various multiple channel or multiple connection implementations. Further, while an LVDS interface 1200 is described herein as an exemplary interface, other interfaces can also be used with the SDR platform.

Implementations of a message exchange protocol that can be used with the LVDS interface 1200 will now be described. The message exchange protocol described herein enables the exchange of data, control messages, status messages, clock information, and other types of messages or signals between the RCB 1202 and the RF front end 1204. Implementations of the message exchange protocol include two layers: a physical layer and a link layer.

The physical layer includes clocking control, serializing, low-level encoding, and training. For example, a double data rate (DDR) mode may be used to transfer data over the LVDS interface. In some implementations, a clock signal is transmitted on a dedicated LVDS pin pair (i.e., a positive-negative pin pair that makes up an LVDS channel, as will be described additionally below). Data can be transferred and sampled at both the rising and falling edges of the clock signal, i.e., in a DDR mode. In some implementations, the clock rate can be relatively high, e.g., 400 MHz or more. Further, dedicated lines or channels can be provided on the interface for passing the clock signal in each direction, i.e., a clock_in channel and a clock_out channel, each utilizing a dedicated LVDS pin pair, as described further below.

The physical layer may further include a serializer and deserializer for facilitating LVDS functionality. For example, the LVDS interface is a serialized interface which enables the input data width to be wider than the actual number of available lines or channels of the LVDS interface.

Additionally, the physical layer may include standard 8 b/10 b coding of the data being transferred over the interface for achieving DC (direct current) balance and bounded disparity. For example, 8 b/10 b coding is a line coding technique that maps 8-bit symbols to 10-bit symbols to achieve DC-balance and bounded disparity, while still enabling sufficient state changes to allow clock recovery. According to 8 b/10 b coding, the difference between the count of 1s and 0s in a string of at least 20 bits is no more than 2, and the maximum number of consecutive ones or zeros is bounded to a reasonable number. Thus, a clock period can be recovered by observing transitions in the received sequence, while having a maximum allowed run length guarantees such clock recovery.

The physical layer may further include a training and adaptive adjustment (i.e., tuning) feature. For example, an LVDS sender and LVDS receiver can adaptively adjust the sampling phase to tune the LVDS interface to achieve improved performance. To facilitate adaptive adjustment, the LVDS sender sends a training pattern over the data lines, and the LVDS receiver tunes the phase of the clock signal and attempts to determine an optimal time to sample the data.

Additionally, the physical layer may further include a dedicated status channel utilizing a status LVDS pin pair (i.e., the status_in or status_out pin pairs described below). The status signal indicates whether the data passed over the data lines is regular working data (i.e., digital samples corresponding to RF signals) or training data for use in tuning the interface 1200. For example, during training, the status signal will indicate "destination not ready" until the training phase is completed.

The link layer of the messaging protocol defines the message formats that are exchanged over the LVDS interface 1200. For instance, as mentioned above, status messages are transferred on dedicated status channels in each direction for signaling a status of the LVDS receiver (i.e., a dedicated status_in channel and a dedicated status_out channel). In some implementations, there are three possible status states: "reset", "destination not ready", and "destination ready". A "reset" status indicates that the LVDS receiver of the LVDS interface is in a reset state and is unable to receive data until the reset is complete. A "destination not ready" status indicates that the receiver of the LVDS interface is not currently able to receive data because the receiver is either in a training phase or the receiver's FIFO buffer is full. In some implementations, when the status of the LVDS receiver is "destination not ready", the LVDS sender sends a training pattern to enable the LVDS receiver to adaptively adjust the phase of the clock signal. The "destination ready" status is the normal state that indicates that the LVDS sender is allowed to send working data to the LVDS receiver. In an exemplary implementation, the states may be encoded using the following bit patterns: reset: 01010101; destination not ready: 0000111; destination ready: 00110011. As one example, the bit rate of the status signal is 1/5 of the corresponding clock signal, e.g., the bit rate of the status_out signal is equal to the bit rate of the clock_out signal divided by five.

The link layer further includes encoding of data messages for transmitting data between the RCB and the RF front end. As described above, the data passed over the interface 1200 can include digital samples that are derived from RF signals received by the RF front end and passed from the RF front end to the RCB (i.e., data_in), or digital samples that are received by the RCB from the computing device, and passed from the RCB to the RF front end for transmission as RF signals (i.e., data_out). Further, the data passed over the LVDS interface 1200 can be encapsulated into data frames or encoded messages before the data is transferred on an LVDS pin pair, with each data frame containing a predetermined number of bytes of data. An exemplary format for a frame of a data message is additionally described below with reference to FIG. 14. In some implementations, the data is transferred over the LVDS interface on four dedicated channels in each direction, i.e., four data_in channels and four data_out channels. Thus, four respective data-dedicated LVDS pin pairs (i.e., each pin pair includes a positive pin and a negative pin to form a channel for transmitting messages, as is described additionally below) may be provided for transferring data in each direction. Furthermore, for example, the data stream can be distributed in a round-robin fashion to the four LVDS pin pairs dedicated for passing data. Thus, if there are four data messages or frames in the data queue, each LVDS pin pair can receive a respective one of the four data messages.

The link layer further provides for transmission of control and acknowledgment (ACK) messages on dedicated control channels in each direction using a LVDS pin pairs dedicated for control messages. The control messages may be encoded and transmitted using a fixed-length frame, as described additionally below with reference to FIG. 15. To ensure reliable transmission of control messages, an ACK is returned in response to a correctly received control message also using the control channel. As an example, the ACK message may be a fixed one-byte frame, e.g., with a value of 0x5F. A negative acknowledgment (NACK) can also be defined as a fixed one-byte frame, e.g., with a value of 0xAF.

Figure 13:
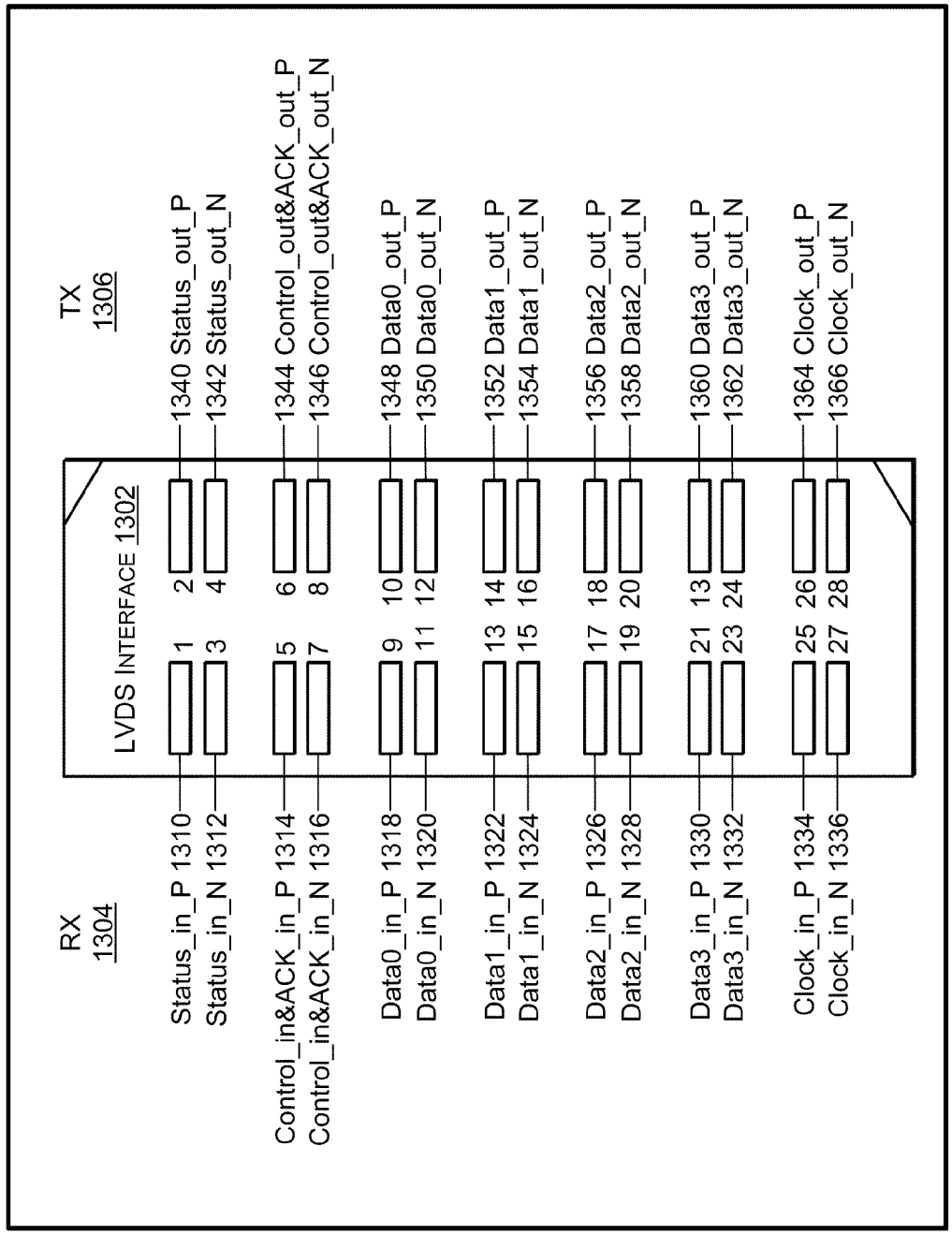
FIG. 13 illustrates an exemplary connector according to some implementations.

FIG. 13 illustrates an exemplary implementation of an LVDS connector 1302 that corresponds to LVDS connectors 1222, 1224 discussed above, and that is configured for use with the protocol discussed above. LVDS connector 1302 includes 14 pairs of pins numbered 1-28 for providing 14 distinct channels. Seven of these pin pairs serve as receive or "in" channels 1304 (i.e., the RCB receives data that was received by the RF front end as RF signals) and the other seven pin pairs serve as transmit or "out" channels 1306

(i.e., the RCB passes data from the computing device to the RF front end for transmission as RF signals). Each LVDS channel comprises a pair of pins, i.e., a positive (P) pin and a negative (N) pin to support LVDS communication. In the illustrated example, on the receive side, status_in information is passed using a Status_in_P positive pin 1310 and a Status_in_N negative pin 1312 as an LVDS pin pair which makes up a dedicated status_in line or channel. Control_in and ACK_in messages are passed using a Control_in&ACK_in_P positive pin 1314 and Control_in&ACK_in_N negative pin 1316 as the LVDS pin pair for a dedicated control_in channel. Received data is passed using four data channels, Data0_in through Data3_in, on corresponding positive and negative LVDS pairs of pins 1318-1332. The receive-side clock signal, clock_in, is passed on respective positive and negative LVDS pins 1334, 1336. On the transmit side, the status_out signal is passed on respective positive and negative pins 1340, 1342; the Control_out&ACK_out signals are passed on pins 1344, 1346; data is passed on four data channels, Data0_out through Data3_out on respective pins 1348-1362; and the transmit-side clock signal, clock_out, is passed on respective positive and negative LVDS pins 1364, 1366. Thus, it may be seen that the protocol and LVDS interface herein establishes separate LVDS channels for status signals, control messages and the clock signal that are separate from LVDS channels used for the data messages.

Figure 14:
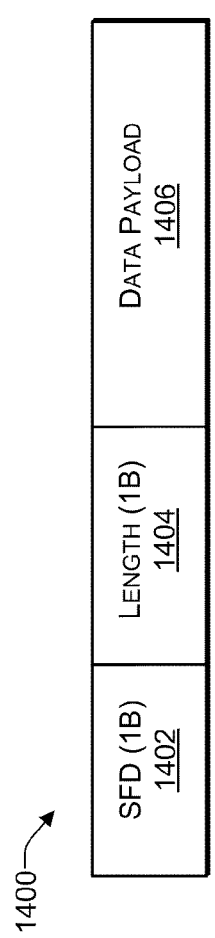
FIG. 14 illustrates an exemplary data message according to some implementations.

FIG. 14 illustrates an exemplary frame format for encoding a data message 1400 according to the message passing protocol described herein. Data messages 1400 are passed from the RCB to the RF front end or from the RF front end to the RCB over the LVDS interface 1200 discussed above. In the example data message 1400 illustrated, according to the protocol herein, the data frame format includes a one-byte start frame delimiter (SFD) field 1402. The SFD 1402 signals the start of the message and may have a value, for example, of 0xF5. The SFD field 1402 is followed by a one-byte length field 1404 that specifies the length of the data payload portion 1406 of the message 1400, which is then followed by the data payload 1406. For example, the maximum length of the data payload 1406 may be limited to a particular predetermined size, such as 256 bytes. The data payload 1406 includes the actual working data being exchanged between the RCB 1202 and the RF front end 1204. Further, while an exemplary frame format for the data message 1400 is illustrated and described herein, other formats may also be used for passing data between the RCB and RF front end.

Figure 15:
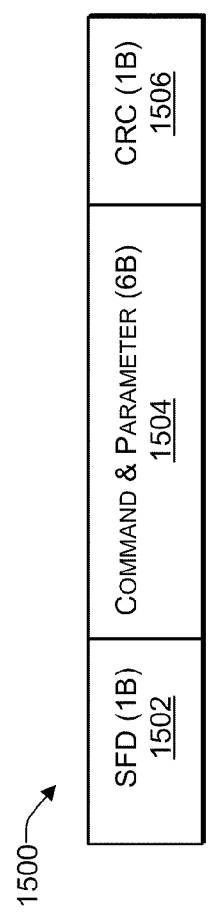
FIG. 15 illustrates an exemplary control message according to some implementations.

FIG. 15 illustrates an exemplary frame format for encoding a control message 1500 according to the protocol herein. Control messages 1500 typically contain commands or parameters, and are passed from the RCB to the RF front end or from the RF front end to the RCB over the LVDS interface 1200 discussed above using dedicated control_out and control_in pin pairs as dedicated LVDS lines or channels. The illustrated format of the control messages 1500 according to the protocol herein includes a one-byte start frame delimiter (SFD) 1502, followed by a six-byte command and parameter field 1504 that provides the command or parameter of the control message 1500. A one-byte CRC 1506 (cyclic redundancy check), checksum, or the like is included at the end of the control message for use in ensuring that the message is properly received. As an example, when CRC-8 is used, the CRC is calculated using the following polynomial: $x^8+x^7+x^6+x^4+x^2+1$. Further, while an exemplary format for the data message 1500 is illustrated and described herein, other formats may also be used for passing control messages between the RCB and RF front end.

Figure 16:
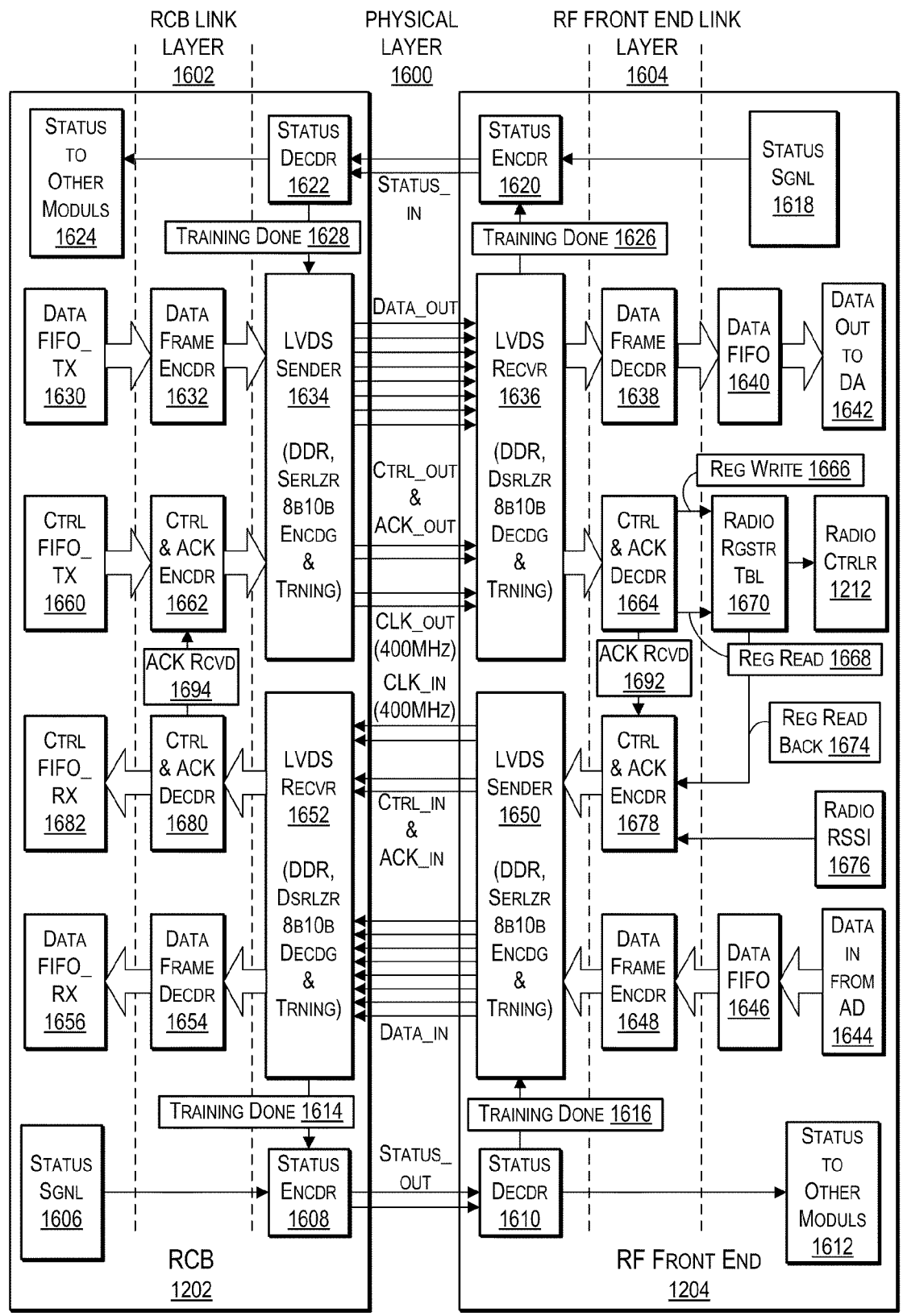
FIG. 16 illustrates an exemplary interface and protocol according to some implementations.

FIG. 16 illustrates an exemplary diagram of the interface 1200 implementing the message passing protocol between the RCB 1202 and the RF front end 1204. As discussed above, the message passing protocol includes a physical layer 1600, an RCB link layer 1602 and an RF front end link layer 1604. In some implementations, the various encoders, decoders and other modules of the protocol and interface 1200 described with reference to FIG. 16 can be implemented by the respective controller 1206 on the RCB 1202 and controller 1212 on the RF front end 1204 through execution of instructions stored in computer-readable storage media, such as onboard memories 1208, 1220, respectively. In other implementations, specialized circuits and/or processors can be provided on RCB 1202 and/or RF front end 1204 for achieving the same functions.

As discussed above, the status of the RCB 1202 and the status of the RF front end 1204 may be in one of three states, namely, reset, destination ready, or destination not ready. In accordance the current state, the RCB generates a status signal 1606, which indicates the type of data that is being sent to the RF front end over the data lines, namely, either training data or working data (e.g., digital samples corresponding to RF signals). For instance, during the training state the RCB sends training data to the RF front end, and vice versa, for carrying out tuning of the LVDS interface. On the other hand, during the normal working state, the RCB sends digital samples and other information to the RF front end, and vice versa.

The status signal at block 1606 is passed to a status encoder 1608 in physical layer 1600. The status encoder 1608 encodes the current status signal of the RCB for transmission to the RF front end. As one example, the bit rate of the status signal is 1/5 of the bit rate of the corresponding clock signal, e.g., the bit rate of the status_out signal can be equal to the bit rate of the clock_out signal divided by five. The status encoder 1608 passes the status_out signal on a dedicated status_out_LVDS pin pair (e.g., pins 1340, 1342 discussed above) to a status decoder 1610 on the RF front end 1204. Status decoder 1610 decodes the status_out signal to determine the current status of the data, and then passes the status to other modules on the RF front end at block 1612. Further, in the case in which training takes place, when the training is completed, a "training done" signal 1614 is provided to the status encoder 1608 and passed to the status decoder 1610, which outputs the training done signal 1616, as will be described additionally below.

On the other side, RF front end generates a status signal 1618 of its own current status (status_in), and passes this to status encoder 1620. Status encoder 1620 encodes the status signal as the status_in signal and passes the status_in signal on a dedicated status_in_LVDS pin pair (e.g., pins 1310, 1312 discussed above) to a status decoder 1622 on RCB 1202. The status decoder 1622 decodes the status signal received from the RF front end and passes the status to other modules on the RCB at block 1624. Further, in the case in which training takes place, when the training is completed, a training done signal 1626 is provided to the status encoder 1620 and passed to the status decoder 1622, which outputs the training done signal 1628, as will be described additionally below.

In addition, as discussed above, the RCB 1202 receives, from the computing device, data (e.g., digital samples) to be passed to the RF front end 1204 for transmission as radio signals. Prior to passing the data to the RF front end 1204, the data may be temporarily stored on the RCB 1202 in a data FIFO transmit buffer 1630 (Data FIFO_TX). The data for transmission is delivered from the FIFO_TX_buffer 1630 to a data frame encoder 1632 in the RCB link layer 1602. The data frame encoder 1632 encodes the data into a data message 1400 using the frame format discussed above with reference to FIG. 14. The formatted data message 1400 is then delivered to an LVDS sender 1634 in the physical layer 1600 for passing on one of the four dedicated data_out channel pin pairs (e.g., pins 1348-1362 discussed above) to an LVDS receiver 1636 on the RF front end 1204. In some implementations, data messages are serialized and assigned to one of the four data channel pin pairs in a round-robin fashion, although other scheduling techniques may also be used. The LVDS sender 1634 can transmit at double data rate, i.e., on the rise and fall of the clock signal, and also use 8 b/10 b encoding for passing the data messages. During passage of non-training data, the LVDS receiver 1636 on the RF front end receives the encoded data message and passes the data message to a data frame decoder 1638 in the RF front end link layer 1604. The data frame decoder 1630 decodes the data message and passes the data from the decoded message to a data FIFO buffer 1640. The data is then passed from the data FIFO 1640 to a digital-to-analog converter 1642, which converts the digital samples of the data into analog waveforms for transmission as RF signals by the RF circuit on the RF front end 1204.

Similarly, on the other side, radio signals received by the RF front end 1204 are converted to digital data by an analog-to-digital converter at block 1644. The data may be temporarily stored in a data FIFO buffer 1646, and then passed to a data frame encoder 1648 in the RF front end link layer 1604. As described above with reference to FIG. 14, the data frame encoder 1648 encodes the data into a data message format and delivers the data message 1400 to an LVDS sender 1650, which performs functions similar to the LVDS sender 1634 described above. The LVDS sender 1650 passes the data message via one of four dedicated LVDS data_in channel pin pairs (e.g., pins 1318-1332 described above) to an LVDS receiver 1652 on the RCB 1202, which is similar to the LVDS receiver 1636 described above. The LVDS receiver 1652 receives the data message and passes the data message to a data frame decoder 1654. The data frame decoder 1654 decodes the data message and passes the data message to a data FIFO receive buffer 1656 (Data FIFO_RX) for eventual delivery from the RCB to the computing device.

Further, during the training state, the LVDS sender 1634, 1650 can send training information including a training pattern to the LVDS receiver 1636, 1652, respectively, when the status of the LVDS receiver is destination not ready. The LVDS receiver can use this training pattern to optimize the sampling phase with the clock signal. For example, the training pattern can be delivered over each dedicated data LVDS pin pair (i.e., pins 1318-1332 and 1348-1362, respectively). In some implementations, the training pattern satisfies the following conditions: (1) the pattern does not conform to valid 8 b/10 b data codes so as to differentiate the training data from valid working data; (2) the number of "0"s and the number of "1"s are approximately equal so as to achieve DC balance; and (3) the training pattern includes 1, 2, 3, 4 and 5 consecutive equal bits, i.e., the training pattern includes all five of the patterns: "0", "1", "00", "11", "000", "111", "0000", "1111", "00000", and "11111", so as to facilitate phase adjustment between a received clock signal and the data, which is the primary purpose of the training. When the training in completed, the LVDS receiver delivers the training done signal 1614, 1620, which is passed to the LVDS sender as training done signal 1616, 1628, respectively, as discussed above.

In addition, as discussed above, control messages and ACKs are passed between the RCB 1202 and the RF front end 1204 on control lines that are separate from the data lines. The RCB 1202 may first place a control command or parameter in a control FIFO transmit buffer 1660 (Crtl FIFO_TX). The control command or parameter is then passed to a control message and ACK encoder 1662 in the RCB link layer 1602. The control message and ACK encoder encodes the command or parameter as a control message, such as in the frame format for control message 1500 described above with reference to FIG. 15. The control message is then passed to the LVDS sender, which passes the control message on a dedicated control_out channel made up of an LVDS pin pair (i.e., pins 1344, 1346 discussed above) to the LVDS receiver 1636 on the RF front end 1204. The LVDS receiver passes the control message to a control and ACK decoder 1664 which decodes the control message to extract the command or parameter. The command or parameter is passed to a radio register table 1670, and may be, for example, a register write command 1666 or a register read command 1668. The radio register table 1670 is accessed by the radio controller 1212, and the control command or parameter thereby effects control of the RF front end 1204.

On the other side, a register read back 1674 or a radio received signal strength indication (RSSI) 1676 can be passed as a control parameter from the RF front end 1204 to the RCB 1202. The parameter is passed to a control and ACK encoder 1678, which encodes the parameter into a control message 1500, as discussed above with reference to FIG. 15. The encoded control message is passed to the LVDS sender 1650 and transmitted on a dedicated control_in channel made up of an LVDS pin pair (e.g., pins 1314, 1316 discussed above) to the LVDS receiver 1652 on the RCB 1202. The LVDS receiver 1652 passes the received control message to a control and ACK decoder 1680, which decodes the received control message and passes the parameter to a control FIFO receive buffer 1682, from which the parameter is then passed on to the RCB controller.

Furthermore, LVDS sender 1634 on RCB 1202 also passes the clock_out signal to the LVDS receiver 1636 on the RF front end 1204 by passing the signal over a dedicated clock_out channel using an LVDS pin pair (e.g., pins 1334, 1336 discussed above). Similarly, the LVDS sender 1650 on the RF front end 1204 passes in the clock_in signal to the LVDS receiver 1652 on the RCB 1202 by passing the clock_in signal over another dedicated clock channel using an LVDS pin pair (e.g., pins 1364, 1366 discussed above). As discussed above, when training is performed in the physical layer 1600, one or both of the LVDS receivers 1636, 1652 tunes the phase of the clock signal to determine an optimal time for sampling the data.

ACKs (Acknowledgment messages) are set in response to received control messages over the control channels. When control & ACK decoder 1670, 1680 receives an control message successfully, an ACK received signal 1684, 1686, respectively, is sent to the corresponding control & ACK encoder 1678, 1662, respectively. The control & ACK encoder 1678, 1662 generates an ACK message and passes the ACK message to the LVDS sender 1650, 1634, respectively, which sends the ACK message to the corresponding LVDS receiver 1652, 1636, respectively, which passes the ACK message to the respective LVDS sender 1634, 1650.

Figure 17:
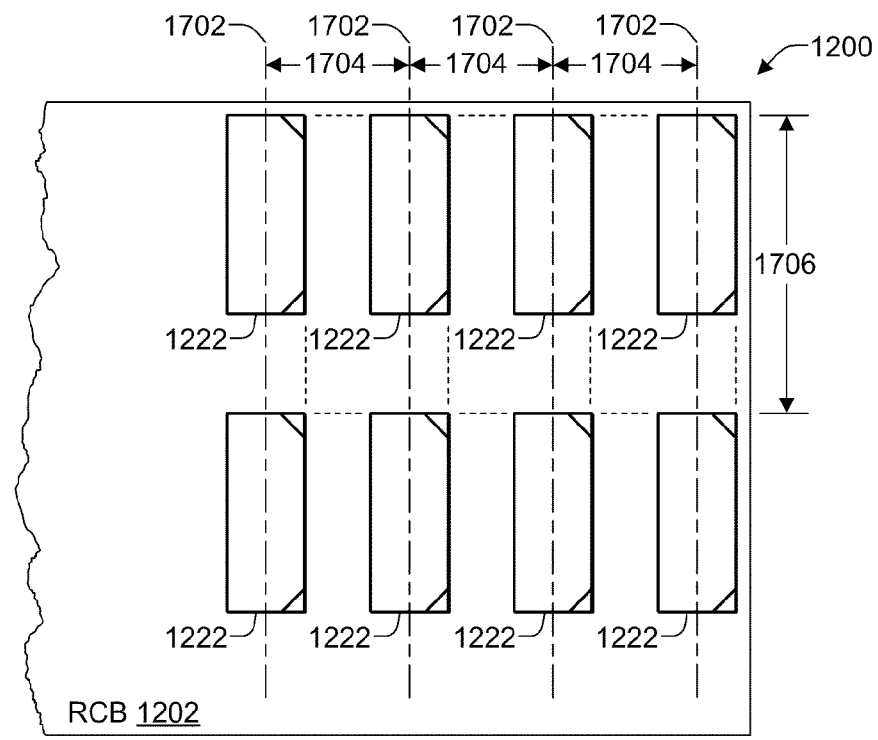
FIG. 17 illustrates an exemplary LVDS connector arrangement according to some implementations.

FIG. 17 illustrates another exemplary arrangement of LVDS connectors 1222 for the interface 1200 on RCB 1202.

In the implementation of FIG. 17, eight 28-pin LVDS connectors 1222 are situated on the RCB in a grid pattern having two rows of four connectors 1222 and four columns of two connectors 1222 when viewed in plan. As measured from longitudinal centerlines 1702, the connectors 1222 are spaced a predetermined lateral distance 1704 apart. In one implementation, the lateral distance 1704 is between 17.78 and 20.00 mm; however other predetermined lateral distances 1704 may also be used. Further, the connectors 1222 are spaced a predetermined longitudinal distance 1706 apart, as measured from one short end of a connector to the corresponding short end of an adjacent connector in the same column. In one implementation, the predetermined longitudinal distance 1706 is between 45.085 and 48.00 mm; however other predetermined longitudinal distances 1706 may also be used.

Figure 18:
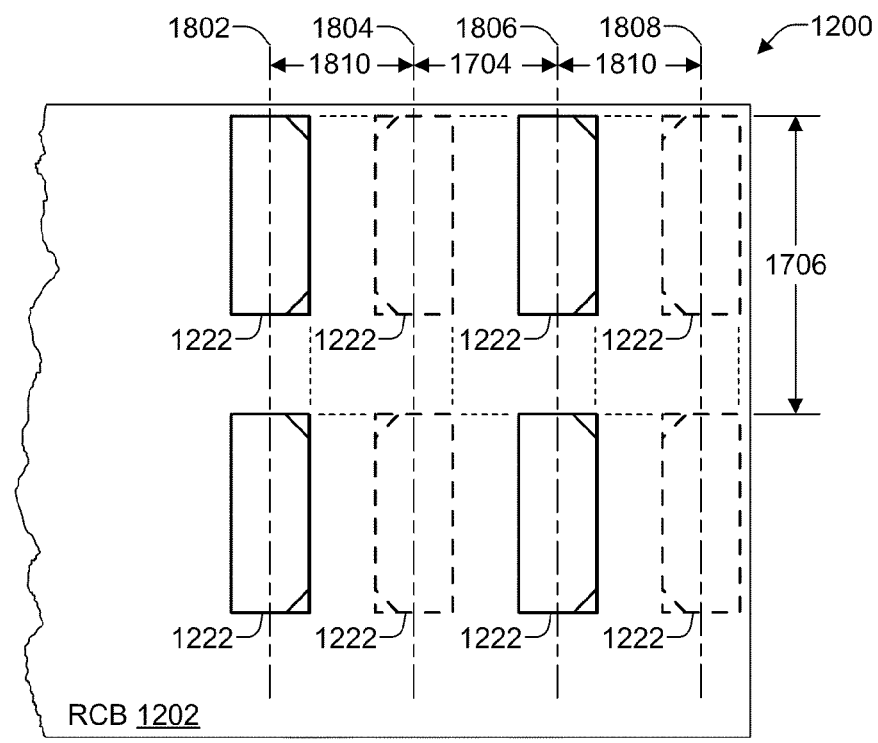
FIG. 18 illustrates another exemplary LVDS connector arrangement according to some implementations.

FIG. 18 illustrates another exemplary arrangement of LVDS connectors 1222 for the interface 1200 on RCB 1202. In the implementation of FIG. 18, four 28-pin connectors 1222 are sited on one side of the RCB in a first grid pattern having two rows of two connectors 1222 and two columns of two connectors 1222 when viewed in plan. Additionally, four 28-pin connectors 1222 are arranged on the other side of the RCB 1202 in a second grid pattern having two rows of two connectors 1222 and two columns of two connectors 1222 when viewed in plan, with the second grid pattern being offset from the first. As measured from longitudinal centerlines 1802, 1804, 1806, 1808 the connectors 1222 are spaced predetermined lateral distances apart. In the illustrated embodiment, the lateral distance 1810 between centerlines 1802 and 1804 and between centerlines 1806 and 1808 is between 15.24 and 18.00 mm, while the lateral distance 1704 between centerlines 1804 and 1806 is between 17.78 and 20.00 mm; however other predetermined lateral distances 1704, 1810 may also be used. Further, the connectors 1222 are spaced a predetermined longitudinal distance 1706 apart, as measured from one short end of a connector to the corresponding short end of an adjacent connector in the same column. In one implementation, the predetermined longitudinal distance 1706 is between 45.085 and 48.00 mm; however other predetermined longitudinal distances 1706 may also be used.

From the foregoing, it may be seen that the architecture of RCB 1202 and the interface 1200 for connecting RCB 1202 to an RF front end 1204 enable communication of data corresponding to RF signals between a computing device, RCB 1202 and RF front end 1204. Implementations further provide a messaging protocol with dedicated data channels and dedicated control channels for passing encoded data messages and control messages, respectively. Implementations also provide for separate dedicated status channels and clock channels for passing respective status and clock signals. In some implementations, the interface 1200 is an LVDS interface for providing high speed data passage. Further, a training mode may be entered for tuning the interface according to a phase of the clock signal.

Additional Implementations

Implementations of the SDR herein provide a fully programmable software-defined radio platform on a general-purpose computing device architecture Implementations of the SDR herein combine the performance and fidelity of hardware-based SDR platforms with the programming flexibility of GPP-based SDR platforms Implementations of the SDR platform herein have been described in some examples in the context of realizing a software radio that operates using the 802.11a/b/g protocols. However, implementing additional types of software radios, such as 3GPP LTE (Long Term Evolution), W-CDMA, GSM 802.11n, WiMax and various other radio protocols and standards can also be achieved using the SDR platform herein. The flexibility provided by implementations of the SDR herein makes it a convenient platform for experimenting with novel wireless protocols, such as ANC (Analog Network Coding) or PPR (Partial Packet Recovery). Further, by being able to utilize multiple cores, implementations of the SDR herein can scale to support even more complex PHY algorithms, such as MIMO (Multiple-Input Multiple-Output) or SIC (Successive Interference Cancellation).

In addition, implementations herein are not necessarily limited to any particular programming language. It will be appreciated that a variety of programming languages may be used to implement the teachings described herein. Further, it should be noted that the system configurations illustrated in FIGS. 1, 2, 3, 4, 5, 8 and 9 are purely exemplary of systems in which the implementations may be provided, and the implementations are not limited to the particular hardware configurations illustrated.

It may be seen that this detailed description provides various exemplary implementations, as described and as illustrated in the drawings. This disclosure is not limited to the implementations described and illustrated herein, but can extend to other implementations, as would be known or as would become known to those skilled in the art. Reference in the specification to "one implementation", "this implementation", "these implementations" or "some implementations" means that a particular feature, structure, or characteristic described in connection with the implementations is included in at least one implementation, and the appearances of these phrases in various places in the specification are not necessarily all referring to the same implementation. Additionally, in the description, numerous specific details are set forth in order to provide a thorough disclosure. However, it will be apparent to one of ordinary skill in the art that these specific details may not all be needed in all implementations. In other circumstances, well-known structures, materials, circuits, processes and interfaces have not been described in detail, and/or illustrated in block diagram form, so as to not unnecessarily obscure the disclosure.

CONCLUSION

Implementations described herein provide an SDR platform and a high-performance PHY processing library. Implementations of the SDR herein use both hardware and software techniques to achieve high throughput and low latency on a general-purpose computing device architecture for achieving a high-speed SDR. Implementations include an LVDS interface for exchanging data between the RCB and the RF front end using a message passing protocol. Further, a training state may be used for tuning the interface between the RCB and the RF front end according to a phase of the clock signal to optimize data accesses. Additionally, implementations include an SDR platform that enables users to develop high-speed radio implementations, such as IEEE 802.11a/b/g PHY and MAC, entirely in software on general-purpose computing device architecture. For example, time critical tasks, MAC and PHY processing can be changed and reprogrammed as desired for achieving various purposes. Further, a particular example of the SDR has been described that includes an exemplary WiFi radio system that can interoperate with commercial wireless NICs using 802.11a/b/g standards.

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims. Additionally, those of ordinary skill in the art appreciate that any arrangement that is calculated to achieve the same purpose may be substituted for the specific implementations disclosed. This disclosure is intended to cover any and all adaptations or variations of the disclosed implementations, and it is to be understood that the terms used in the following claims should not be construed to limit this patent to the specific implementations disclosed in the specification. Instead, the scope of this patent is to be determined entirely by the following claims, along with the full range of equivalents to which such claims are entitled.

The invention claimed is:

1. A radio control board (RCB) comprising:
   a bus interface for operably connecting the RCB for communication with a system bus of a computing device for exchanging working data between the RCB and the computing device, the working data including first digital signal samples of radio waveforms to be transmitted by a radio frequency (RF) front end and second digital signal samples of radio waveforms received from the RF front end;
   one or more buffers for storing the first digital signal samples to be transmitted by the RF front end and the second digital signal samples received from the RF front end; and
   multiple low voltage differential signaling (LVDS) interfaces for operably connecting the RCB with the RF front end for exchanging the working data between the RCB and the RF front end, wherein individual ones of the multiple LVDS interfaces comprise:
      at least one LVDS data channel for transmitting data messages between the RCB and the RF front end;
      at least one LVDS control channel, separate from the at least one LVDS data channel, for transmitting control messages between the RCB and the RF front end; and
      at least one dedicated LVDS status channel, separate from the at least one LVDS data channel and separate from the at least one LVDS control channel, for indicating whether data transmitted over an individual LVDS interface is the working data or training data, the training data used to at least tune a phase of a clock signal associated with the individual LVDS interface and to determine a data sampling time for the individual LVDS interface, wherein the training data includes a training pattern including a plurality of sub-patterns each including consecutive equal bits and bordered at both ends by a bit of a different value, a first sub-pattern of the plurality of sub-patterns including a first number of consecutive equal bits, and a second sub-pattern of the plurality of sub-patterns including a second different number of consecutive equal bits.

2. The radio control board according to claim 1, wherein the system bus is a Peripheral Component Interconnect Express (PCIe) bus.

3. The radio control board according to claim 1, further comprising a data frame encoder that is configured to encode the working data on the RCB into a payload portion of a data message having a start frame delimiter and a length indicator, the encoding occurring prior to transmitting the data message to the RF front end.

4. The radio control board according to claim 3, wherein the individual ones of the multiple LVDS interfaces further comprise an LVDS sender that receives outgoing data messages encoded by the data frame encoder and that transfers the outgoing data messages to an LVDS receiver on the RF front end.

5. The radio control board according to claim 4, wherein the LVDS sender is configured to transfer the outgoing data messages to the LVDS receiver across multiple data-dedicated LVDS channels using 8b/10b encoding.

6. The radio control board according to claim 1, wherein the individual ones of the multiple LVDS interfaces further comprise:
   an LVDS receiver that receives incoming encoded data messages from an LVDS sender on the RF front end; and
   a data frame decoder that decodes the incoming encoded data messages to derive incoming data for storing in the one or more buffers.

7. The radio control board according to claim 1, wherein tuning the phase of the clock signal associated with the individual LVDS interface comprises synchronizing the clock signal associated with the individual LVDS interface with a different clock signal associated with the RF front end.

8. The radio control board according to claim 1, wherein the individual LVDS interface comprises an LVDS sender and an LVDS receiver and wherein the LVDS receiver is configured to transmit a status message indicating one of reset, destination not ready, or destination ready.

9. The radio control board according to claim 8, wherein, upon receiving the status message destination not ready, the LVDS sender sends the training data to enable the LVDS receiver to adjust the phase of the clock signal.

10. A method comprising:
    connecting a radio control board (RCB) having a processor and memory for operable communication with a radio frequency (RF) front end via multiple communication interfaces, wherein the RCB is further connected for operable communication with a system bus of a computing device, and wherein individual ones of the multiple communication interfaces include:
       at least one data channel for transmitting data messages between the RCB and the RF front end;
       at least one control channel, separate from the at least one data channel, for transmitting control messages between the RCB and the RF front end; and
       at least one dedicated status channel, separate from the at least one data channel and separate from the at least one control channel, for indicating whether data transmitted over an individual communication interface is working data or training data; and
    for individual ones of the multiple communication interfaces:
       receiving, via the at least one dedicated status channel, a status indicating that the training data is to be transmitted over the individual communication interface;
       transmitting, from the RCB to the RF front end, the training data, wherein the training data includes a training pattern including a plurality of sub-patterns each including consecutive equal bits and bordered at both ends by a bit of a different value, a first sub-pattern of the plurality of sub-patterns including a first number of consecutive equal bits, and a second sub-pattern of the plurality of sub-patterns including a second different number of consecutive equal bits;

tuning, based at least in part on the status received and the training data transmitted, a phase of a clock signal associated with the individual communication interface; and determining, based at least in part on the tuning, a data sampling time for the individual communication interface.

11. The method according to claim 10, wherein a control message includes a start frame delimiter and a cyclic redundancy check value.

12. The method according to claim 10, wherein at least one communication interface comprises a low voltage differential signaling (LVDS) interface that delivers the data messages to the RF front end using 8b/10b encoding.

13. The method according to claim 10, wherein the individual ones of the multiple communication interfaces comprise a sender and a receiver and wherein the receiver is configured to transmit a status message indicating one of reset, destination not ready, or destination ready.

14. The method according to claim 13, wherein upon receiving the status message destination not ready, the sender sends the training data to enable the receiver to tune the phase of the clock signal.

15. A radio control board (RCB) comprising:

a bus interface for operably connecting the RCB for communication with a computing device; and multiple low voltage differential signaling (LVDS) interfaces for operably connecting the RCB with a radio frequency (RF) front end for exchanging working data between the RCB and the RF front end, wherein individual ones of the multiple LVDS interfaces include separate channels comprising:

a transmission data channel for transmitting first data messages to the RF front end;

a reception data channel for receiving second data messages from the RF front end;

a transmission control channel for transmitting first control messages to the RF front end;

a reception control channel for receiving second control messages from the RF front end; and a dedicated status channel for delivering a status signal indicating whether data transmitted over an individual LVDS interface is the working data or training data, the training data used to at least tune a phase of a clock signal associated with the individual LVDS interface and to determine a data sampling time for the individual LVDS interface, wherein the training data includes a training pattern including a plurality of sub-patterns each including consecutive equal bits and bordered at both ends by a bit of a different value, a first sub-pattern of the plurality of sub-patterns including a first number of consecutive equal bits, and a second sub-pattern of the plurality of sub-patterns including a second different number of consecutive equal bits.

16. The radio control board according to claim 15, wherein the individual ones of the multiple LVDS interfaces further include at least one LVDS sender and at least one LVDS receiver, wherein the at least one LVDS sender is configured to send the training data including the training pattern to the at least one LVDS receiver for tuning of the phase of the clock signal.

17. The radio control board according to claim 15, wherein individual ones of the multiple LVDS interfaces include at least four 28-pin LVDS connectors arranged on the RCB in two rows and two columns of two LVDS connectors each, wherein a distance between longitudinal centerlines of the LVDS connectors is between about 17.78 and about 20.00 mm.

18. The radio control board according to claim 15, wherein the tuning of the phase of the clock signal associated with the individual LVDS interface comprises synchronizing the clock signal associated with the LVDS interface with a different clock signal associated with the RF front end.

19. The radio control board according to claim 15, the individual ones of the multiple LVDS interfaces further comprising a sender and a receiver, the sender configured to send the training data to tune a phase of the clock signal associated with the individual LVDS interface in response to receiving a destination not ready indication from the receiver.

* * * * *